US012608199B2

(12) United States Patent
Sheffield et al.

(10) Patent No.: US 12,608,199 B2
(45) Date of Patent: Apr. 21, 2026

(54) INSTRUCTION SET ARCHITECTURE SUPPORT FOR A LOAD GLOBAL POINTER INSTRUCTION

(71) Applicant: Intel Corporation, Santa Clara, CA (US)

(72) Inventors: David B. Sheffield, Portland, OR (US); Erich Boleyn, Portland, OR (US); Jonathan Pearce, Portland, OR (US); Sofia Pediaditaki, Portland, OR (US); Jeffrey Cook, Portland, OR (US); Shreesha Srinath, Portland, OR (US); Ching-Kai Liang, Beaverton, OR (US); Tyler Sondag, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 808 days.

(21) Appl. No.: 17/712,126

(22) Filed: Apr. 2, 2022

(65) Prior Publication Data

US 2023/0315445 A1      Oct. 5, 2023

(51) Int. Cl.
*G06F 9/30* (2018.01)
*G06F 9/22* (2006.01)

(52) U.S. Cl.
CPC ............ *G06F 9/223* (2013.01); *G06F 9/3009* (2013.01); *G06F 9/30101* (2013.01)

(58) Field of Classification Search
CPC ............ G06F 9/30101; G06F 9/30123; G06F 9/3017; G06F 9/30043
See application file for complete search history.

(56) References Cited

U.S. PATENT DOCUMENTS

| | | | | | |
|---|---|---|---|---|---|
| 5,826,089 A | * | 10/1998 | Ireton | ................... | G06F 9/3885 |
| | | | | | 712/E9.071 |
| 6,560,692 B1 | * | 5/2003 | Kudo | ...................... | G06F 9/355 |
| | | | | | 712/E9.031 |
| 6,725,366 B1 | * | 4/2004 | Swanberg | ............... | G06F 9/342 |
| | | | | | 712/E9.075 |
| 7,047,394 B1 | * | 5/2006 | Van Dyke | ........... | G06F 9/30123 |
| | | | | | 712/E9.035 |
| 8,099,777 B1 | * | 1/2012 | Maxted | ................. | G06F 9/3802 |
| | | | | | 726/14 |
| 2001/0025337 A1 | * | 9/2001 | Worrell | ............... | G06F 9/30138 |
| | | | | | 712/E9.035 |
| 2003/0079215 A1 | * | 4/2003 | Hundt | ................. | G06F 9/44521 |
| | | | | | 717/164 |
| 2015/0309812 A1 | * | 10/2015 | Gschwind | ................. | G06F 8/41 |
| | | | | | 717/162 |
| 2019/0065202 A1 | * | 2/2019 | Robinson | ............ | G06F 9/30145 |
| 2020/0409844 A1 | * | 12/2020 | Sanjeepan | ........... | G06F 9/30145 |

* cited by examiner

*Primary Examiner* — Jacob Petranek
(74) *Attorney, Agent, or Firm* — Nicholson De Vos Webster & Elliott LLP

(57) ABSTRACT

Techniques for synchronous microthreaded execution are described. An example includes a logical processor to execute one or more threads in a first mode; and a synchronous microthreading (SyMT) co-processor coupled to the logical processor to execute lightweight microthreads, with each lightweight microthread having an independent register state, upon an execution of an instruction to enter into SyMT mode.

24 Claims, 45 Drawing Sheets

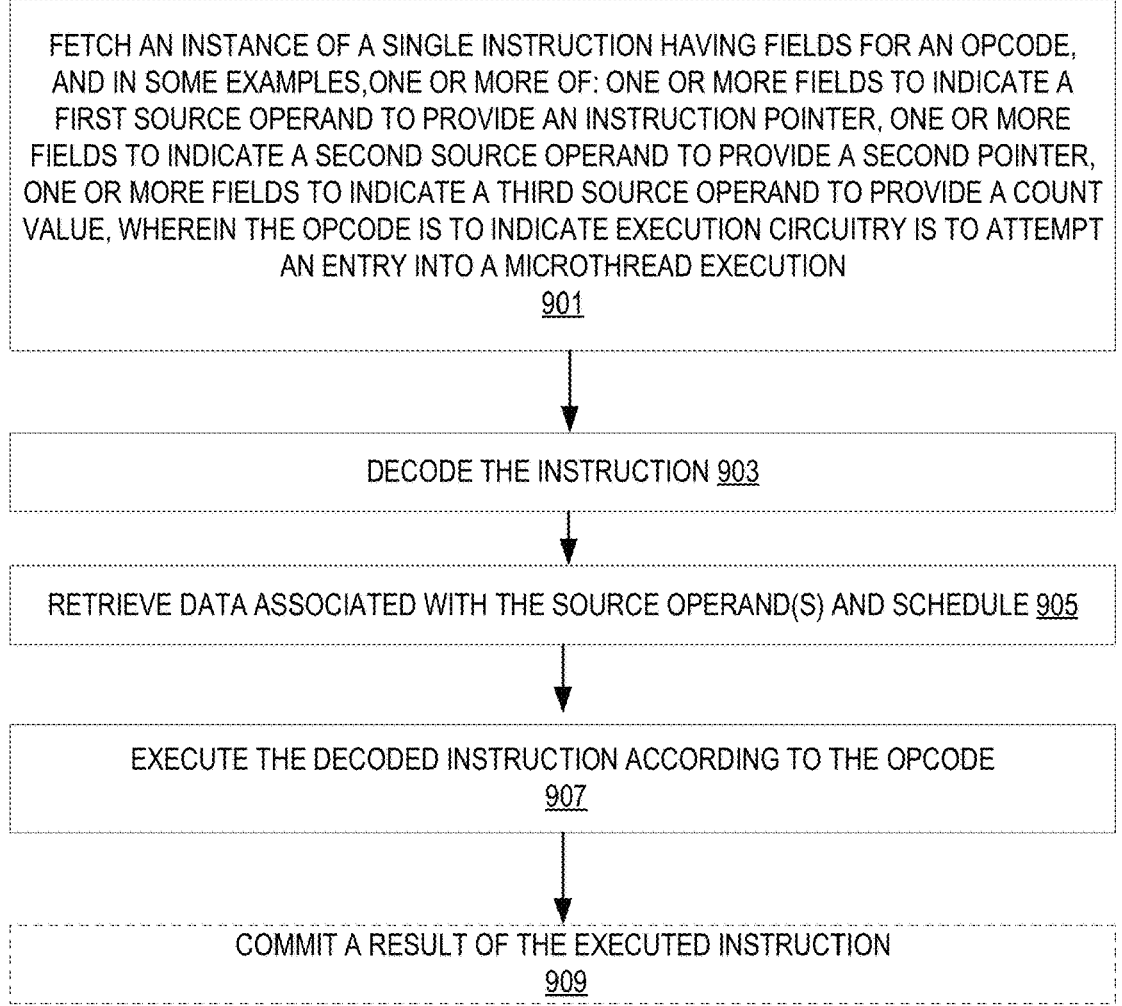

FETCH AN INSTANCE OF A SINGLE INSTRUCTION HAVING FIELDS FOR AN OPCODE, AND IN SOME EXAMPLES,ONE OR MORE OF: ONE OR MORE FIELDS TO INDICATE A FIRST SOURCE OPERAND TO PROVIDE AN INSTRUCTION POINTER, ONE OR MORE FIELDS TO INDICATE A SECOND SOURCE OPERAND TO PROVIDE A SECOND POINTER, ONE OR MORE FIELDS TO INDICATE A THIRD SOURCE OPERAND TO PROVIDE A COUNT VALUE, WHEREIN THE OPCODE IS TO INDICATE EXECUTION CIRCUITRY IS TO ATTEMPT AN ENTRY INTO A MICROTHREAD EXECUTION
901

DECODE THE INSTRUCTION 903

RETRIEVE DATA ASSOCIATED WITH THE SOURCE OPERAND(S) AND SCHEDULE 905

EXECUTE THE DECODED INSTRUCTION ACCORDING TO THE OPCODE
907

COMMIT A RESULT OF THE EXECUTED INSTRUCTION
909

FIG. 9

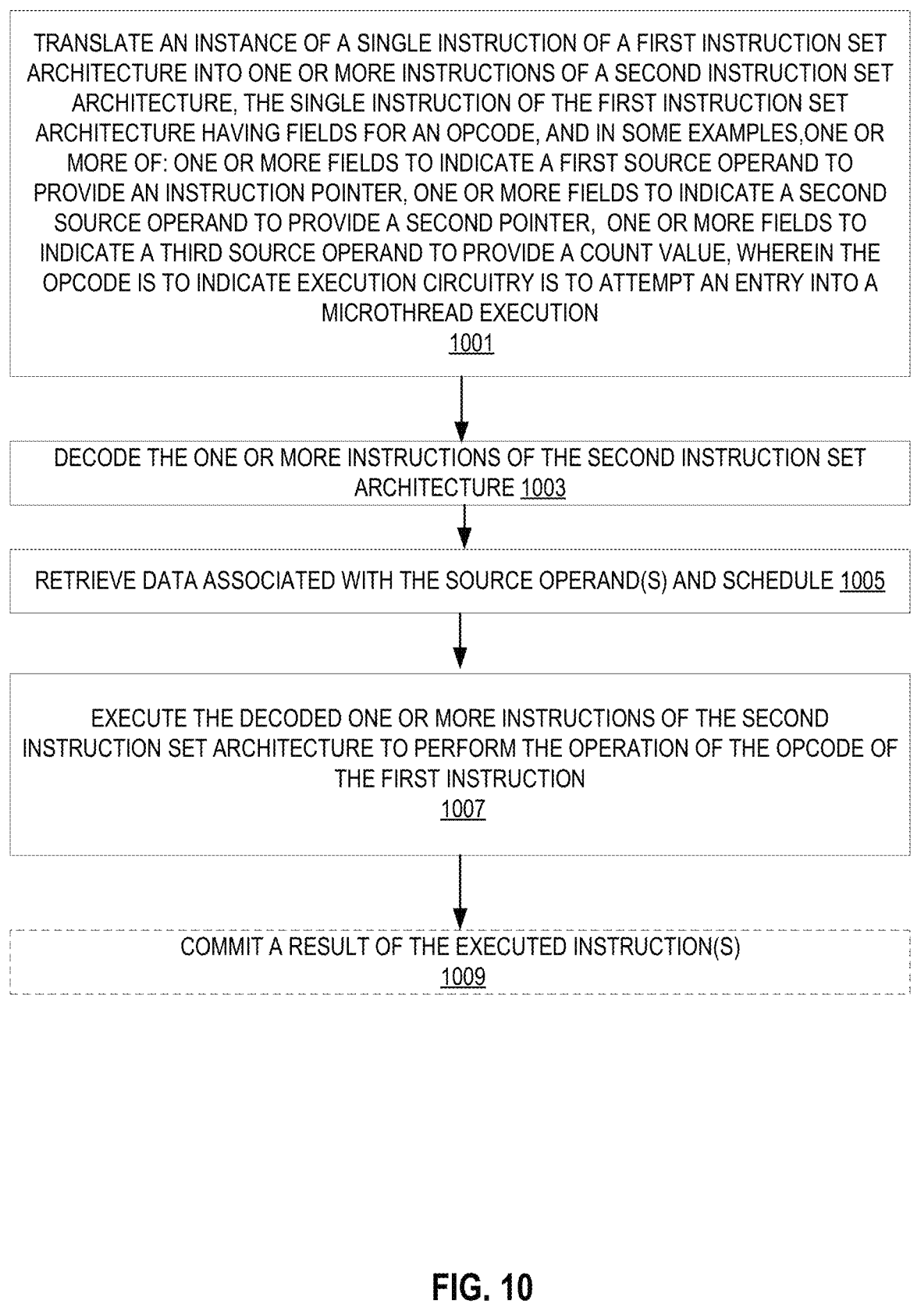

TRANSLATE AN INSTANCE OF A SINGLE INSTRUCTION OF A FIRST INSTRUCTION SET ARCHITECTURE INTO ONE OR MORE INSTRUCTIONS OF A SECOND INSTRUCTION SET ARCHITECTURE, THE SINGLE INSTRUCTION OF THE FIRST INSTRUCTION SET ARCHITECTURE HAVING FIELDS FOR AN OPCODE, AND IN SOME EXAMPLES,ONE OR MORE OF: ONE OR MORE FIELDS TO INDICATE A FIRST SOURCE OPERAND TO PROVIDE AN INSTRUCTION POINTER, ONE OR MORE FIELDS TO INDICATE A SECOND SOURCE OPERAND TO PROVIDE A SECOND POINTER, ONE OR MORE FIELDS TO INDICATE A THIRD SOURCE OPERAND TO PROVIDE A COUNT VALUE, WHEREIN THE OPCODE IS TO INDICATE EXECUTION CIRCUITRY IS TO ATTEMPT AN ENTRY INTO A MICROTHREAD EXECUTION
1001

DECODE THE ONE OR MORE INSTRUCTIONS OF THE SECOND INSTRUCTION SET ARCHITECTURE 1003

RETRIEVE DATA ASSOCIATED WITH THE SOURCE OPERAND(S) AND SCHEDULE 1005

EXECUTE THE DECODED ONE OR MORE INSTRUCTIONS OF THE SECOND INSTRUCTION SET ARCHITECTURE TO PERFORM THE OPERATION OF THE OPCODE OF THE FIRST INSTRUCTION
1007

COMMIT A RESULT OF THE EXECUTED INSTRUCTION(S)
1009

FIG. 10

```
//single host-thread behavior initially
if (bad_mode)
        generate_fault #UD;
else if (SYMT_SSA_PTR == NULL) {
   generate_fault #SYMT;
}
else if (SYMT_SSA_PTR pages not present or SSA pages not writable by supervisor) {
     generate_fault #SYMT;
}
//other setup checks

...

//these temps readable in host and microthread mode
t_global_pointer = utntr.gblptr;
t_kernel_rip = utntr.kernel_rip;
//host cpu eflag flags t_symt_resume = flags.zf;

if(!t_symt_resume) { //if zf == 0, clean UTNTR launch
ssa->active_bitvec = (1 << gang_size) - 1;
flags.zf = 1;  //symt mode activated
}

//activates microthreads live according to the live bit vector in SSA, "symt_mode" set to 1
enter_symt_mode();

/* now per-microthread behavior after "enter_symt_mode" (e.g. all microthreads execute the
statements below) */
if(t_symt_resume) { //restore
   //read microthread state for all microthreads that are not done
}
else { //clean initial launch
   //zero uthread registers
   //set uthreads to eflags 2
   //set microthread rip to t_kernel_rip
}

//note : host-thread rip remains pointing to the instruction-pointer of the UTNTR instruction //microthreads start execution of user code at the per microthread rip
```

FIG. 11

FETCH AN INSTANCE OF A SINGLE INSTRUCTION HAVING FIELDS FOR AN OPCODE, THE OPCODE TO INDICATE EXECUTION CIRCUITRY IS TO EXIT FROM MICROTHREADED EXECUTION
1201

DECODE THE INSTRUCTION 1203

RETRIEVE DATA ASSOCIATED WITH THE SOURCE OPERAND(S) AND SCHEDULE 1205

EXECUTE THE DECODED INSTRUCTION ACCORDING TO THE OPCODE
1207

COMMIT A RESULT OF THE EXECUTED INSTRUCTION
1209

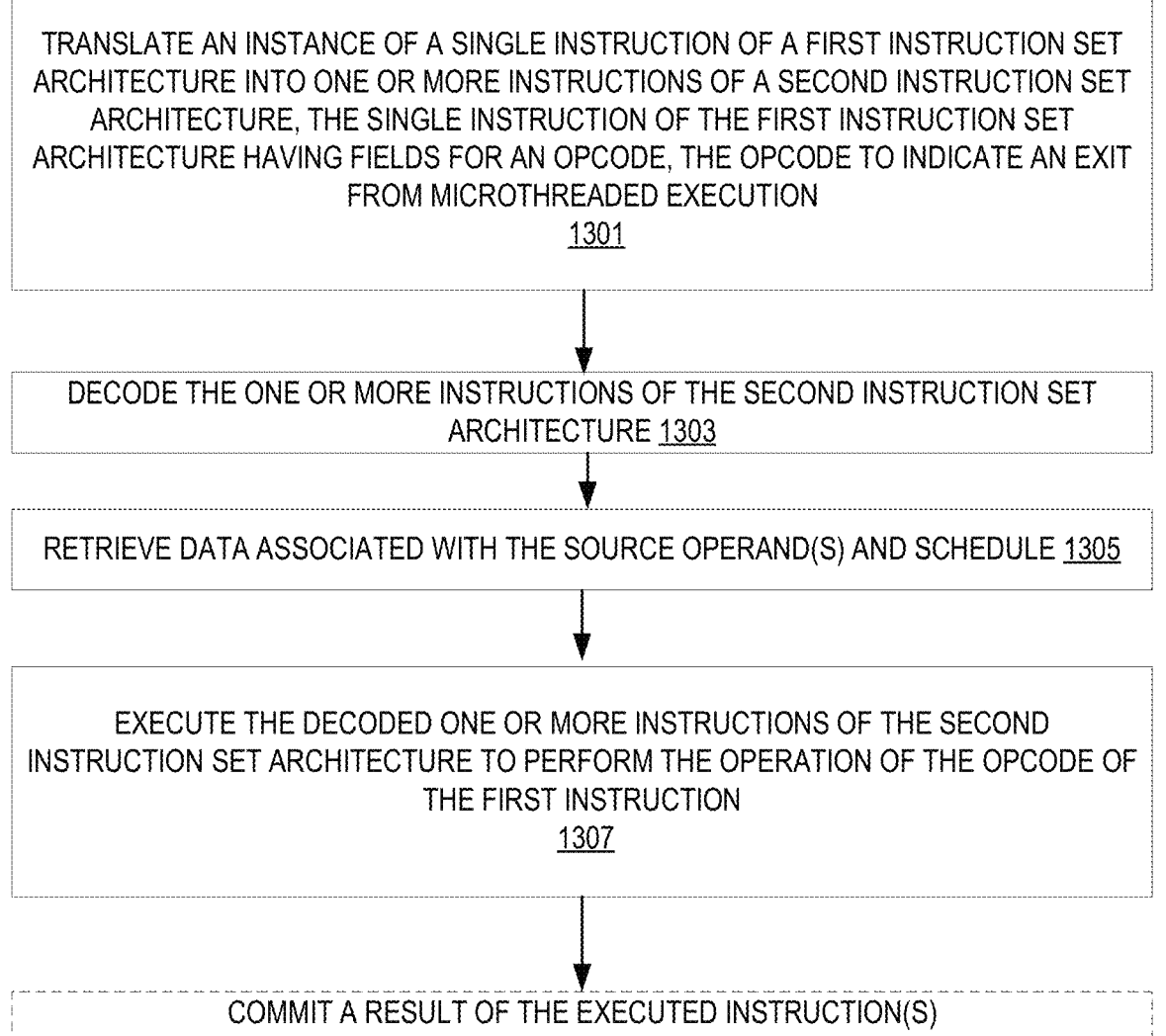

TRANSLATE AN INSTANCE OF A SINGLE INSTRUCTION OF A FIRST INSTRUCTION SET ARCHITECTURE INTO ONE OR MORE INSTRUCTIONS OF A SECOND INSTRUCTION SET ARCHITECTURE, THE SINGLE INSTRUCTION OF THE FIRST INSTRUCTION SET ARCHITECTURE HAVING FIELDS FOR AN OPCODE, THE OPCODE TO INDICATE AN EXIT FROM MICROTHREADED EXECUTION
1301

DECODE THE ONE OR MORE INSTRUCTIONS OF THE SECOND INSTRUCTION SET ARCHITECTURE 1303

RETRIEVE DATA ASSOCIATED WITH THE SOURCE OPERAND(S) AND SCHEDULE 1305

EXECUTE THE DECODED ONE OR MORE INSTRUCTIONS OF THE SECOND INSTRUCTION SET ARCHITECTURE TO PERFORM THE OPERATION OF THE OPCODE OF THE FIRST INSTRUCTION
1307

COMMIT A RESULT OF THE EXECUTED INSTRUCTION(S)
1309

FIG. 13

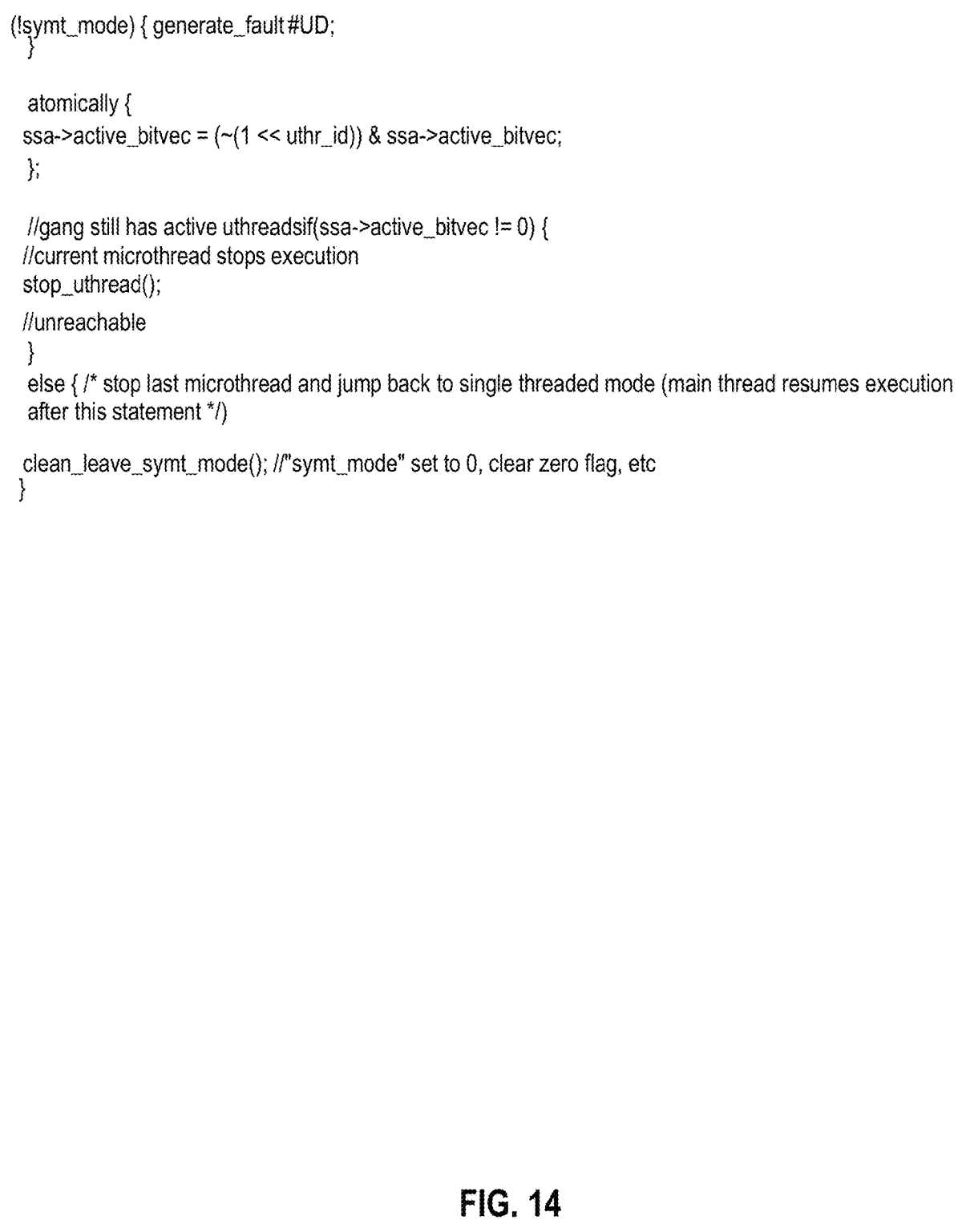

```
(!symt_mode) { generate_fault #UD;
  } atomically {
  ssa->active_bitvec = (~(1 << uthr_id)) & ssa->active_bitvec;
  };

//gang still has active uthreadsif(ssa->active_bitvec != 0) {
  //current microthread stops execution
  stop_uthread();

//unreachable
  }
  else { /* stop last microthread and jump back to single threaded mode (main thread resumes execution
  after this statement */)

clean_leave_symt_mode(); //"symt_mode" set to 0, clear zero flag, etc
  }
```

FIG. 14

FETCH AN INSTANCE OF A SINGLE INSTRUCTION HAVING FIELDS FOR AN OPCODE, THE OPCODE TO INDICATE EXECUTION CIRCUITRY IS TO RETREIVE A THREAD IDENTIFIER FOR A MICROTHREAD
1501

DECODE THE INSTRUCTION 1503

SCHEDULE 1505

EXECUTE THE DECODED INSTRUCTION ACCORDING TO THE OPCODE
1507

COMMIT A RESULT OF THE EXECUTED INSTRUCTION
1509

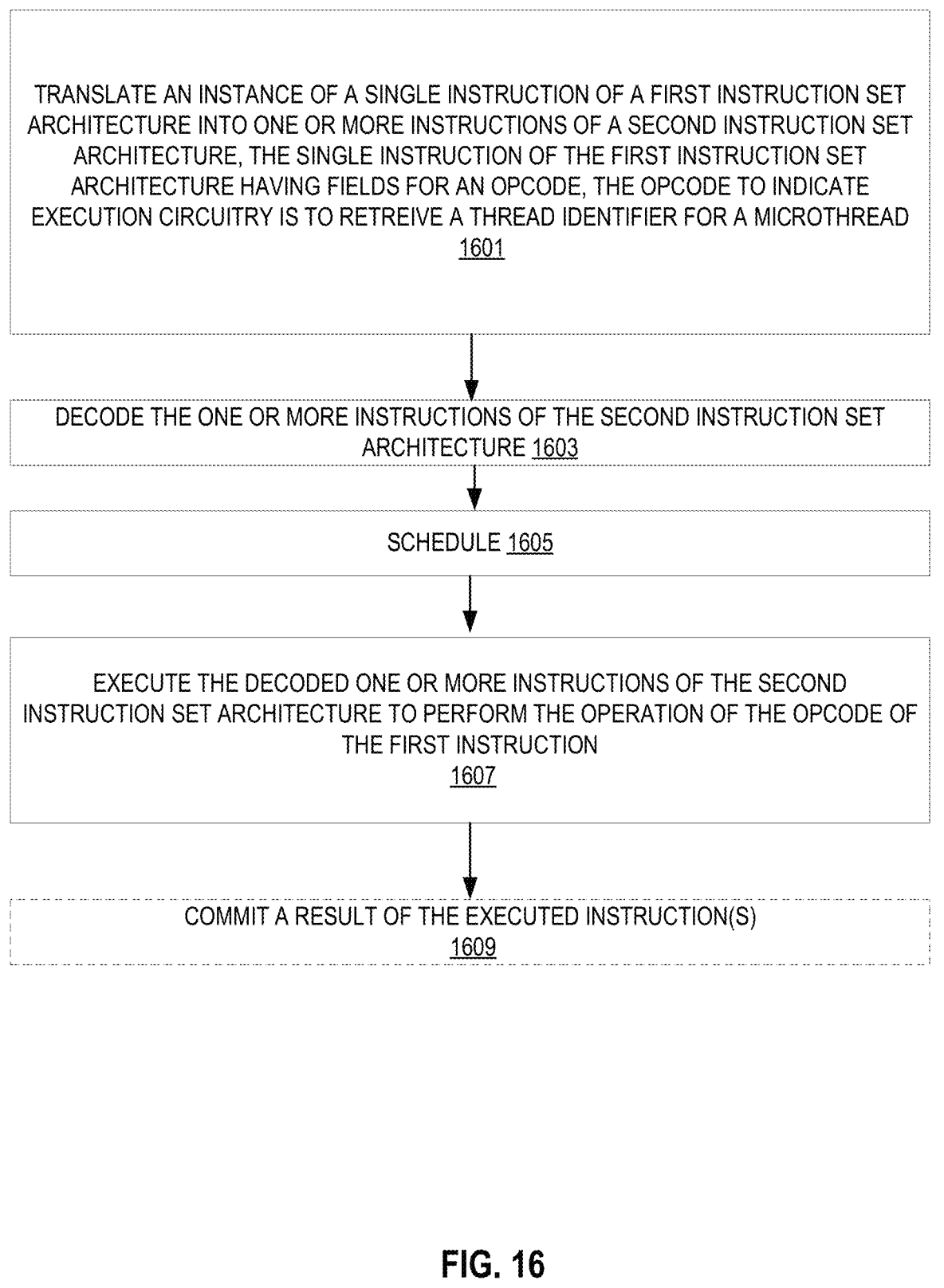

TRANSLATE AN INSTANCE OF A SINGLE INSTRUCTION OF A FIRST INSTRUCTION SET ARCHITECTURE INTO ONE OR MORE INSTRUCTIONS OF A SECOND INSTRUCTION SET ARCHITECTURE, THE SINGLE INSTRUCTION OF THE FIRST INSTRUCTION SET ARCHITECTURE HAVING FIELDS FOR AN OPCODE, THE OPCODE TO INDICATE EXECUTION CIRCUITRY IS TO RETREIVE A THREAD IDENTIFIER FOR A MICROTHREAD
1601

DECODE THE ONE OR MORE INSTRUCTIONS OF THE SECOND INSTRUCTION SET ARCHITECTURE 1603

SCHEDULE 1605

EXECUTE THE DECODED ONE OR MORE INSTRUCTIONS OF THE SECOND INSTRUCTION SET ARCHITECTURE TO PERFORM THE OPERATION OF THE OPCODE OF THE FIRST INSTRUCTION
1607

COMMIT A RESULT OF THE EXECUTED INSTRUCTION(S)
1609

FIG. 16

```
IF(!SYMT_MODE) {
        GENERATE_FAULT #UD;
}
//UTHR_ID UNIQUE TO A GIVEN MICROTHREAD
RETURN UTHR_ID;
```

FIG. 17

FETCH AN INSTANCE OF A SINGLE INSTRUCTION HAVING FIELDS FOR AN OPCODE, THE OPCODE TO INDICATE EXECUTION CIRCUITRY IS TO LOAD A GLOBAL POINTER FROM MEMORY
1801

DECODE THE INSTRUCTION 1803

RETRIEVE DATA ASSOCIATED WITH THE SOURCE OPERAND(S) AND SCHEDULE 1805

EXECUTE THE DECODED INSTRUCTION ACCORDING TO THE OPCODE
1807

COMMIT A RESULT OF THE EXECUTED INSTRUCTION
1809

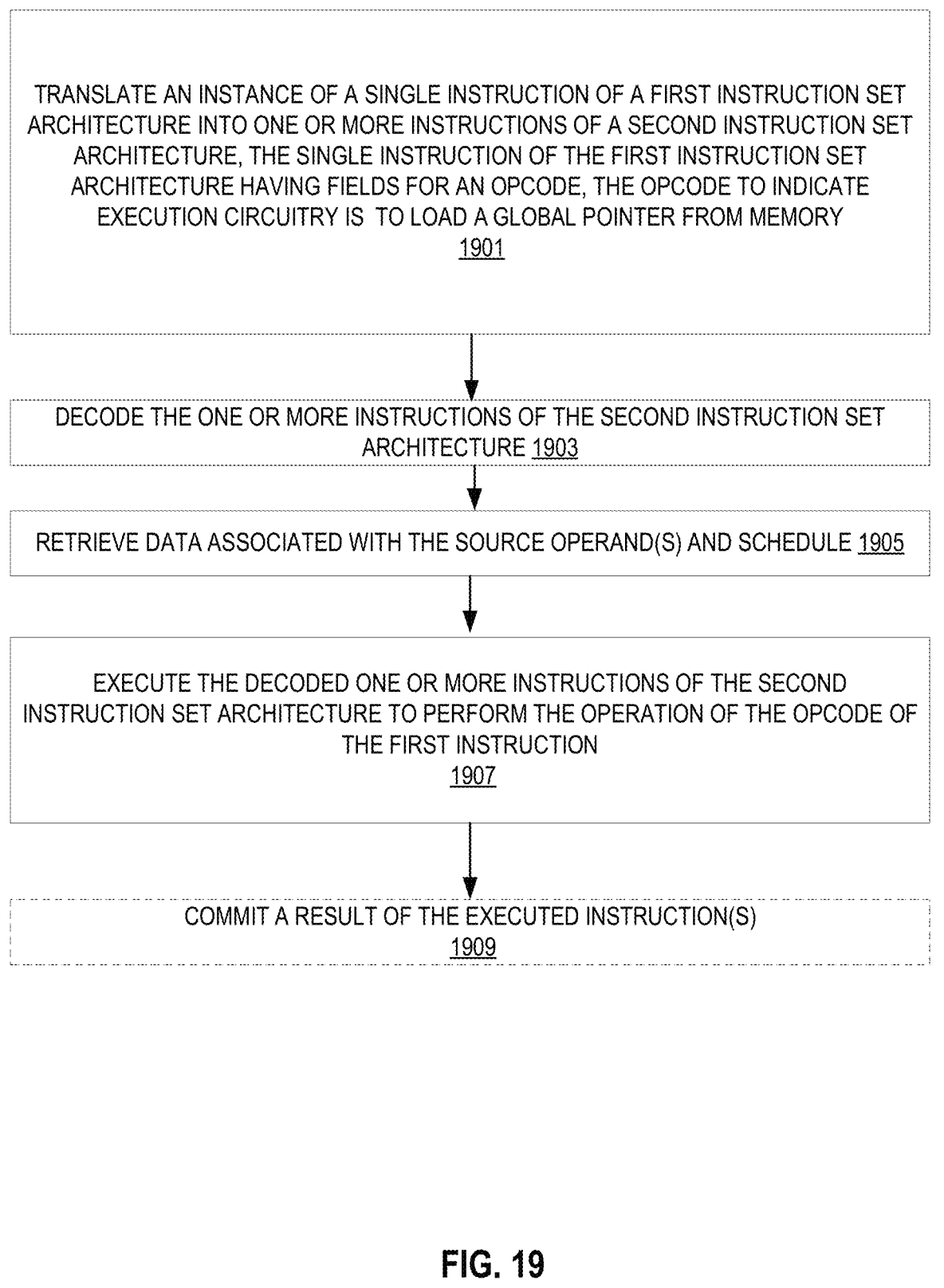

TRANSLATE AN INSTANCE OF A SINGLE INSTRUCTION OF A FIRST INSTRUCTION SET ARCHITECTURE INTO ONE OR MORE INSTRUCTIONS OF A SECOND INSTRUCTION SET ARCHITECTURE, THE SINGLE INSTRUCTION OF THE FIRST INSTRUCTION SET ARCHITECTURE HAVING FIELDS FOR AN OPCODE, THE OPCODE TO INDICATE EXECUTION CIRCUITRY IS TO LOAD A GLOBAL POINTER FROM MEMORY
1901

DECODE THE ONE OR MORE INSTRUCTIONS OF THE SECOND INSTRUCTION SET ARCHITECTURE 1903

RETRIEVE DATA ASSOCIATED WITH THE SOURCE OPERAND(S) AND SCHEDULE 1905

EXECUTE THE DECODED ONE OR MORE INSTRUCTIONS OF THE SECOND INSTRUCTION SET ARCHITECTURE TO PERFORM THE OPERATION OF THE OPCODE OF THE FIRST INSTRUCTION
1907

COMMIT A RESULT OF THE EXECUTED INSTRUCTION(S)
1909

FIG. 19

FETCH AN INSTANCE OF A SINGLE INSTRUCTION HAVING FIELDS FOR AN OPCODE, THE OPCODE TO INDICATE EXECUTION CIRCUITRY IS TO RETURN AN ACTIVE NUMBER OF MICROTHREADS
2001

DECODE THE INSTRUCTION 2003

RETRIEVE DATA ASSOCIATED WITH THE SOURCE OPERAND(S) AND SCHEDULE 2005

EXECUTE THE DECODED INSTRUCTION ACCORDING TO THE OPCODE
2007

COMMIT A RESULT OF THE EXECUTED INSTRUCTION
2009

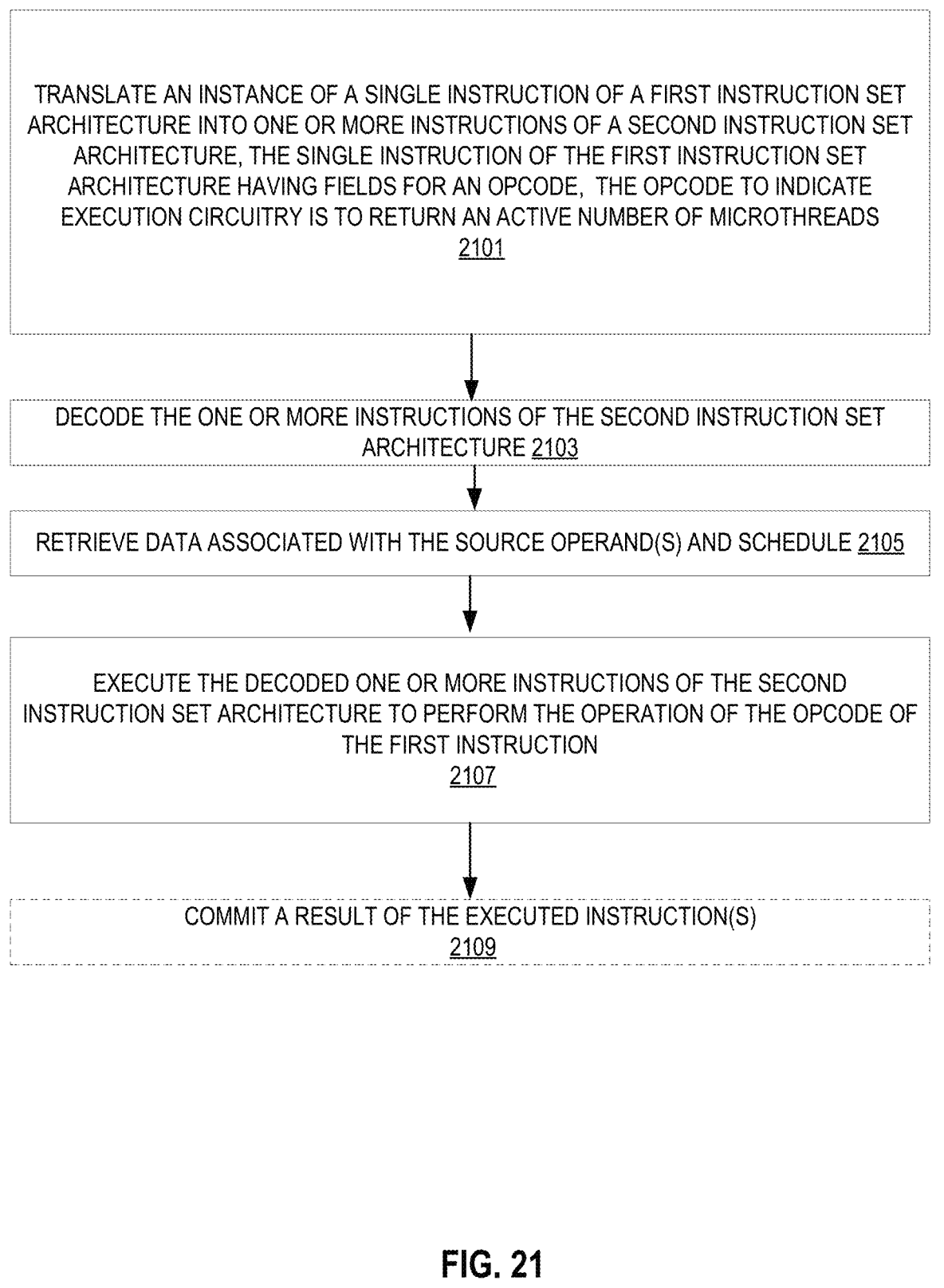

TRANSLATE AN INSTANCE OF A SINGLE INSTRUCTION OF A FIRST INSTRUCTION SET ARCHITECTURE INTO ONE OR MORE INSTRUCTIONS OF A SECOND INSTRUCTION SET ARCHITECTURE, THE SINGLE INSTRUCTION OF THE FIRST INSTRUCTION SET ARCHITECTURE HAVING FIELDS FOR AN OPCODE, THE OPCODE TO INDICATE EXECUTION CIRCUITRY IS TO RETURN AN ACTIVE NUMBER OF MICROTHREADS
2101

DECODE THE ONE OR MORE INSTRUCTIONS OF THE SECOND INSTRUCTION SET ARCHITECTURE 2103

RETRIEVE DATA ASSOCIATED WITH THE SOURCE OPERAND(S) AND SCHEDULE 2105

EXECUTE THE DECODED ONE OR MORE INSTRUCTIONS OF THE SECOND INSTRUCTION SET ARCHITECTURE TO PERFORM THE OPERATION OF THE OPCODE OF THE FIRST INSTRUCTION
2107

COMMIT A RESULT OF THE EXECUTED INSTRUCTION(S)
2109

FIG. 21

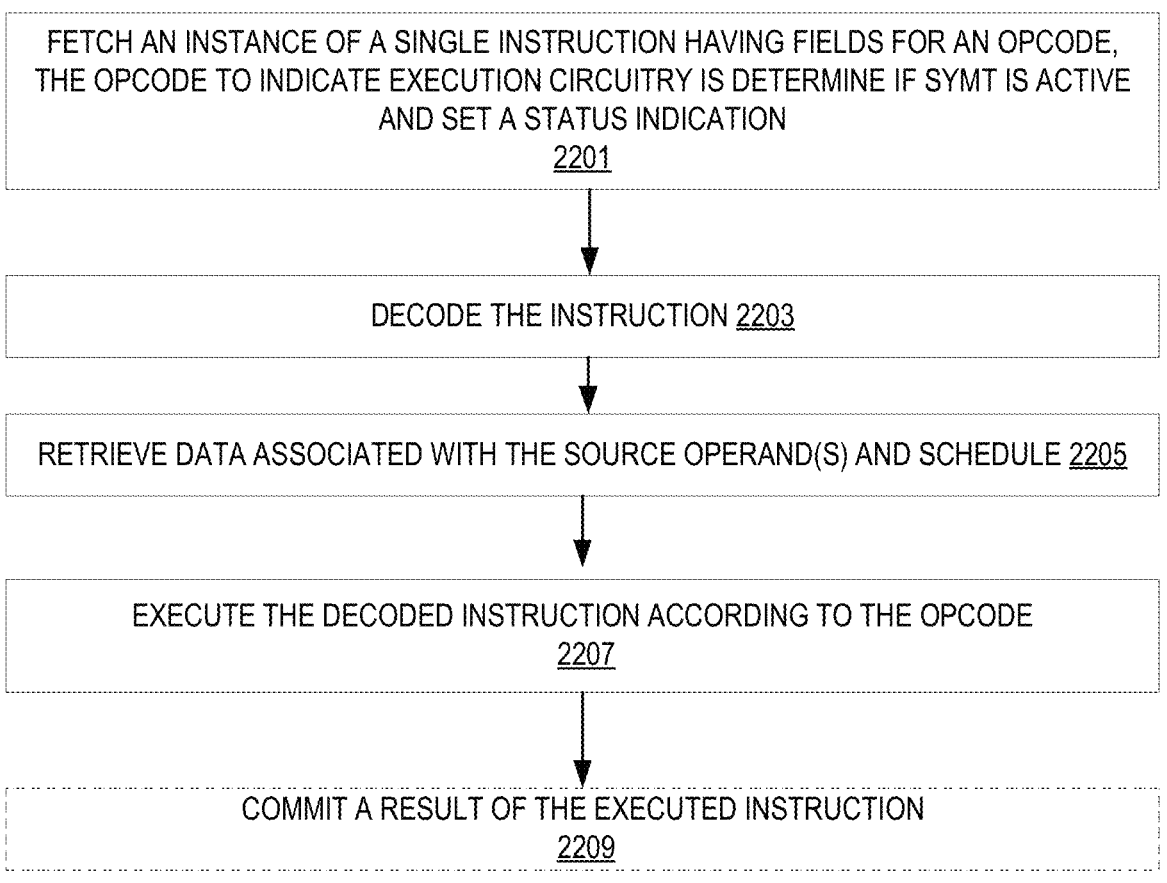

FETCH AN INSTANCE OF A SINGLE INSTRUCTION HAVING FIELDS FOR AN OPCODE, THE OPCODE TO INDICATE EXECUTION CIRCUITRY IS DETERMINE IF SYMT IS ACTIVE AND SET A STATUS INDICATION
2201

DECODE THE INSTRUCTION 2203

RETRIEVE DATA ASSOCIATED WITH THE SOURCE OPERAND(S) AND SCHEDULE 2205

EXECUTE THE DECODED INSTRUCTION ACCORDING TO THE OPCODE
2207

COMMIT A RESULT OF THE EXECUTED INSTRUCTION
2209

FIG. 22

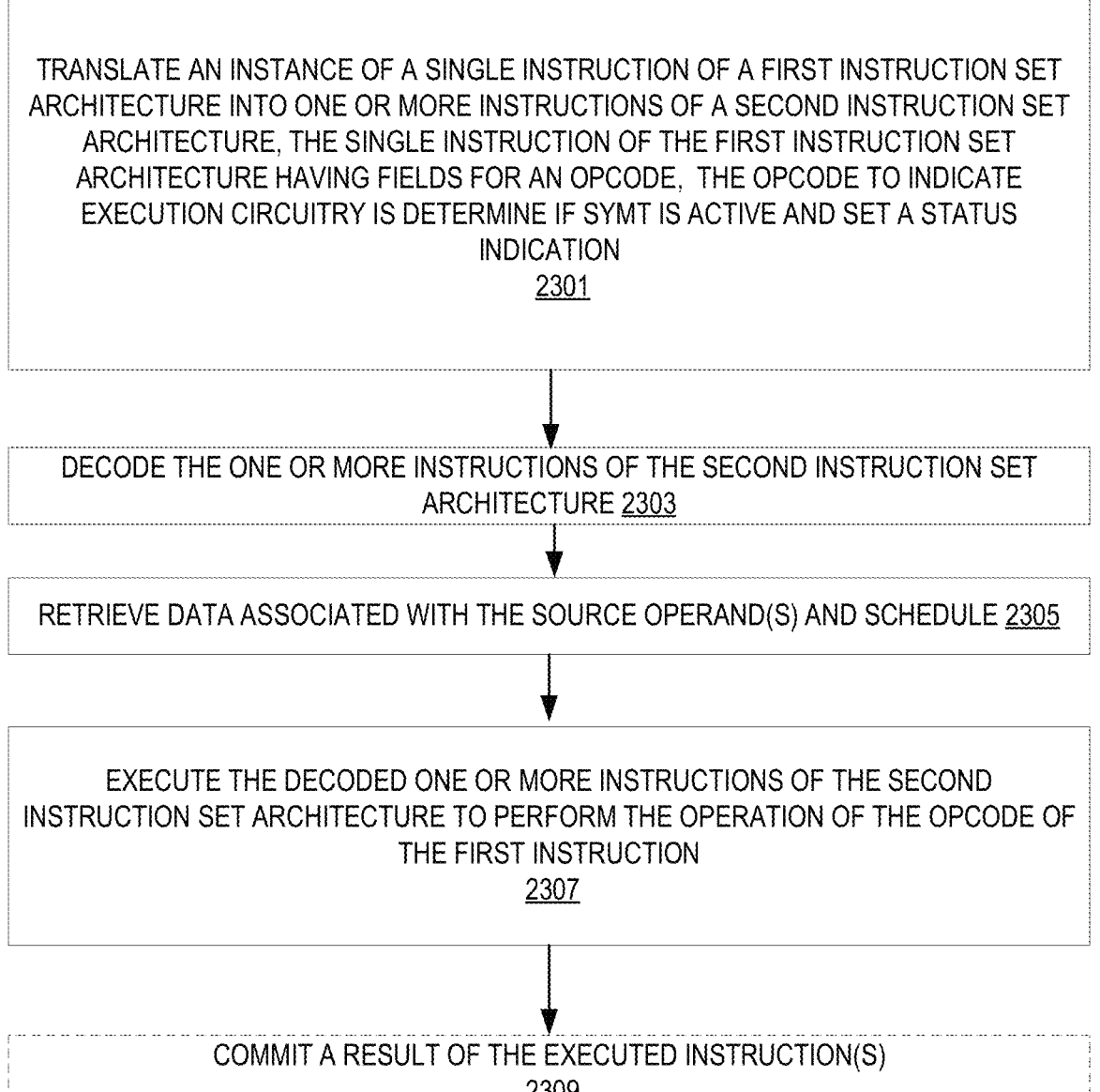

TRANSLATE AN INSTANCE OF A SINGLE INSTRUCTION OF A FIRST INSTRUCTION SET ARCHITECTURE INTO ONE OR MORE INSTRUCTIONS OF A SECOND INSTRUCTION SET ARCHITECTURE, THE SINGLE INSTRUCTION OF THE FIRST INSTRUCTION SET ARCHITECTURE HAVING FIELDS FOR AN OPCODE, THE OPCODE TO INDICATE EXECUTION CIRCUITRY IS DETERMINE IF SYMT IS ACTIVE AND SET A STATUS INDICATION
2301

DECODE THE ONE OR MORE INSTRUCTIONS OF THE SECOND INSTRUCTION SET ARCHITECTURE 2303

RETRIEVE DATA ASSOCIATED WITH THE SOURCE OPERAND(S) AND SCHEDULE 2305

EXECUTE THE DECODED ONE OR MORE INSTRUCTIONS OF THE SECOND INSTRUCTION SET ARCHITECTURE TO PERFORM THE OPERATION OF THE OPCODE OF THE FIRST INSTRUCTION
2307

COMMIT A RESULT OF THE EXECUTED INSTRUCTION(S)
2309

FIG. 23

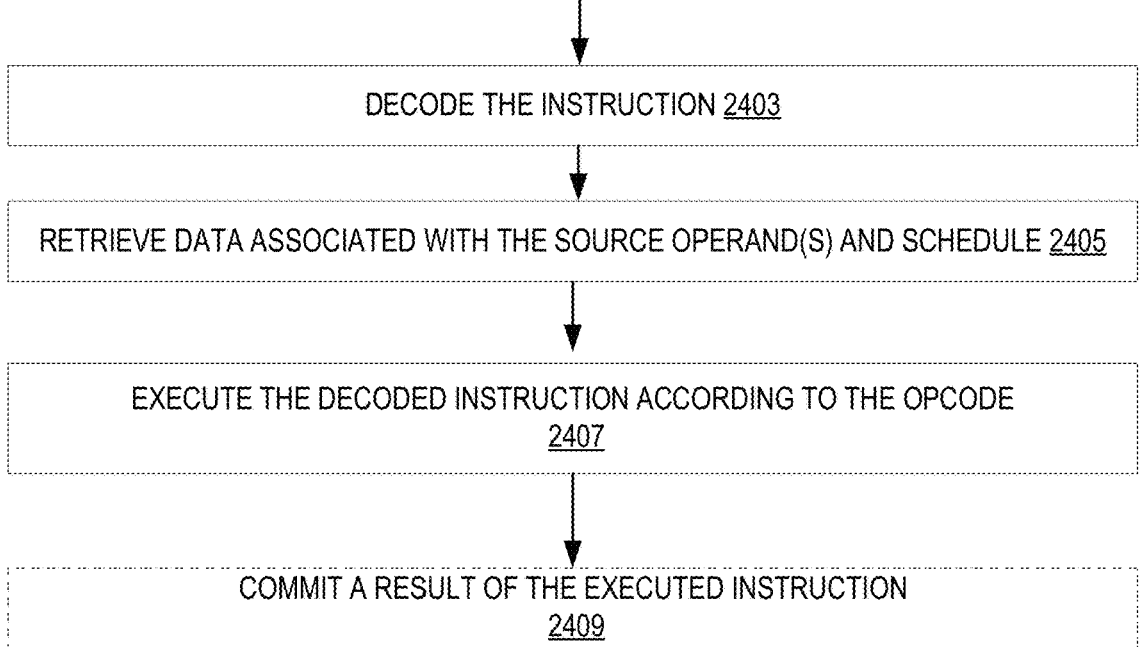

FETCH AN INSTANCE OF A SINGLE INSTRUCTION HAVING FIELDS FOR AN OPCODE, AND IN SOME EXAMPLES ONE OR MORE OF: ONE OR MORE FIELDS TO INDICATE A FIRST SOURCE OPERAND TO STORE A POINTER FOR A SYMT SAVE AREA, ONE OR MORE FIELDS TO INDICATE A SECOND SOURCE OPERAND TO STORE A MICROTHREAD ID, AND/OR ONE OR MORE FIELDS TO INDICATE A THIRD SOURCE OPERAND TO STORE AN ENUMERATION VALUE OF A STATE (COPY OF REGISTER DATA) TO BE ACCESSED, THE OPCODE TO INDICATE A READ OF A PARTICULAR MICROTHREAD'S STATE FROM THE SAVE STATE AREA 2401

DECODE THE INSTRUCTION 2403

RETRIEVE DATA ASSOCIATED WITH THE SOURCE OPERAND(S) AND SCHEDULE 2405

EXECUTE THE DECODED INSTRUCTION ACCORDING TO THE OPCODE 2407

COMMIT A RESULT OF THE EXECUTED INSTRUCTION 2409

FIG. 24

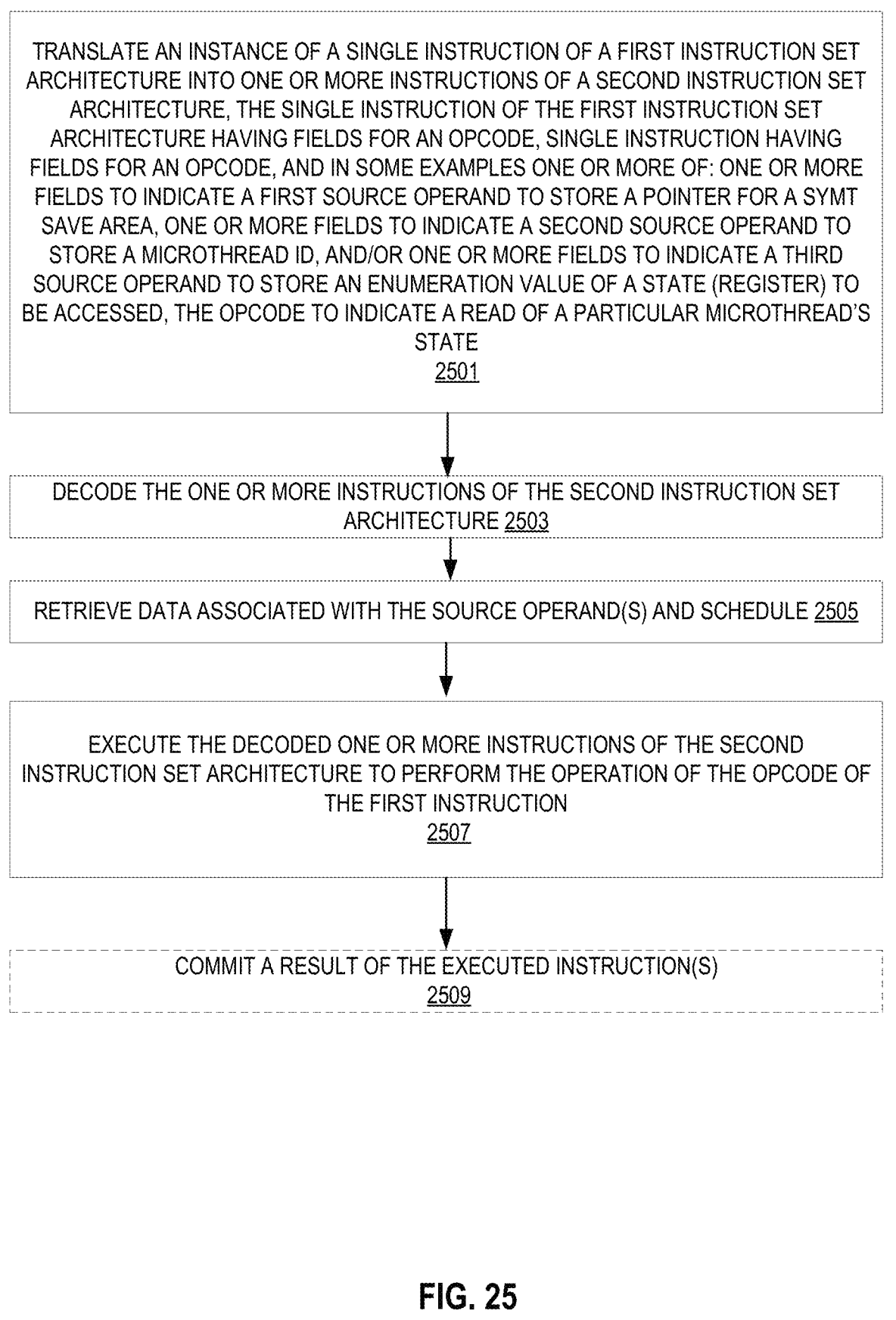

TRANSLATE AN INSTANCE OF A SINGLE INSTRUCTION OF A FIRST INSTRUCTION SET ARCHITECTURE INTO ONE OR MORE INSTRUCTIONS OF A SECOND INSTRUCTION SET ARCHITECTURE, THE SINGLE INSTRUCTION OF THE FIRST INSTRUCTION SET ARCHITECTURE HAVING FIELDS FOR AN OPCODE, SINGLE INSTRUCTION HAVING FIELDS FOR AN OPCODE, AND IN SOME EXAMPLES ONE OR MORE OF: ONE OR MORE FIELDS TO INDICATE A FIRST SOURCE OPERAND TO STORE A POINTER FOR A SYMT SAVE AREA, ONE OR MORE FIELDS TO INDICATE A SECOND SOURCE OPERAND TO STORE A MICROTHREAD ID, AND/OR ONE OR MORE FIELDS TO INDICATE A THIRD SOURCE OPERAND TO STORE AN ENUMERATION VALUE OF A STATE (REGISTER) TO BE ACCESSED, THE OPCODE TO INDICATE A READ OF A PARTICULAR MICROTHREAD'S STATE
2501

DECODE THE ONE OR MORE INSTRUCTIONS OF THE SECOND INSTRUCTION SET ARCHITECTURE 2503

RETRIEVE DATA ASSOCIATED WITH THE SOURCE OPERAND(S) AND SCHEDULE 2505

EXECUTE THE DECODED ONE OR MORE INSTRUCTIONS OF THE SECOND INSTRUCTION SET ARCHITECTURE TO PERFORM THE OPERATION OF THE OPCODE OF THE FIRST INSTRUCTION
2507

COMMIT A RESULT OF THE EXECUTED INSTRUCTION(S)
2509

FIG. 25

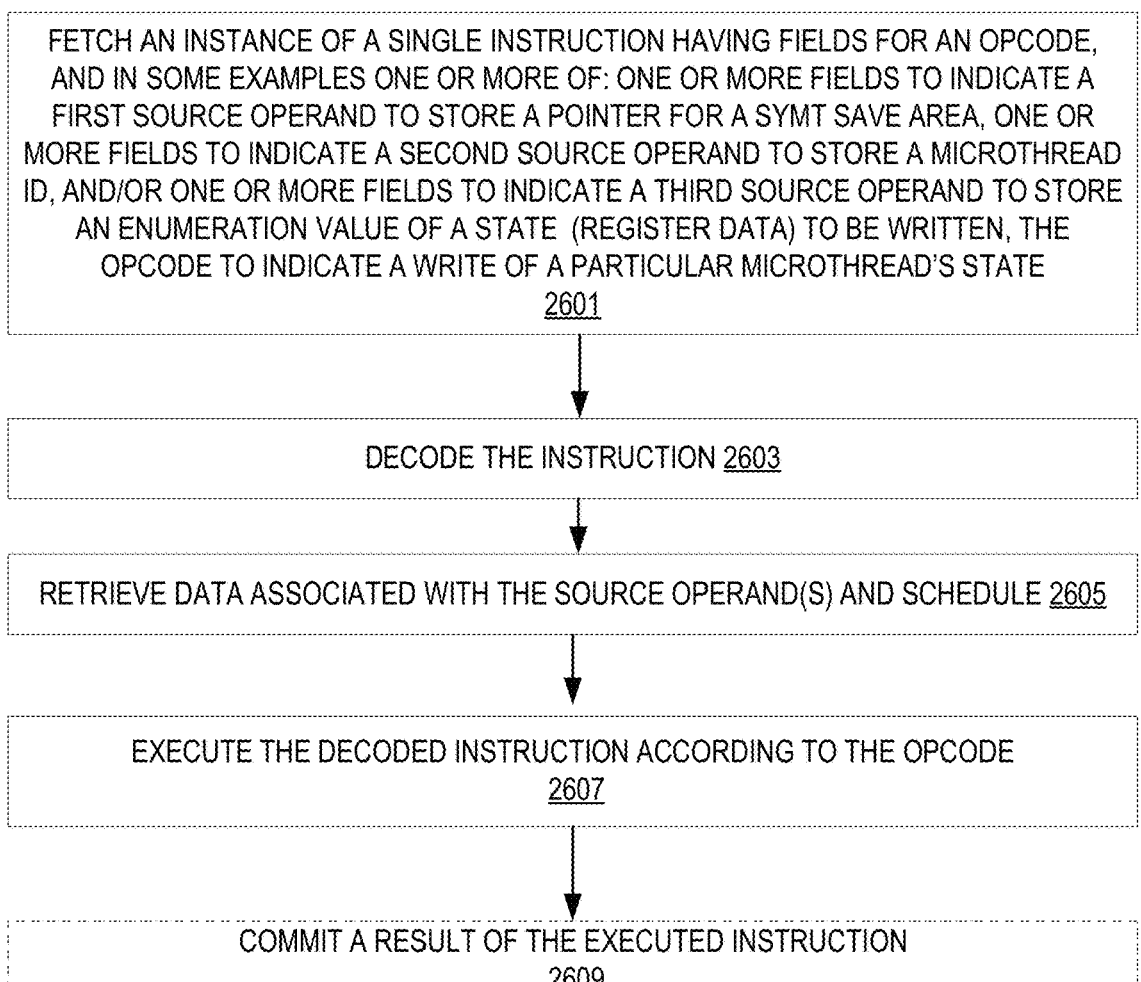

FETCH AN INSTANCE OF A SINGLE INSTRUCTION HAVING FIELDS FOR AN OPCODE, AND IN SOME EXAMPLES ONE OR MORE OF: ONE OR MORE FIELDS TO INDICATE A FIRST SOURCE OPERAND TO STORE A POINTER FOR A SYMT SAVE AREA, ONE OR MORE FIELDS TO INDICATE A SECOND SOURCE OPERAND TO STORE A MICROTHREAD ID, AND/OR ONE OR MORE FIELDS TO INDICATE A THIRD SOURCE OPERAND TO STORE AN ENUMERATION VALUE OF A STATE (REGISTER DATA) TO BE WRITTEN, THE OPCODE TO INDICATE A WRITE OF A PARTICULAR MICROTHREAD'S STATE
2601

DECODE THE INSTRUCTION 2603

RETRIEVE DATA ASSOCIATED WITH THE SOURCE OPERAND(S) AND SCHEDULE 2605

EXECUTE THE DECODED INSTRUCTION ACCORDING TO THE OPCODE
2607

COMMIT A RESULT OF THE EXECUTED INSTRUCTION
2609

FIG. 26

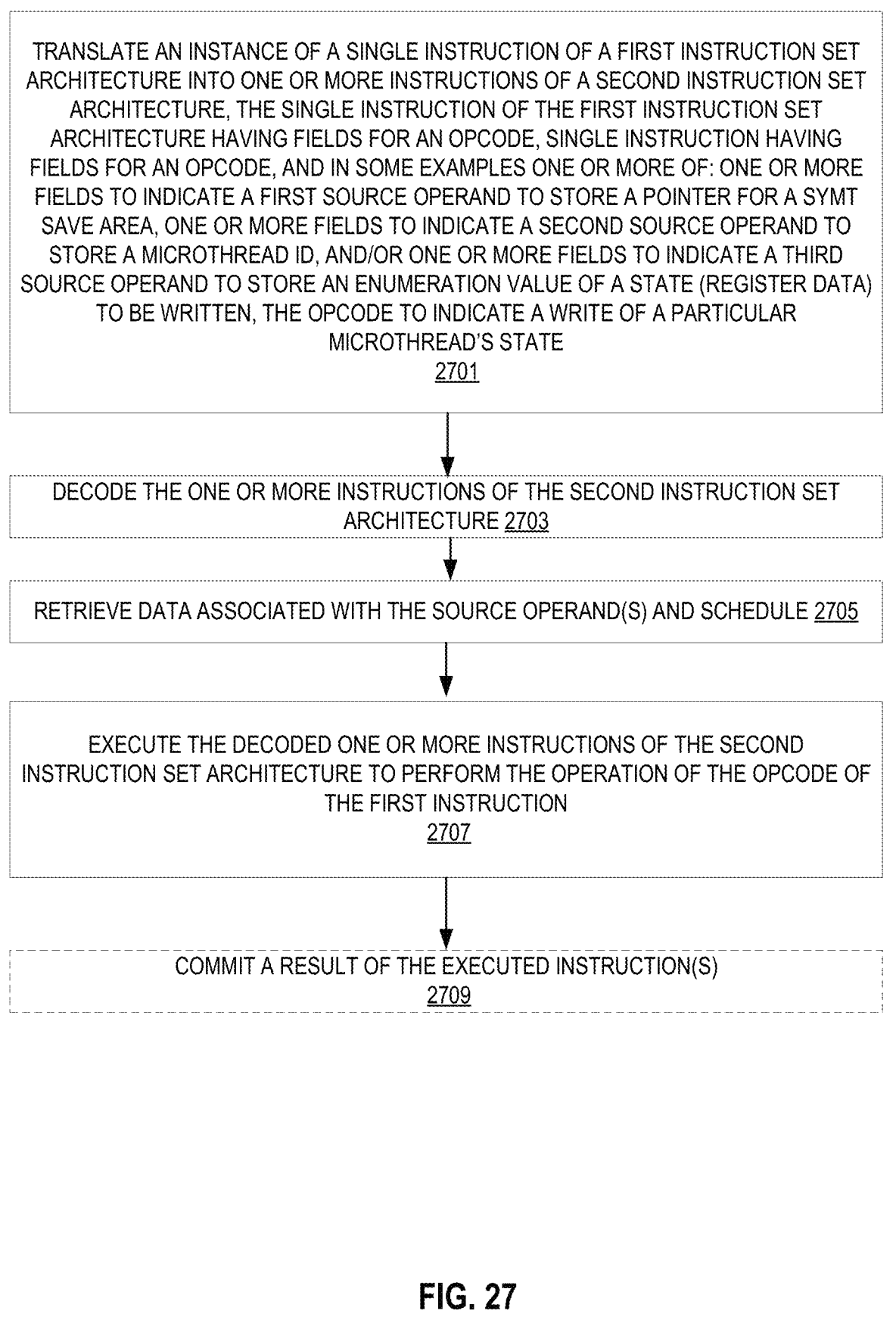

TRANSLATE AN INSTANCE OF A SINGLE INSTRUCTION OF A FIRST INSTRUCTION SET ARCHITECTURE INTO ONE OR MORE INSTRUCTIONS OF A SECOND INSTRUCTION SET ARCHITECTURE, THE SINGLE INSTRUCTION OF THE FIRST INSTRUCTION SET ARCHITECTURE HAVING FIELDS FOR AN OPCODE, SINGLE INSTRUCTION HAVING FIELDS FOR AN OPCODE, AND IN SOME EXAMPLES ONE OR MORE OF: ONE OR MORE FIELDS TO INDICATE A FIRST SOURCE OPERAND TO STORE A POINTER FOR A SYMT SAVE AREA, ONE OR MORE FIELDS TO INDICATE A SECOND SOURCE OPERAND TO STORE A MICROTHREAD ID, AND/OR ONE OR MORE FIELDS TO INDICATE A THIRD SOURCE OPERAND TO STORE AN ENUMERATION VALUE OF A STATE (REGISTER DATA) TO BE WRITTEN, THE OPCODE TO INDICATE A WRITE OF A PARTICULAR MICROTHREAD'S STATE
2701

DECODE THE ONE OR MORE INSTRUCTIONS OF THE SECOND INSTRUCTION SET ARCHITECTURE 2703

RETRIEVE DATA ASSOCIATED WITH THE SOURCE OPERAND(S) AND SCHEDULE 2705

EXECUTE THE DECODED ONE OR MORE INSTRUCTIONS OF THE SECOND INSTRUCTION SET ARCHITECTURE TO PERFORM THE OPERATION OF THE OPCODE OF THE FIRST INSTRUCTION
2707

COMMIT A RESULT OF THE EXECUTED INSTRUCTION(S)
2709

FIG. 27

VMCS 2926

GUEST-STATE AREA 3102

HOST-STATE AREA 3104

VM-EXECUTION CONTROL FIELDS 3106

VM-EXIT CONTROL FIELDS 3108

VM-ENTRY CONTROL FIELDS 3110

VM-EXIT INFORMATION FIELDS 3112

FIG. 31

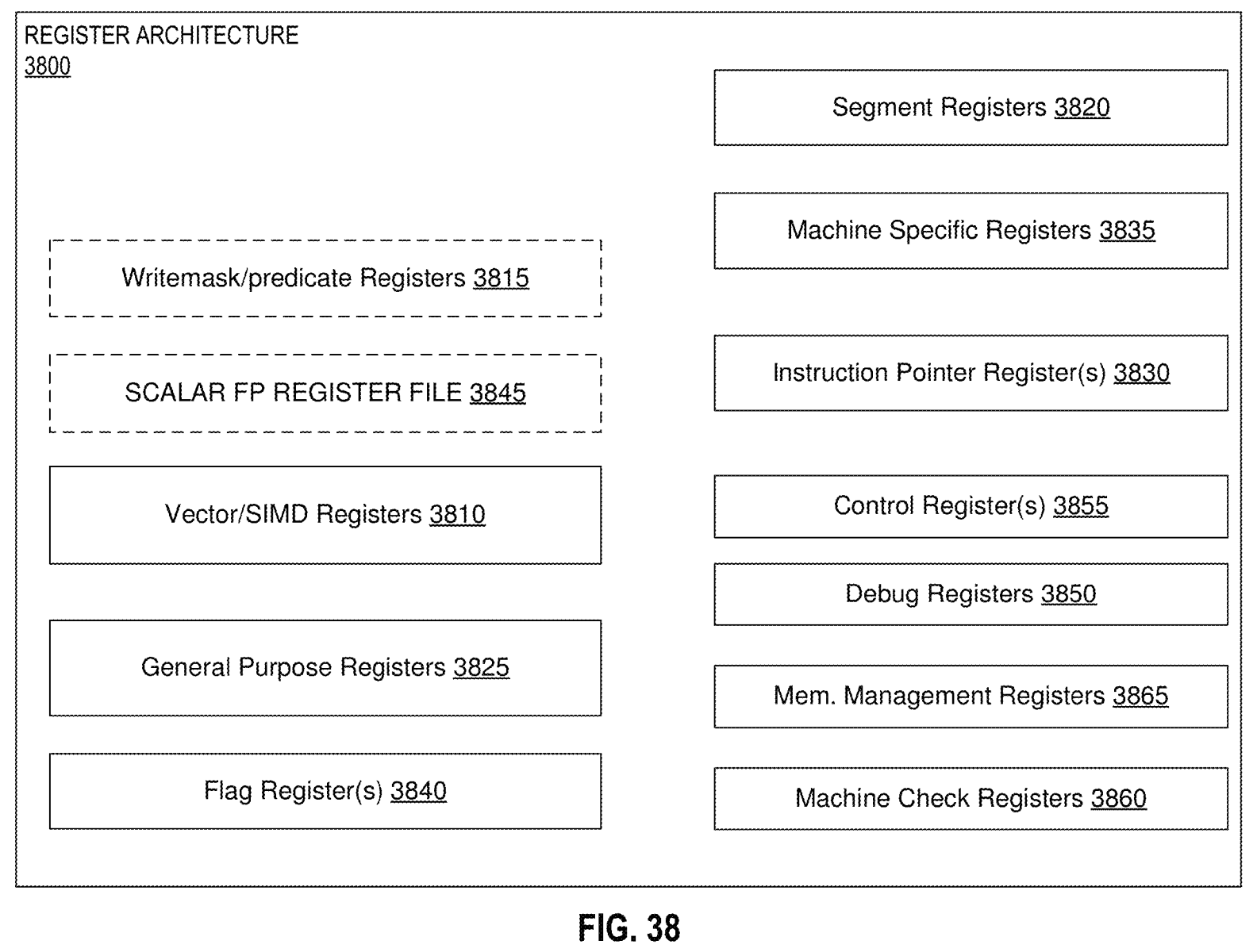

REGISTER ARCHITECTURE
3800

Segment Registers 3820

Machine Specific Registers 3835

Instruction Pointer Register(s) 3830

Control Register(s) 3855

Debug Registers 3850

Mem. Management Registers 3865

Machine Check Registers 3860

Writemask/predicate Registers 3815

SCALAR FP REGISTER FILE 3845

Vector/SIMD Registers 3810

General Purpose Registers 3825

Flag Register(s) 3840

FIG. 38

INSTRUCTION SET ARCHITECTURE SUPPORT FOR A LOAD GLOBAL POINTER INSTRUCTION

BACKGROUND

Task Parallelism refers to different program/tasks operating on different data on multiple compute elements. Data Parallelism (DP), on the other hand, refers to the same program or instruction operating on different pieces of data in parallel. If the parallel operation is at an instruction granularity, it is called Single Instruction Multiple Data (SIMD). If the parallel operation is at a program granularity, it is called Single Program Multiple Data (SPMD). SPMD is also referred to as Single Instruction Multiple Thread (SIMT) by some.

BRIEF DESCRIPTION OF DRAWINGS

Various examples in accordance with the present disclosure will be described with reference to the drawings, in which:

FIG. 9 illustrates an example of method performed by a processor to process a UTNTR instruction.

FIG. 10 illustrates an example of method to process a UTNTR instruction using emulation or binary translation.

FIG. 11 illustrates examples of pseudocode representing an execution of a UTNTR instruction.

FIG. 13 illustrates an example of method to process a UTRET instruction using emulation or binary translation.

FIG. 14 illustrates examples of pseudocode representing an execution of a UTRET instruction.

FIG. 16 illustrates an example of method to process a UTGETCNTXT instruction using emulation or binary translation.

FIG. 17 illustrates examples of pseudocode representing an execution of a UTGETCNTXT instruction.

FIG. 19 illustrates an example of method to process a UTGETGLB instruction using emulation or binary translation.

FIG. 21 illustrates an example of method to process a UTGETCURRACTIVE instruction using emulation or binary translation.

FIG. 22 illustrates an example of method performed by a processor to process a UTTST instruction.

FIG. 23 illustrates an example of method to process a UTTST instruction using emulation or binary translation.

FIG. 24 illustrates an example of method performed by a processor to process a SSAREAD instruction.

FIG. 25 illustrates an example of method to process a SSAREAD instruction using emulation or binary translation.

FIG. 26 illustrates an example of method performed by a processor to process a SSAWRITE instruction.

FIG. 27 illustrates an example of method to process a SSAWRITE instruction using emulation or binary translation.

FIG. 31 illustrates an example of a VMCS.

FIG. 38 is a block diagram of a register architecture according to some examples.

DETAILED DESCRIPTION

Figure 1:
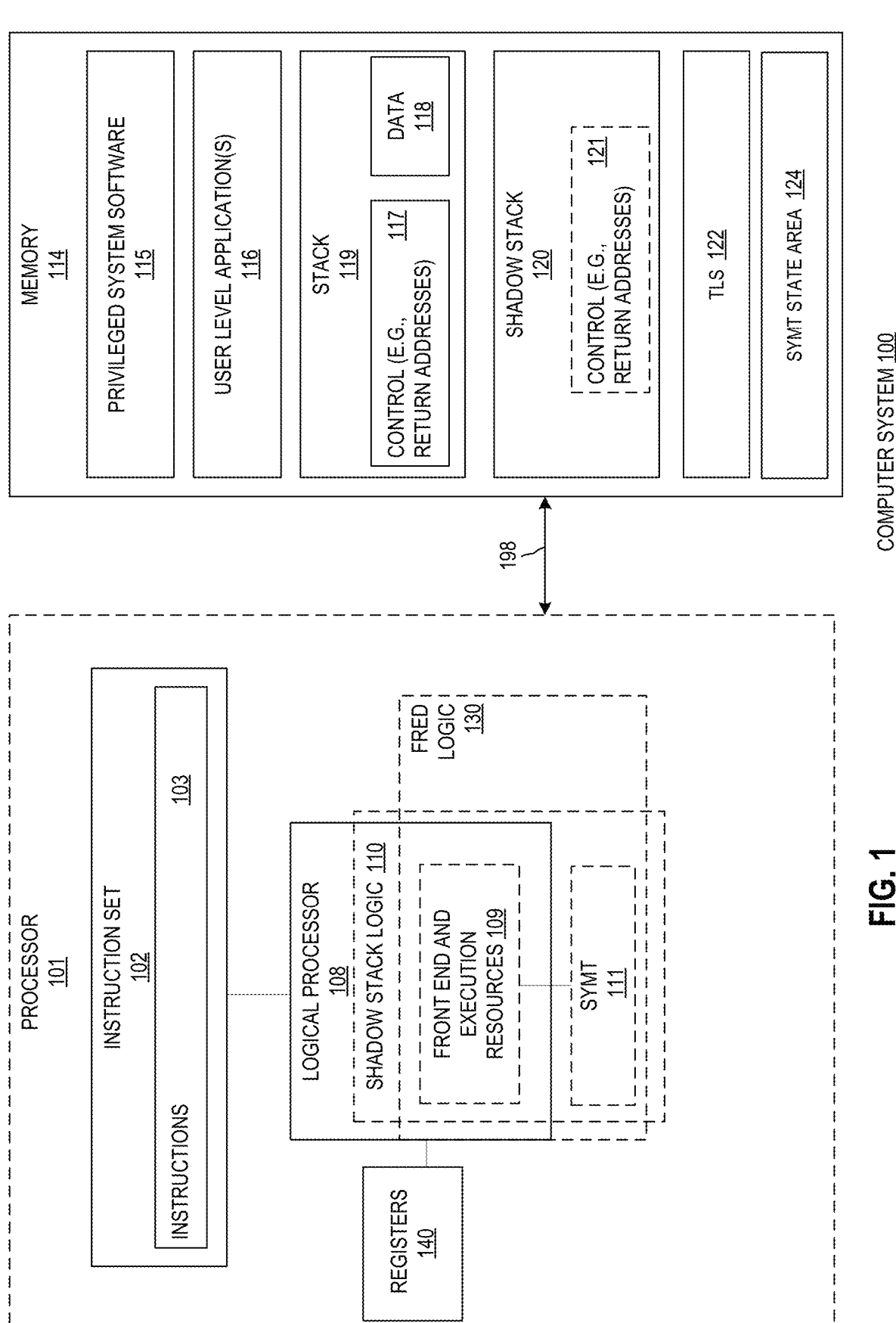
FIG. 1 is a block diagram of an example of a computer system in which various examples may be implemented.

The present disclosure relates to methods, apparatus, systems, and non-transitory computer-readable storage media to support Synchronous Microthreading (SyMT).

Modern out-of-order (OoO) processors have a lot of functional units, for good reason, but they are often idle—leaving performance "on the table." These microarchitectures allow for a great deal of parallelism to be found in "dusty deck" single-threaded workloads some of the time. However, many workloads will be unable to exploit all this hardware parallelism. DP workloads contain a mix of regular and irregular control and data flow. Some solutions are good at handling regular control, data flow, but either are unable to vectorize or perform poorly on DP workloads that have irregular control and data flow.

Existing solutions have one or more deficiencies. For example, SIMT-X does not touch on the offload mechanisms or architecturally visible components at all. GPGPU architectures assume a hetero architecture with a virtual ISA which cannot directly interact with the operating system (the parallel agent must have all events handled by a device driver). Interacting with the GPU through a device driver imposes a large overhead with some operations taking multiple microseconds to complete. These limitations in these kinds of GPGPU architectures prevent certain parallel codes from being accelerated on the parallel processor due to the overhead. They also preclude certain ways of building software (e.g., with multiple compilation units). Further, solutions such as spatial accelerators also do not have these above essential components. Spatial accelerators are not programmer and/or compiler friendly and would require hand tuning by expert programmers to see performance advantage over competition. Also, the ability of spatial accelerators to leverage existing parallel code (such as CUDA code) is unproven.

SyMT is a hardware/software technique designed greatly accelerate data-parallel applications. SyMT handles all kinds of DP including irregular control, data flow. SyMT allows the programmer the freedom to choose a method of specifying DP. SyMT uses scalar execution paths as a least unit of scaling and does not require the exposure of the machine's vector width to the architecture and/or the programmer. By decoupling the machine's vector width from the architecture, SyMT enables multiple vector-width implementations to co-exist in the same generation. For example, a first core type could have a smaller vector-width and second core type could have a bigger vector-width and core types can execute the same binaries. As such, SyMT handles several kinds of DP—regular control, data flow (such as dense SIMD) as well as irregular control flow (divergence) and irregular data flow (such as Sparse SIMD).

In SyMT a program flow is split into multiple program flows to be executed concurrently. In some examples, a slice of program flow is called an iteration. Examples of iterations are loops and parallel programming operations such as map or reduce. Iterations are mapped to microthreads either statically or dynamically using a software runtime. SyMT support (e.g., an accelerator (or other co-processor type) or a sub-portion of a core) binds one or more iterations to hardware microthreads. Each microthreads has its own independent copy of a register state.

However, microthreads, in some examples, share some system registers between themselves and also share control status registers (CSRs) and model specific registers (MSRs) with a host logical processor. In some examples, each microthread has its own control register which is to store a linear address for any page faults (e.g., a CR2 register).

SyMT allows fora new parallel programming model for codes to be statically parallelized but dynamically allow for reconvergence for efficient execution. It can be implemented on an out-of-order superscalar processor, or a dedicated coprocessor hardware unit for efficiency. The system handles offload and events in a low latency performant manner which maximizes the parallel codes that can be successfully accelerated.

SyMT upgrades the hardware-software contract with lightweight microthreads. This allows compilers, programmers, to expose fine-grained parallelism without the rigid constraints of a vector ISA while avoiding a zero-sum game by dynamically exploiting ILP, TLP, and/or DLP. SyMT scales performance with number of functional units, has a low overhead for starting microthreads, and can support other coprocessors.

SyMT technology accelerates data parallel workloads. This architecture may augment an instruction set architecture (ISA) with a scalar microthreaded abstraction which can be realized with different microarchitectures. SyMT can achieve higher instructions executed per clock with better energy consumed per operation than prior art on data-parallel workloads such as those detailed above.

With one instruction (microthread (uT) enter (described herein with the mnemonic "UTNTR") many microthreads are started. Microthreads signal completion by execution of an uT return (described herein with the mnemonic "UTNTR") instruction. In some examples, the launching processor stalls until the microthreads complete. In some examples, launching processor does not stall until the microthreads complete. Microthreads run user-level instructions but can take exceptions and perform system calls. The OS needs to be SyMT-aware.

SyMT provides a programmer with a scalar microthread abstraction with no architected divergence instructions or control codes. The abstraction provided to the programmer is based on lightweight threads that are not scheduled by the operating system existing in the address space. The primary benefits of the SyMT abstraction are: 1) flexibility—expose fine-grained or modest parallelism without the rigid constraints of a vector ISA; 2) portability—the binary runs on a machine with few computational resources or a machine with abundant computational resources; and/or 3) performance—hardware scheduled threads allows for lightweight parallel offload.

There are many different microarchitectures styles which could be used to support SyMT. This provides a very low latency offload and reuses the existing processor microarchitecture for an area-efficient implementation.

FIG. 1 is a block diagram of an example of a computer system 100 in which various examples may be implemented. The computer system 100 may represent a desktop computer system, a laptop computer system, a notebook computer, a tablet computer, a netbook, a portable personal computer, a smartphone, a cellular phone, a server, a network element (e.g., a router or switch), a smart television, a nettop, a set-top box, a video game controller, a media player, or another type of computer system or electronic device.

The computer system 100 includes a processor 101 and a memory 114. When deployed together in a system, the processor 101 and the memory 114 may be coupled with one another by an interconnection mechanism 198. The interconnection mechanism 198 may include one or more buses or other interconnects, one or more hubs or other chipset components, and combinations thereof. Various ways of coupling processors 100 with memories 114 known in the arts are suitable. Although the memory 114 is shown in FIG. 1, other examples pertain to the processor 101 alone not coupled with the memory 114 (e.g., is not deployed in a computer system 100). Examples of different types of memory include, but are not limited to, dynamic random-access memory (DRAM), flash memory, and other types of memory commonly used for main memory.

The processor 101 may provide at least two types of memory management: segmentation and paging. Segmentation provides a mechanism of isolating individual code, data, and stack modules so that multiple programs (or tasks) can run on the same processor without interfering with one another. Paging provides a mechanism for implementing a conventional demand-paged, virtual-memory system where sections of a program's execution environment are mapped into physical memory as needed. Paging can also be used to provide isolation between multiple tasks. When operating in protected mode (where a protected mode is a mode of processor operation in which segmentation is enabled and which is a prerequisite for enabling paging), some form of segmentation must be used. There is no mode bit to disable segmentation. The use of paging, however, is optional. These two mechanisms (segmentation and paging) can be configured to support simple single-program (or single-task) systems, multitasking systems, or multiple-processor systems that use shared memory. Segmentation provides a mechanism for dividing the processor's addressable memory space (called the linear address space) into smaller, protected address spaces called segments. Segments can be used to hold the code, data, and stack for a program or to hold system data structures (such as a task state segment (TSS) or local descriptor table (LDT)). If more than one program (or task) is running on the processor 101, each program can be assigned its own set of segments. The segmentation mechanism also allows typing of segments so that the operations that may be performed on a particular type of segment can be restricted. All the segments in a system are contained in the processor's linear address space.

Every segment register may have a "visible" part and a "hidden" part. (The hidden part is sometimes referred to as a "descriptor cache" or a "shadow register.") When a segment selector is loaded into the visible part of a segment register, the processor also loads the hidden part of the segment register with the base address, segment limit, and access control information from the segment descriptor pointed to by the segment selector. The information cached in the segment register (visible and hidden) allows the processor to translate addresses without taking extra bus cycles to read the base address and limit from the segment descriptor. In systems in which multiple processors have access to the same descriptor tables, it is the responsibility of software to reload the segment registers when the descriptor tables are modified. If this is not done, an old (e.g., stale) segment descriptor cached in a segment register may be used after its memory-resident version has been modified.

To locate a byte in a particular segment, a logical address (also called afar pointer) must be provided. A logical address consists of a segment selector and an offset. The segment selector is a unique identifier for a segment. The segment selector may include, for example, a two-bit requested privileged level (RPL) (e.g., bits 1:0), a 1-bit table indicator (TI) (e.g., bit 2), and a 13-bit index (e.g., bits 15:3). Among other things, it provides an offset into a descriptor table (such as the global descriptor table (GDT)) to a data structure called a segment descriptor.

Each segment has a segment descriptor, which specifies the size of the segment, the access rights and privilege level for the segment, the segment type, and the location of the first byte of the segment in the linear address space. The offset part of the logical address is added to the base address for the segment to locate a byte within the segment. The base address plus the offset thus forms a linear address in the processor's linear address space.

The memory 114 may store privileged system software 115. Examples of suitable privileged system software 115 include, but are not limited to, one or more operating systems, a virtual machine monitor (VMM), a hypervisor, and the like, and combinations thereof. The memory 114 may also store one or more user-level applications 116. The user-level applications 116 may optionally include one or more user-level multithreaded applications. As will be explained further below, such user-level multithreaded applications may optionally use instructions disclosed herein to help increase the efficiency of performing user-level multithreading and/or performing user-level task switches.

During operation, the memory 114 may also store a stack 119. The stack 119 is sometimes referred to as the call stack, the data stack, or just the stack. The stack 119 may represent a stack type data structure that is operative to store both data 118 and control 117. The data 118 may represent any of a wide variety of different types of data that software wants to push onto the stack (e.g., parameters and other data passed to subroutines, etc.). Commonly, the control 117 may include one or more return addresses for one or more previously performed procedure calls. These return addresses may represent instruction addresses where the called procedure is to return control flow to when the called procedure finishes and returns.

A stack 119 is a contiguous array of memory locations. It is contained in a segment and identified by the segment selector in a stack segment register (e.g., SS register). When using a flat memory model, the stack 119 can be located anywhere in the linear address space for the program. Items are placed on the stack 119 using the PUSH instruction and removed from the stack 119 using the POP instruction. When an item is pushed onto the stack 119, a stack pointer register (e.g., ESP) is decremented, and then the item is written at the new top of stack 119. When an item is popped off the stack 119, the item is read from the top of stack 119, then the stack pointer register is incremented. In this manner, the stack 119 grows down in memory (towards lesser addresses) when items are pushed on the stack 119 and shrinks up (towards greater addresses) when the items are popped from the stack 119. A program or operating system/ executive can set up many stacks 119. For example, in multitasking systems, each task can be given its own stack 119. The number of stacks 119 in a system is limited by the maximum number of segments and the available physical memory. When a system sets up many stacks 119, only one stack 119—the current stack—is available at a time. The current stack is the one contained in the segment referenced by the SS register. The current stack is the one referenced by the current stack-pointer register and contained in the segment referenced by the SS register.

A segment register may include a segment selector that is an identifier of a segment (e.g., a 16-bit identifier). This segment selector may not point directly to the segment, but instead may point to the segment descriptor that defines the segment.

The segment descriptor may include one or more of the following:

1) a descriptor type (S) flag—(e.g., bit 12 in a second doubleword of a segment descriptor) that determines if the segment descriptor is for a system segment or a code or data segment.

2) a type field—(e.g., bits 8 through 11 in a second doubleword of a segment descriptor) that determines the type of code, data, or system segment.

3) a limit field—(e.g., bits 0 through 15 of the first doubleword and bits 16 through 19 of the second doubleword of a segment descriptor) that determines the size of the segment, along with the G flag and E flag (for data segments).

4) a G flag—(e.g., bit 23 in the second doubleword of a segment descriptor) that determines the size of the segment, along with the limit field and E flag (for data segments).

5) an E flag—(e.g., bit 10 in the second doubleword of a data-segment descriptor) that determines the size of the segment, along with the limit field and G flag.

6) a Descriptor privilege level (DPL) field—(e.g., bits 13 and 14 in the second doubleword of a segment descriptor) that determines the privilege level of the segment.

A Requested privilege level (RPL) field in a selector specifies the requested privilege level of a segment selector.

A Current privilege level (CPL) indicates the privilege level of the currently executing program or procedure. The term CPL refers to the setting of this field.

The following are parts of a paging structure: a User/supervisor (U/S) flag—(e.g., bit 2 of paging-structure entries) that determines the type of page: user or supervisor; a Read/write (R/W) flag—(e.g., bit 1 of paging-structure entries) that determines the type of access allowed to a page: read-only or read/write; and an Execute-disable (XD) flag—(e.g., bit 63 of certain paging-structure entities) that determines the type of access allowed to a page: executable or non-executable.

In return-oriented programming (ROP), jump-oriented programming (JOP), and other control flow subversion attacks, the attackers often seek to gain control of the stack 119 to hijack program control flow. One factor that may tend to make the conventional data stack more vulnerable to ROP, JOP, and other control flow subversion attacks is that the stack 119 generally stores both the data 118 and the control 117 (e.g., data and return addresses are commonly mixed together on the same stack 119). Another factor that may tend to make the conventional stack 119 more vulnerable to such attacks is that switching of the stack 119 may generally be performed as an unprivileged operation. Both factors may tend to increase the exposure to control flow subversion due to bugs that allow the stack pointer and/or control flow information (e.g., return addresses) to be modified (e.g., to point to malware/attacker-controlled memory).

One or more shadow stacks 120 may be included and used to help to protect the stack 119 from tampering and/or to help to increase computer security. The shadow stack(s) 120 may represent one or more additional stack type data structures that are separate from the stack 119. As shown, the shadow stack(s) 120 may be used to store control information 121 but not data (e.g., not parameters and other data of the type stored on the stack 119 that user-level application programs 116 would need to be able to write and modify). The control information 121 stored on the shadow stack(s) 120 may represent return address related information (e.g., actual return addresses, information to validate return addresses, other return address information). As one possible example, the shadow stack(s) 120 may be used to store copies of any return addresses that have been pushed on the stack 119 when functions or procedures have been called (e.g., a copy of each return address in the call chain that has also been pushed onto the regular call stack). Each shadow stack 120 may also include a shadow stack pointer (SSP) that is operative to identify the top of the shadow stack 120. The shadow stack(s) 120 may optionally be configured for operation individually in unprivileged user-level mode (e.g., a ring 3 privilege level) or in a privileged or supervisor privilege level mode (a ring 0, ring 1, or ring 2 privilege level). In one aspect, multiple shadow stacks 120 may potentially be configured in a system, but only one shadow stack 120 per logical processor at a time may be configured as the current shadow stack 120.

As shown, the shadow stack(s) 120 may be stored in the memory 114. Current or active shadow stack(s) 120 may be defined by a linear address range to help detect and prevent stack overflow and/or stack underflow when push and/or pop operations are performed on the shadow stack 120. To help provide additional protection, the shadow stack(s) 120 may optionally be stored in a protected or access-controlled portion of the memory 114 to which the unprivileged user-level applications 116 have restricted and/or incomplete access. Different ways of providing suitable protected portions of memory 114 for storing the shadow stack(s) 120 are possible. The shadow stack(s) 120 are optionally stored in a portion of the memory 114 that is protected by paging access controls. For example, the privileged system software 115 (e.g., an operating system) may configure access permissions (e.g., read-write-execute access permissions) in page table entries corresponding to pages where the shadow stack(s) 120 are stored to make the pages readable but not writable or executable. This may help to prevent user-level instructions, such as store to memory 114 instructions, move to memory 114 instructions, and the like, from being able to write to or modify data in the shadow stack(s) 120. As another option, the shadow stack(s) 120 may optionally be stored in a portion of the memory 114 that is protected with similar access control protections as those used for secure enclaves in Intel® Software Guard Extensions (SGX) secure enclaves, or other protected containers, isolated execution environments, or the like.

Memory 114 may also store thread local storage (TLS) 122.

Referring again to FIG. 1, for example, the processor 101 may be a general-purpose processor (e.g., of the type commonly used as a central processing unit (CPU) in desktop, laptop, or other computer systems). Alternatively, the processor 101 may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor 101 may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

Registers 140 of processor 101 may be used by the logical processor 108, flexible return and event delivery ("FRED") logic 130, SMYT logic 111, and/or shadow stack logic 110. Note that the various logics 110, 111, and/130 may include circuitry, microcode, etc. These registers 140 may include the registers of FIG. 38. Examples of registers 140 of processor 101 include one or more of: flags storage (e.g., EFLAGS, RFLAGS, FLAGS, condition code registers, flags are stored with data, etc.), instruction pointer (e.g., EIP, RIP, etc.), current privilege level (CPL), stack pointer, shadow stack 120, control, model specific registers, segment registers (e.g., code segment (CS), data segment (DS), stack segment (SS), GS, etc.), etc. RFLAGS at least includes a trap flag (TF), interrupt enable flag (IF), and a resume flag (RF). Note that the registers 140 may be considered a part of the front end and execution resources 109 in some examples.

Processor 101 may have one or more instructions and logic to help manage and protect the shadow stack(s) 120. The processor 101 has an instruction set 102. The instruction set 102 is part of the instruction set architecture (ISA) of the processor 101 and includes the native instructions that the processor 101 is operative to execute. The instructions of the instruction set may represent macroinstructions, assembly language instructions, or machine-level instructions that are provided to the processor 101 for execution, as opposed to microinstructions, micro-operations, or other decoded instructions or control signals that have been decoded from the instructions of the instruction set.

As shown, the instruction set 102 includes several instructions 103 including one or more of: UTNTR, SSAWRITE, SSAREAD, CTGETCONTEXT, UTTST, UTRET, UTGETGBL, and/or UTACTV (described in detail below). A processor or a core may be provided to perform (e.g., decode and execute) any one or more of these instructions. Furthermore, a method of performing (e.g., decoding and executing) any one of these instructions is provided.

The processor 101 may include at least one processing element or logical processor 108. For simplicity, only a single logical processor is shown, although it is to be appreciated that the processor 101 may optionally include other logical processors. Examples of suitable logical processors include, but are not limited to, cores, hardware threads, thread units, thread slots, and other logical processors. The logical processor 108 may be operative to process instructions of the instruction set 102. The logical processor 108 may have a pipeline or logic to process instructions. By way of example, each pipeline may include an instruction fetch unit to fetch instructions, an instruction decode unit to decode instructions, execution units to execute the decoded instructions, registers to store source and destination operands of the instructions, and the like shown as front end and execution resources 109. The logical processor 108 may be operative to process (e.g., decode, execute, etc.) any of the instructions 103.

SyMT logic 111 provides support for a SyMT mode. In some examples, SyMT logic 111 includes microcode. In some examples, the SyMT microcode is coupled to, or included as a part of, decoder resources of the front end and execution resources 109. In some examples, SyMT logic 111 is an accelerator. Note this accelerator may be a part of a core, or external to the core.

Figure 2:
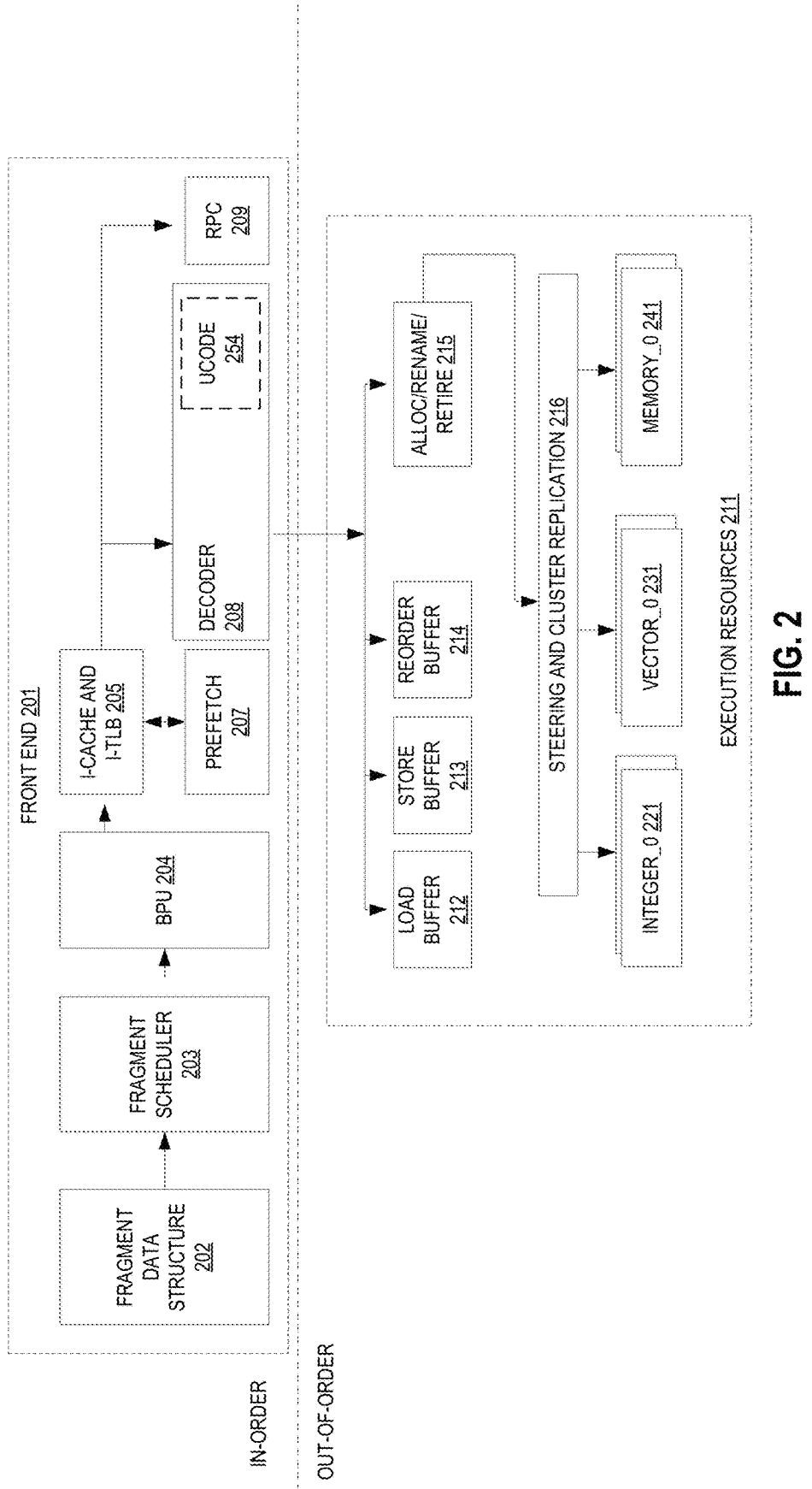
FIG. 2 illustrates examples of SyMT support.

FIG. 2 illustrates examples of SyMT support 111. Note that some aspects are shared with, or be a part of, front end and execution resources 109 in some examples. While FIG. 2 shows a grouping of front end 201 and execution resources 211 these groupings are merely illustrative.

A fragment data structure 202 tracks the program order of the various microthreads. A frag data structure 202 may be either speculative or non-speculative. Note that a fragment is a subset of a gang (including but not limited to all members of gang) over which the SyMT support 111 can amortize fetch, decode, allocation, dispatch, and/or retirement. In some examples, SyMT support 111 supports the ISA of the logical processor. In some examples, SyMT support 111 supports a proper subset of the ISA of the logical processor. These microthreads will share a program order of instruction in some subset of the overall control flow graph, going from at minimum a single basic block to at maximum the entire parallel region of the program. A gang is collection of microthreads that are guaranteed to execute concurrently. All microthreads in a gang should complete before another gang can be scheduled using their resources.

A fragment scheduler 203 provides fragment IDs, determines if there is to be a fragment switch, and provides a next linear instruction pointer (NLIP) to a branch prediction unit 204. The branch prediction unit 204 predicts branches for the SyMT support 111 during SyMT. An instruction cache and instruction TLB 205 stores instructions and instruction addresses.

Prefetcher circuitry 207 prefetches instructions and/or data. Decoder circuitry 208 decodes SyMT instructions such as at least some of the instructions that are detailed herein. For example, UTTST, UTCNTXT, UTRET, UTGETGBL, and UTACTV are instructions that are typically decoded and executed by SyMT support 111. UTNTR, SSAREAD, SSAWRITE are typically decoded and executed by the front end and execution resources 109 and/or the SyMT support 111. The decoder circuitry 208 also supports ISA instructions of the front end and execution resources 109 such as Boolean, memory, and arithmetic operations. In some examples, the clusters of integer execution units 221, vector execution units 231, and/or memory units 241 support at least a majority, if not all, such instructions of the front end and execution resources 109.

In some examples, the decoder 208 includes microcode (ucode) 254. In other examples, the microcode 254 is external to the decoder 208 When a UTRET instruction is executed, the microcode 254 determines the next state of the machine using the SyMT save area 124. After retiring a UTRET instruction, microcode 254 can either launch the next chunk of microthread work, if it's available, or return to single-threaded mode.

Replay protection circuitry 209 tracks duplicated requests incurred by the parallel processing of read requests and prevents duplicated operations from being executed more than once.

Allocate/rename/retirement circuitry 215 allocates resources for microops including renaming operands (logical to physical) and retires completed operations. Retirement of microops is done in program order. The Allocate/rename/retirement circuitry 215 allocates a reorder buffer (ROB) 214 that is an in-order buffer used to keep track of program order at retirement, a load buffer 212 to store loads until their target address has been determined, and a store buffer 213 for buffering store operations until they are retired.

Steering circuitry and cluster replication circuitry 216 steers the decoded, etc. instructions to the proper cluster for an execution unit type from the integer execution units 221, vector execution units 231, and/or memory units 241. This circuitry 216 also replicates operations (e.g., up to 8 times) for dispatch.

Figure 3:
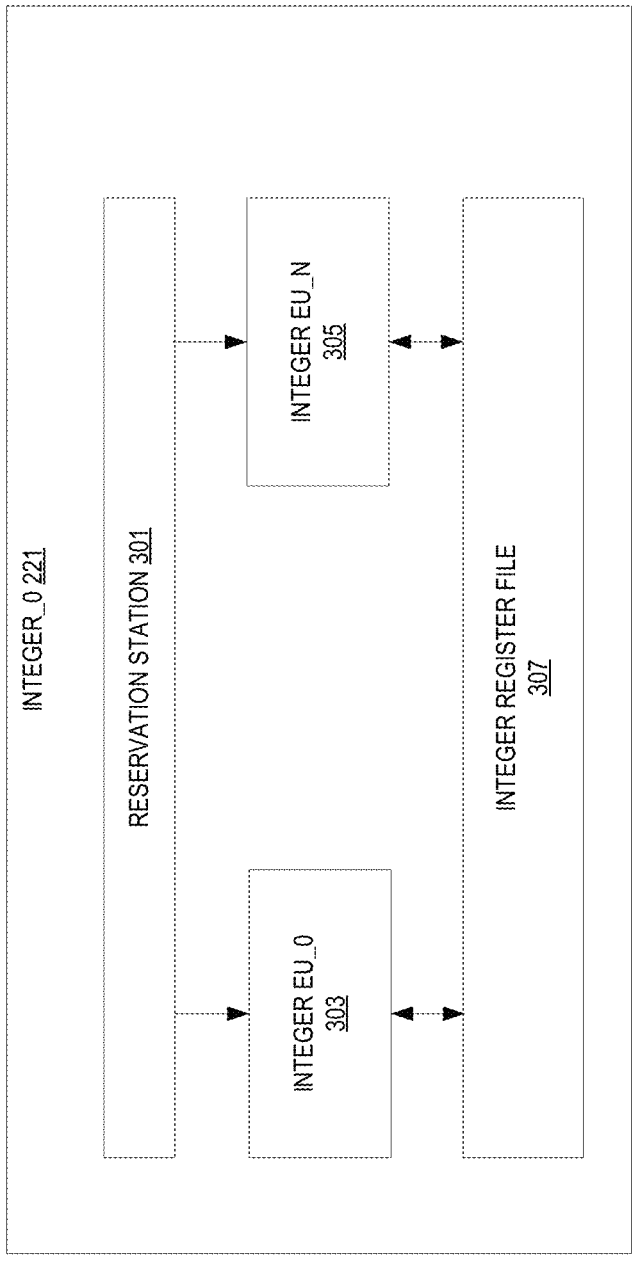
FIG. 3 illustrates examples of an integer cluster.

FIG. 3 illustrates examples of an integer cluster. Note that there may be a plurality of such clusters. In some examples, at least some of the clusters work in parallel.

As shown, an integer cluster 221 includes a reservation station 301, a plurality of integer execution units 303 . . . 305, and an integer register file 307. The reservation station 301 dispatches operations (such as microops) to one or more of the plurality of integer execution units 303 . . . 305. The reservation station 301 has a plurality of partitions each of which may be used to dispatch to a particular execution unit. The integer register file 301 includes the general-purpose registers used by the execution units. In some examples, execution flags carry (CF), parity (PF), align (AF), zero (ZF), sign (SF), and overflow (OF) stored with the data.

Figure 4:
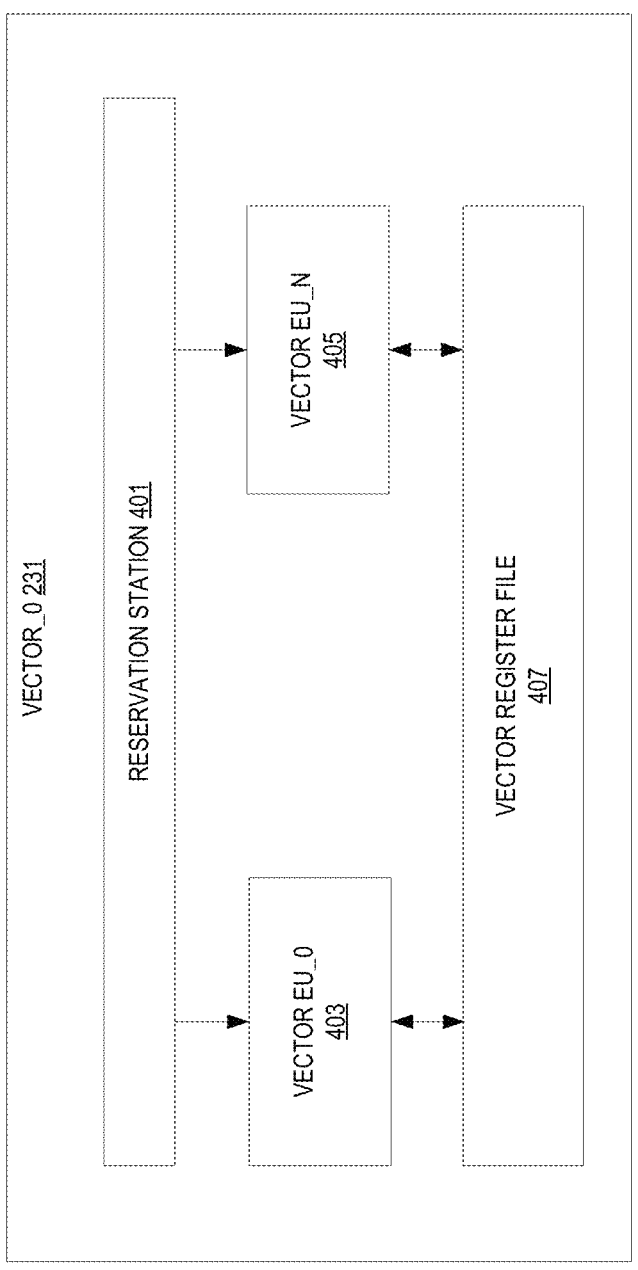
FIG. 4 illustrates examples of a vector cluster.

FIG. 4 illustrates examples of a vector cluster. In some examples, two integer clusters share a vector cluster. The exemplary vector cluster 231 shown includes a reservation station 401, a plurality of vector execution units 403 . . . 405, and a vector register file 407. Exemplary vector registers sizes include, but are not limited to: 64-bit, 128-bit, 256-bit, and 512-bit. The reservation station 401 dispatches operations (such as microops) to one or more of the plurality of vector execution units 403 . . . 405. The reservation station 401 has a plurality of partitions each of which may be used to dispatch to a particular execution unit. The integer register file 401 includes the vector registers used by the execution units.

Figure 5:
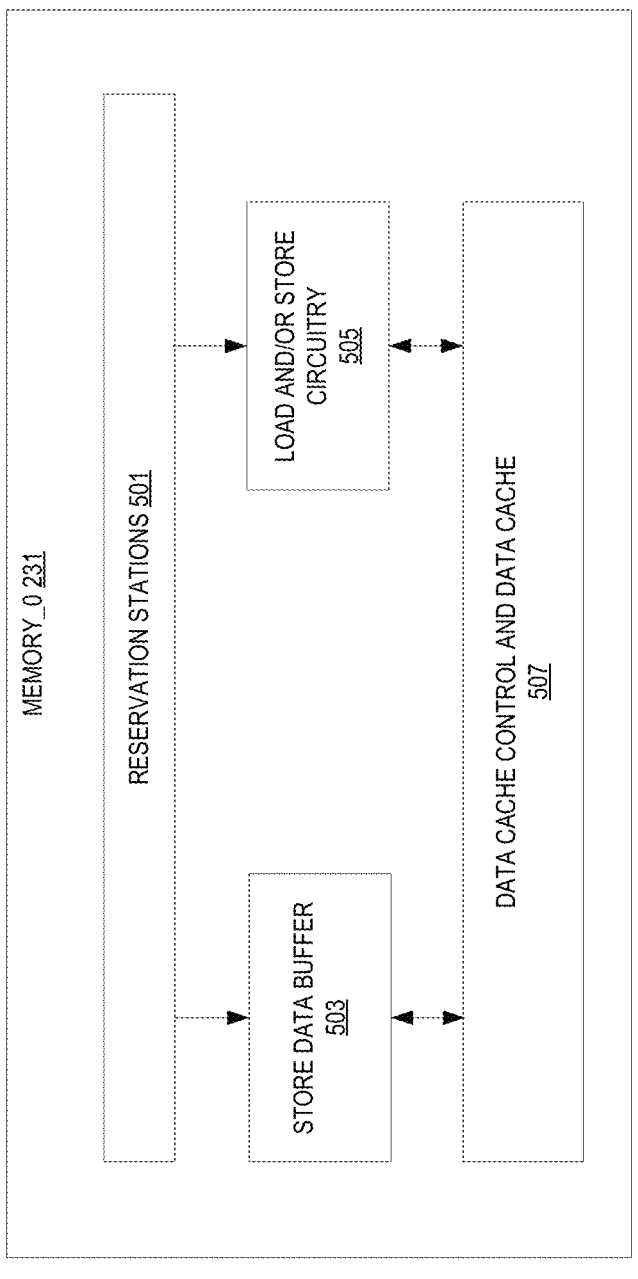
FIG. 5 illustrates examples of a memory cluster.

FIG. 5 illustrates examples of a memory cluster. The exemplary vector cluster 241 shown includes a reservation station 501, a store data buffer 503, load and store circuitry 505, and data cache and data cache control circuitry 507. The reservation stations 501 dispatch operations (such as microops) to the load and/or store circuitry 505. The store data buffer 503 tracks stored ordering. The reservation stations 401 has a plurality of partitions each of which may be used to dispatch to a particular execution unit. The data cache and data cache control circuitry 507 stores in and loads data from the data cache.

As shown, at least some of the logic of the at least one processing element or logical processor 108 may be part of FRED logic 130 of the processor 101. FRED logic 130 is dedicated circuitry. FRED logic 130 utilizes one or more state machines executed by execution units and/or a microcontroller. FRED logic 130 is responsible for delivering events and supporting FRED instructions. FRED logic 130 supports event delivery. An event that would normally cause IDT event delivery (e.g., an interrupt or exception) will instead establish new context without accessing any of the legacy data structures (e.g., IDT).

FRED logic 130 uses a stack level. The number of a stack is called its stack level. The current stack level (CSL) is value in the range 0-3 that the processor 101 tracks when CPL=0 and is the stack level currently in use. Note that the number of stack levels may vary from the four listed. FRED event delivery determines the stack level associated with the event being delivered and, if it is greater than the CSL (or if CPL had not been 0), loads the stack pointer from a FRED_RSP MSR associated with the event's stack level. A FRED return instruction (event return to supervisor or ERETS) restores the old stack level. (if supervisor shadow stacks 120 are enabled, the stack level applies also to the shadow-stack pointer, SSP, which may be loaded from a FRED_SSP MSR.)

The shadow-stack pointer detailed above includes a token-management mechanism to ensure shadow-stack integrity when switching shadow stacks 120. This mechanism uses locked read-modify-write operations that may affect worst-case performance adversely. FRED logic 130 uses a modified token-management mechanism that avoids these operations for most transitions. This new mechanism is supported by defining new verified bits in the FRED_SSP MSRs.

The registers 140 may include several model specific registers (MSRs).

Figure 6:
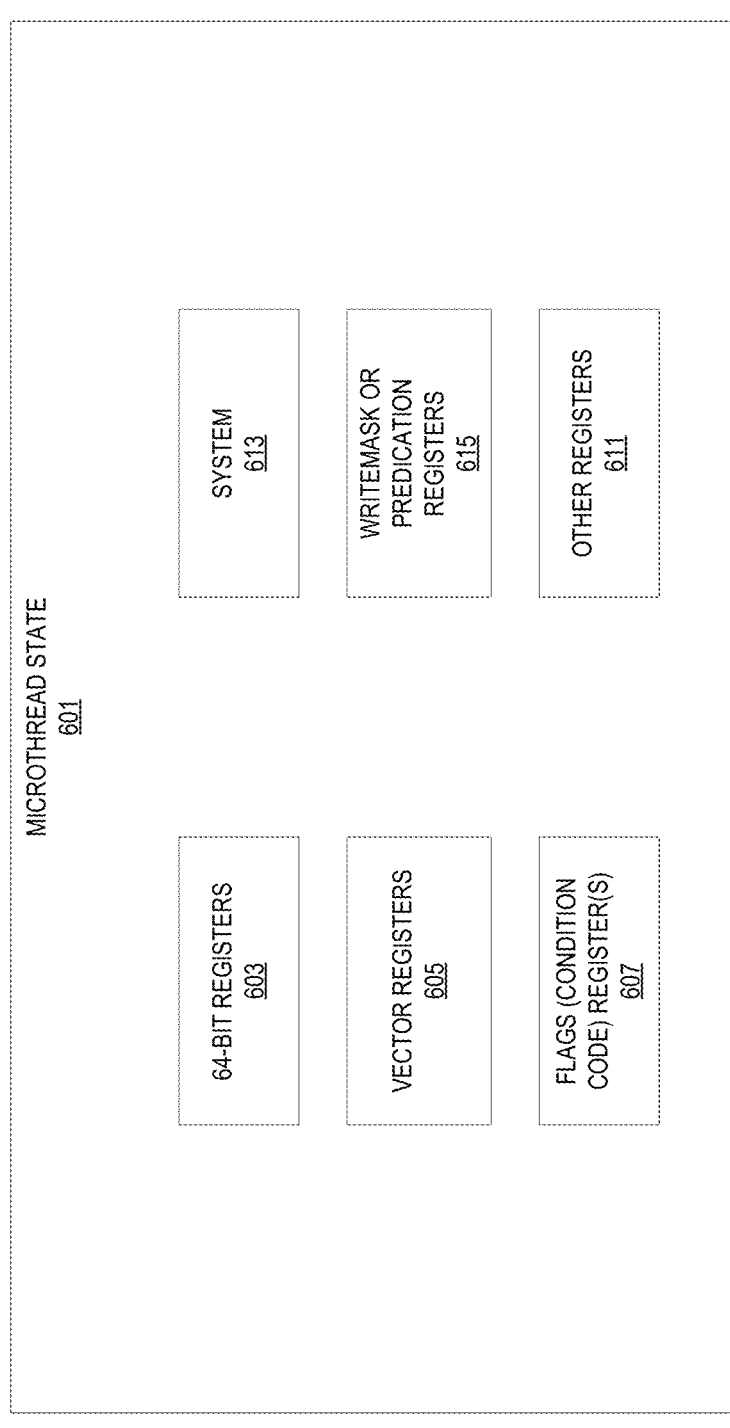
FIG. 6 illustrates examples of a microthread state.

Memory 114 may also be used to store a SYMT state area 124. The SyMT save area 124 includes information for either handling a restartable exception or diagnosing a terminal exception. The SYMT state area 124 includes an in-memory representation of one or more microthread's state. FIG. 6 illustrates examples of a microthread state 601. For example, the SyMT state 601 includes values of general purpose registers (GPRs) 603, vector/SIMD registers (e.g., 128-bit, 256-bit, etc.) 605, mask and/or predication registers (e.g., K0 through K7) 615, one or more flag (or condition code) register(s) 607, and at least some system and/or control registers (e.g., CR2, FS.base, GS.base, error code, RIP, MXCSR etc.) for each microthread. Other registers 611 may also be included as non-microthread specific registers such as a register to indicate SyMT faults, a register to store the SyMT version used, a register to store a number of microthreads, a register to store an indicate of SyMT status, etc. An operating system ("OS") reads and writes fields in the SyMT state area 124 to support exceptions, traps, and other OS-related tasks.

Some examples of the SyMT state area 124 usage utilize a model-specific register (MSR) to point to the location in memory where the state area exists. In some examples, every process using SyMT mode allocate a per logical processor, page aligned region of physical memory to store the SyMT save area 124. This memory can be allocated either when a new OS thread is created, through a system call, or lazily allocated when SyMT is first used. The state area 124 could be in either virtual memory or physical memory.

Using physical memory would not require the OS to "pin" the virtual-to-physical translations in the page table; however, it would make add additional complexity to support a virtualized implementation of SyMT.

It is the responsibility of the system software to update a MSR (e.g., MSR SYMT SAVE) upon a context switch. In some examples, one SyMT save area 124 exists per logical processor and the behavior is not defined if multiple logical processors share the same SyMT save area 124.

Figure 7:
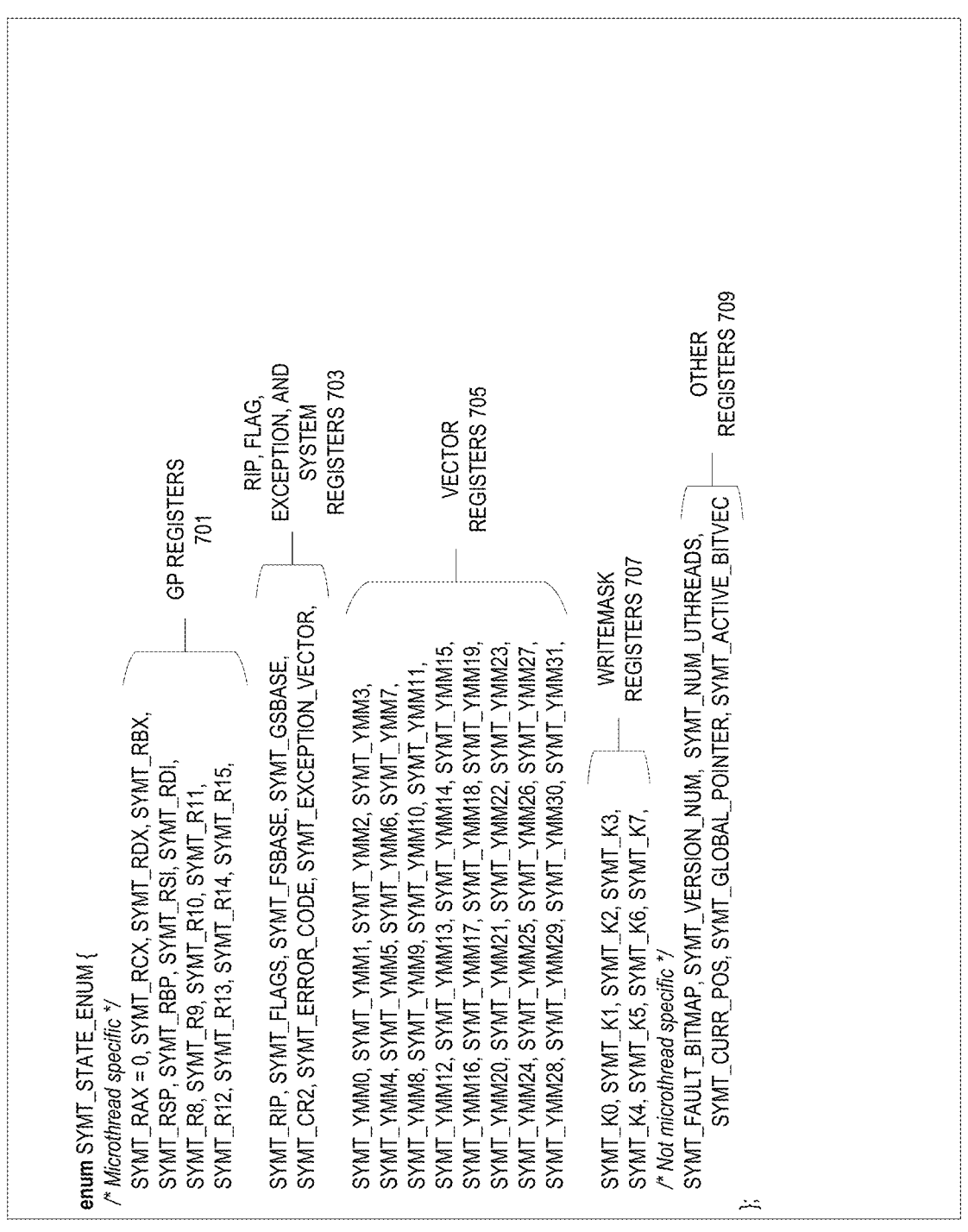
FIG. 7 illustrates examples of an enumeration of a SyMT state area.

FIG. 7 illustrates examples of an enumeration of a SyMT state area. As shown, the enumeration has microthread specific enumerations for GP registers 701, flag and system registers 703, vector registers 705, writemask registers 707, and other registers 709.

The sizes of each of these registers may also be enumerated. Software can index SyMT state enumeration sizes array with the state enumeration value to lookup how many bytes of memory are required to store a given state element. For example, SYMT STATE ENUM SIZES[SYMT RAX] will return 8 as the size of RAX is 8 bytes.

Figure 8:
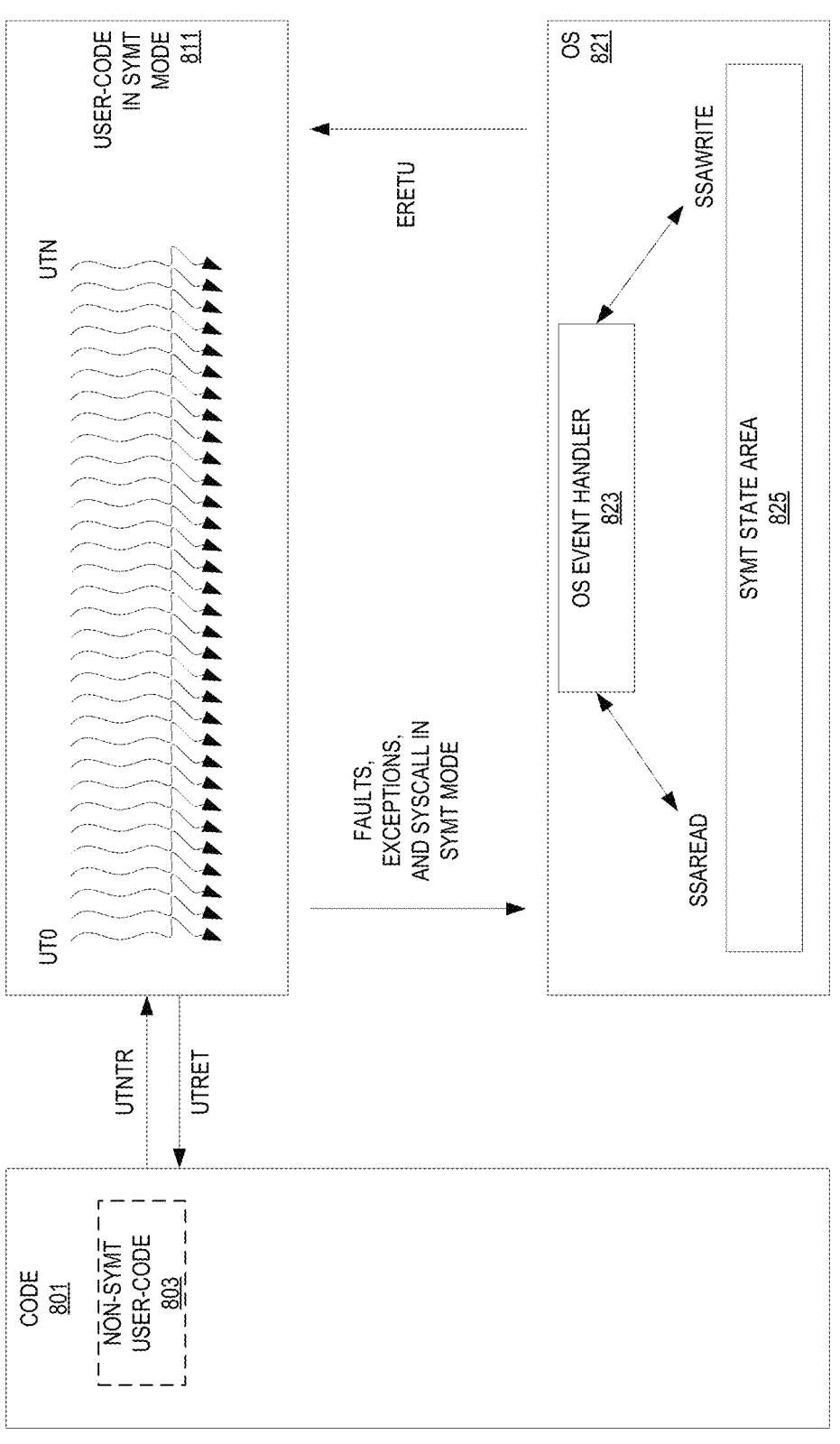
FIG. 8 illustrates examples of SyMT usage.

FIG. 8 illustrates examples of SyMT usage. Code 801 includes non-SyMT user code 803. At some point, the user code non-SyMT user code 803 includes a UTNTR instruction to entire SyMT mode which offloads work to microthreads (shown as UT0 . . . UTN) that are a part of user-code in SyMT mode 811. In some examples, the initial microthread state is zero for all GPRs (with RIP set by UTNTR) that is no GPR or vector state is passed.

As shown, a UTNTR instruction of the non-SyMT usercode 803 causes SyMT mode to run and exits upon execution of one or more associated UTRET instructions (typically). However, some events may cause the processor to abnormally exit SyMT mode and generate exceptions or faults. In some embodiments, each microthread executes a UTRET instruction when complete and the final microthread's execution of a UTRET instruction causes the SyMT mode to exit.

Microthreads can generate exceptions/faults/system calls. When exception/fault/system call occurs microthread execution stops, all microthread states are saved the SyMT state area 825, and a SyMT event type is delivered to the host non-SyMT user-code 803 thread. In some examples, physical registers come from the same pool as normal scalar execution and have to be released for exception handling to occur.

The operating system 821 queries the per-microthread sub fault code to handle a specific fault (e.g., #PF). For the OS event handler 823 to read or write to the SyMT state area 825 instructions such as SyMT save area (SSA) read (described herein by the mnemonic SSAREAD) and SSA write (described herein by the mnemonic SSAWRITE) are used. Examples of these instructions are detailed later. An event return to user instruction (ERETU) is used by the OS 821 to reenter SyMT mode 811. A physical address of the SSA is stored in a MSR (e.g., SyMT_SSA). A size of the SyMT
depends on the number of microthreads used and supported
ISA features. In some examples, there is one SSA per logical
processor.

In some examples, there are a plurality of microthread exit
conditions. These conditions include one or more of: 1) all
microthreads have completed via UTRET (when this occurs,
execution continues in host mode at the instruction that
follows the UTNTR instruction); 2) there is a fault/exception
on at least one microthread (when this occurs, execution
continues in host mode in supervisor mode and a SyMT
event type is provided); 3) at least one microthread executes
a system call (when this occurs, execution continues in host
mode in supervisor mode at the system call handler); 4) a
machine condition asynchronously stops microthread execu-
tion (e.g., an external interrupt) (when this occurs, execution
will continue in supervisor mode on the launching host
thread and the event will be conventionally handled); and/or
5) UTNTR instruction faults during start-up (when this
occurs, execution continues in host mode in supervisor
mode with a #SYMT exception set).

SyMT Instructions

FIG. 9 illustrates an example of method performed by a
processor to process a UTNTR instruction. For example, a
processor core as shown in FIG. 36(B), a pipeline as detailed
below, etc. or SyMT logic 111 performs this method. The
UTNTR instruction starts execution of microthreads syn-
chronously to the host thread. Specifically, the launching
host thread stalls until an exit or termination condition
occurs. When a termination condition occurs, all micro-
threads stop execution. In some examples, the UTNTR
instruction is restartable using the state saved in the SyMT
state area. In some examples, UTNTR also sets some aspects
of the SyMT state area such as a global pointer, instruction
pointer, etc.

At 901, an instance of single instruction is fetched. For
example, an UTNTR instruction is fetched. The single
instruction having fields for an opcode, and in some
examples, one or more of: one or more fields to indicate a
first source operand to provide an instruction pointer, one or
more fields to indicate a second source operand to provide
a second pointer, one or more fields to indicate a third source
operand to provide a count value, wherein the opcode is to
indicate execution circuitry is to attempt an entry into a
microthread execution. In some examples, one or more of
the source operands are implicitly referenced.

An example of a format for an UTNTR is UTNTR SRC1,
SRC2, SRC3. In some examples, UTNTR is the opcode
mnemonic of the instruction and is embodied in the opcode
field 3903. SRC1, SRC2, and SRC3 are fields for the sources
such as packed data registers and/or memory. These sources
may be identified using addressing field 3905 and/or
prefix(es) 3901. In some examples, the UTNTR instruction
uses the second prefix 3901(B) or third prefix 3901(C) that
are detailed later. For example, in some examples, REG
4044, R/M 4046, and VVVV from byte 1 4305, byte 2 4317,
or payload byte 4417 are used to identify respective sources.

As such, examples of the UTNTR instruction may use
three arguments the instruction pointer where thread execu-
tion begins, a pointer to a global argument, and a count.
Typically, these arguments are passed into the UTNTR
instruction as 64-bit registers. The instruction pointer is a
pointer to the code where microthread execution begins and
the global argument pointer is a generic pointer for use by the programmer. Any state passed from the host thread to the
microthreads is provided via the global argument pointer.

In some examples, the relationship between the UTNTR
count argument and the underlying hardware supported
number of microthreads is as follows—the SyMT logic 111
microcode will iterate up to the count argument by the
number of supported microthreads on a given implementa-
tion. The count argument may be larger than supported
number of microthreads and when this happens, there is no
guarantee of concurrency. If concurrency is required for
correctness, software must ensure the count argument is
equal to the number of hardware supported microthreads.
Software should use CPUID or other function with the
appropriate arguments to query the hardware supported
number of microthreads for a given implementation. In
some examples, counts are related to algorithmic loops
which are iteration spaces that a programmer wants paral-
lelized as defined by an application. In some examples, the
UTNTR iteration space is from 8 to 1,024. The uthread
iteration space is from 1 to 32 (uarch dependent) (this is
found in SYMT_UTHREADS in some examples).
UTACTV is the number of uthreads in a gang. When
migrating from normal execution to SyMT, the SyMT
restores a fraction of the SSA uthreads and runs them
concurrently for a time slice. It saves them to the SSA and
restores some of the remaining uthreads from the SSA, and
round robins between them in this manner until all uthreads
in the SSA complete.

The fetched instance of the single instruction is decoded
at 903.

Data values associated with the source operands of the
decoded instruction are retrieved and the decoded instruc-
tion is scheduled at 905. For example, when one or more of
the source operands are memory operands, the data from the
indicated memory location is retrieved.

At 907, the decoded instruction is executed by execution
circuitry (hardware) such as that detailed herein. For the
UTNTR instruction, the execution will cause execution
circuitry to perform an attempt of an entry into a microthread
execution (if possible). In some examples, microthread
execution entry comprises using an accelerator.

In some examples, when the UTNTR instruction
executes, a check (e.g., by microcode) is made of if the
SyMT save area is properly configured. If it is not properly
configured (e.g., as indicated in a SSA header), the UTNTR
instruction will fail and signal the #SYMT exception code
with a specific fault subcode to describe exactly why the
UTNTR instruction failed. The host register state visible at
the time of an exception is the host register state at the time
of the UTNTR instruction. UTNTR reports non-fatal errors
and resume behavior through the flags register such as by
setting the ZF. The execution may also include setting a
bitvector of active microthreads (e.g., SyMT_AC-
TIVE_BITVEC of the SSA which stores
ACTIVE_BITVEC), zeroing uthread registers (if initial
clean launch), and/or setting the instruction pointer to the
provided instruction pointer (if initial clean launch).

In some examples, the SSA has a header which SyMT
support uses to enable restartable UTNTR execution. Upon
execution of the UTNTR instruction, the header of the save
area is checked for a null pointer and a valid accelerator ID.
If the pointer is NULL or the capability id does match a valid
capability id, a #SYMT exception is signaled on the host
thread. Enough details are provided in the error code to for
the programmer to triage why the fault occurred. In some
examples, the first time UTNTR is executed the execution
does not cause an entry into SyMT mode.

In some examples, the instruction is committed or retired at 909.

FIG. 10 illustrates an example of method to process a UTNTR instruction using emulation or binary translation. For example, a processor core as shown in FIG. 36(B), a pipeline and/or emulation/translation layer as detailed below, etc. perform aspects of this method.

An instance of a single instruction of a first instruction set architecture is translated into one or more instructions of a second instruction set architecture at 1001. The single instruction having fields for an opcode, and in some examples, one or more of: one or more fields to indicate a first source operand to provide an instruction pointer, one or more fields to indicate a second source operand to provide a second pointer, one or more fields to indicate a third source operand to provide a count value, wherein the opcode is to indicate execution circuitry is to attempt an entry into a microthread execution. In some examples, one or more of the source operands are implicitly referenced. This translation is performed by a translation and/or emulation layer of software in some examples. In some examples, the translation is performed by translation circuitry.

An example of a format for an UTNTR is UTNTR SRC1, SRC2, SRC3. In some examples, UTNTR is the opcode mnemonic of the instruction and is embodied in the opcode field 3903. SRC1, SRC2, and SRC3 are fields for the sources such as packed data registers and/or memory. These sources may be identified using addressing field 3905 and/or prefix(es) 3901. In some examples, the UTNTR instruction uses the second prefix 3901(B) or third prefix 3901(C) that are detailed later. For example, in some examples, REG 4044, R/M 4046, and VVVV from byte 1 4305, byte 2 4317, or payload byte 4417 are used to identify respective sources.

As such, examples of the UTNTR instruction may use three arguments the instruction pointer where thread execution begins, a pointer to a global argument, and a count. Typically, these arguments are passed into the UTNTR instruction as 64-bit registers. The instruction pointer is a functional pointer and the global argument is a generic pointer. In some examples, the relationship between the UTNTR count argument and the underlying hardware supported number of microthreads is as follows—the SyMT logic 111 microcode will iterate up to the count argument by the number of supported microthreads on a given implementation. The count argument may be larger than supported number of microthreads and when this happens, there is no guarantee of concurrency. If concurrency is required for correctness, software must ensure the count argument is equal to the number of hardware supported microthreads. Software should use CPUID or other function with the appropriate arguments to query the hardware supported number of microthreads for a given implementation.

The one or more translated instructions of the second instruction set architecture are decoded at 1003. In some examples, the translation and decoding are merged.

Data values associated with the source operand(s) of the decoded one or more instructions of the second instruction set architecture are retrieved and the one or more instructions are scheduled at 1005. For example, when one or more of the source operands are memory operands, the data from the indicated memory location is retrieved.

At 1007, the decoded instruction(s) of the second instruction set architecture is/are executed by execution circuitry (hardware) such as that detailed herein to perform the operation(s) indicated by the opcode of the single instruction of the first instruction set architecture. For the UTNTR instruction, the execution will cause execution circuitry to perform the operations as indicated by the opcode of the UTNTR instruction. In some examples, microthread execution entry comprises using an accelerator. The execution may also include setting a bitvector of active microthreads (e.g., SyMT_ACTIVE_BITVEC of the SSA which stores ACTIVE_BITVEC), zeroing uthread registers (if initial clean launch), and/or setting the instruction pointer to the provided instruction pointer (if initial clean launch).

In some examples, the instruction(s) is/are committed or retired at 1009.

FIG. 11 illustrates examples of pseudocode representing an execution of a UTNTR instruction.

Figure 12:
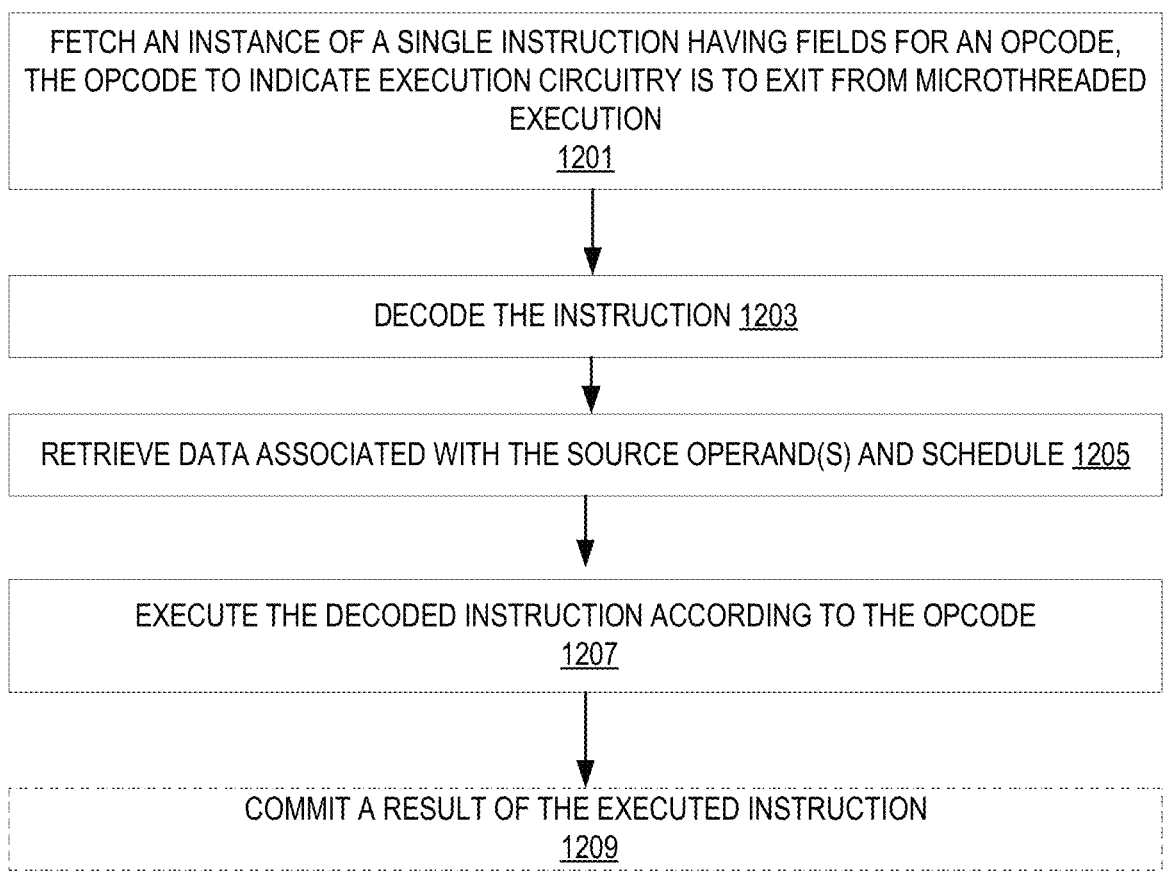
FIG. 12 illustrates an example of method performed by a processor to process a UTRET instruction.

FIG. 12 illustrates an example of method performed by a processor to process a UTRET instruction. For example, SyMT logic 111 processes this instruction. The UTRET instruction indicates execution circuitry is to stop microthread execution and in some instances, a transition to non-SyMT mode. Specifically, a microthread terminates upon an execution of a UTRET instruction.

At 1201, an instance of single instruction is fetched. For example, an UTRET is fetched. The single instruction having a field for an opcode to indicate a stop (or halt) of a microthread's execution. An example of a format for an UTRET. In some examples, UTRET is the opcode mnemonic of the instruction and is embodied in the opcode field 3903.

The fetched instance of the single instruction is decoded at 1203.

The decoded instruction is scheduled at 1205. For example, when one or more of the source operands are memory operands, the data from the indicated memory location is retrieved.

At 1207, the decoded instruction is executed by execution circuitry (hardware) such as that detailed herein. For the UTRET instruction, the execution will cause execution circuitry to perform a stop of a microthread's execution. When the microthread that executes the UTRET is the last microthread (as indicated by the active bitvector), the SyMT mode is set to zero (e.g., a ZF is cleared). When the microthread that executes the UTRET is not the last microthread (as indicated by the active bitvector), the active bitvector is updated to indicate that the microthread has stopped.

In some examples, the instruction is committed or retired at 1209.

FIG. 13 illustrates an example of method to process a UTRET instruction using emulation or binary translation. For example, SyMT logic 111 processes this instruction. The UTRET instruction indicates a stop of a microthread execution and in some instances, a transition to non-SyMT mode. Specifically, a microthread terminates upon an execution of a UTRET instruction.

An instance of a single instruction of a first instruction set architecture is translated into one or more instructions of a second instruction set architecture at 1301. The single instruction having a field for an opcode to indicate execution circuitry is to stop (or halt) a microthread's execution. An example of a format for an UTRET. In some examples, UTRET is the opcode mnemonic of the instruction and is embodied in the opcode field 3903. This translation is performed by a translation and/or emulation layer of software in some examples. In some examples, the translation is performed by translation circuitry.

The one or more translated instructions of the second instruction set architecture are decoded at 1303. In some examples, the translation and decoding are merged.

Data values associated with the source operand(s) of the decoded one or more instructions of the second instruction set architecture are retrieved and the one or more instructions are scheduled at 1305. For example, when one or more of the source operands are memory operands, the data from the indicated memory location is retrieved.

At 1307, the decoded instruction(s) of the second instruction set architecture is/are executed by execution circuitry (hardware) such as that detailed herein to perform the operation(s) indicated by the opcode of the single instruction of the first instruction set architecture. For the UTRET instruction, the execution will cause execution circuitry to perform the operations as indicated by the opcode of the UTRET instruction to perform a stop of a microthread's execution. When the microthread that executes the UTRET is the last microthread (as indicated by the active bitvector), the SyMT mode is set to zero (e.g., a ZF is cleared). When the microthread that executes the UTRET is not the last microthread (as indicated by the active bitvector), the active bitvector is updated to indicate that the microthread has stopped.

In some examples, the instruction(s) is/are committed or retired at 1309.

FIG. 14 illustrates examples of pseudocode representing an execution of a UTRET instruction.

Figure 15:
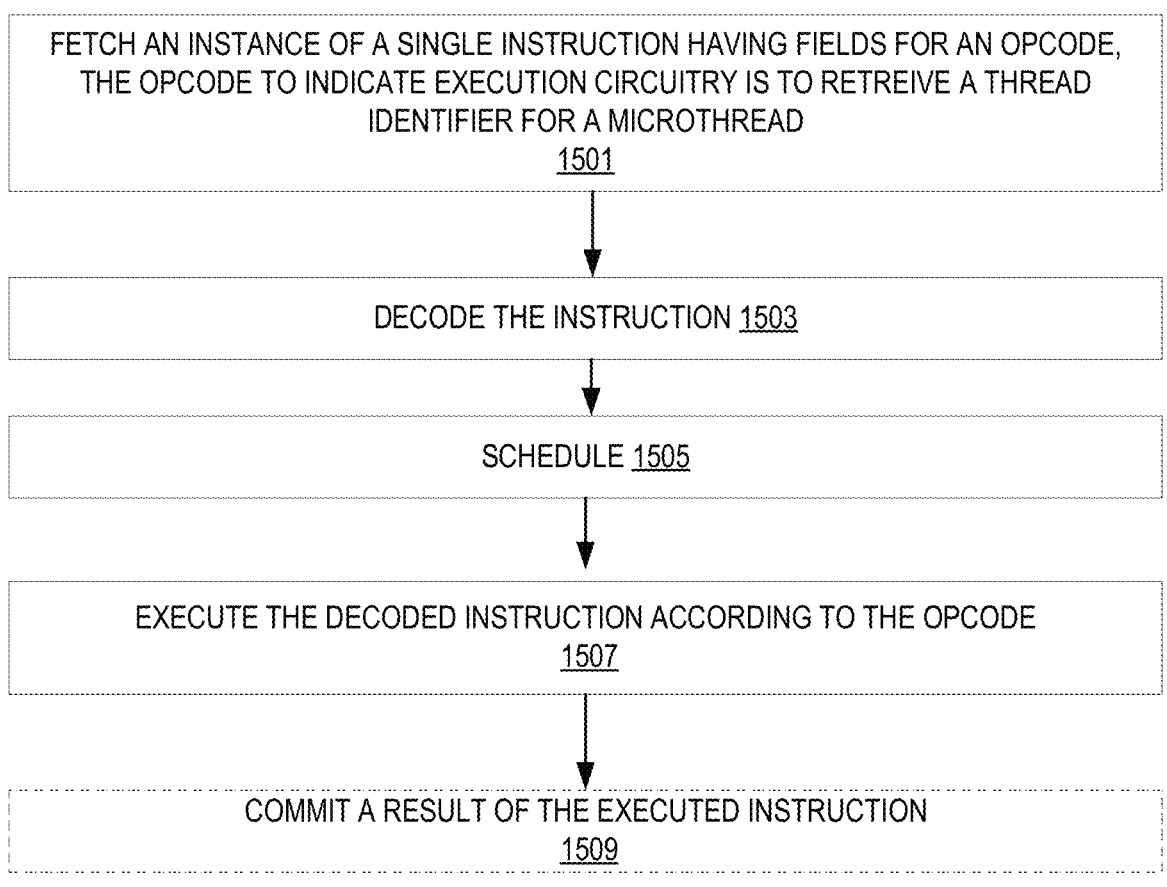
FIG. 15 illustrates an example of method performed by a processor to process a UTGETCNTXT instruction.

FIG. 15 illustrates an example of method performed by a processor to process a UTGETCNTXT instruction. For example, SyMT logic 111 processes this instruction. The execution of a UTGETCNTXT instruction causes a retrieval of the identifier of the microthread executing the UTGETCNTXT instruction.

At 1501, an instance of single instruction is fetched. For example, a UTGETCNTXT is fetched. The single instruction having a field for an opcode to indicate execution circuitry is to retrieve the identifier of the microthread executing the UTGETCNTXT instruction. In some examples, UTGETCNTXT is the opcode mnemonic of the instruction and is embodied in the opcode field 3903.

The fetched instance of the single instruction is decoded at 1503.

The decoded instruction is scheduled at 1505.

At 1507, the decoded instruction is executed by execution circuitry (hardware) such as that detailed herein. For the UTGETCNTXT instruction, the execution will cause execution circuitry to retrieve the identifier of the microthread executing the UTGETCNTXT instruction In some examples, the instruction is committed or retired at 1509.

FIG. 16 illustrates an example of method to process a UTGETCNTXT instruction using emulation or binary translation. For example, SyMT logic 111 processes this instruction. The execution of a UTGETCNTXT instruction causes a retrieval of the identifier of the microthread executing the UTGETCNTXT instruction.

An instance of a single instruction of a first instruction set architecture is translated into one or more instructions of a second instruction set architecture at 1601. The single instruction having a field for an opcode to indicate execution circuitry is to retrieve the identifier of the microthread executing the UTGETCNTXT instruction. An example of a format for an UTGETCNTXT. In some examples, UTGETCNTXT is the opcode mnemonic of the instruction and is embodied in the opcode field 3903. This translation is performed by a translation and/or emulation layer of software in some examples. In some examples, the translation is performed by translation circuitry.

The one or more translated instructions of the second instruction set architecture are decoded at 1603. In some examples, the translation and decoding are merged.

The decoded one or more instructions of the second instruction set architecture are scheduled at 1605. For example, when one or more of the source operands are memory operands, the data from the indicated memory location is retrieved.

At 1607, the decoded instruction(s) of the second instruction set architecture is/are executed by execution circuitry (hardware) such as that detailed herein to perform the operation(s) indicated by the opcode of the single instruction of the first instruction set architecture. For the UTGETCNTXT instruction, the execution will cause execution circuitry to perform the operations as indicated by the opcode of the UTGETCNTXT instruction to retrieve the identifier microthread executing the UTGETCNTXT instruction.

In some examples, the instruction(s) is/are committed or retired at 1609.

FIG. 17 illustrates examples of pseudocode representing an execution of a UTGETCNTXT instruction.

Figure 18:
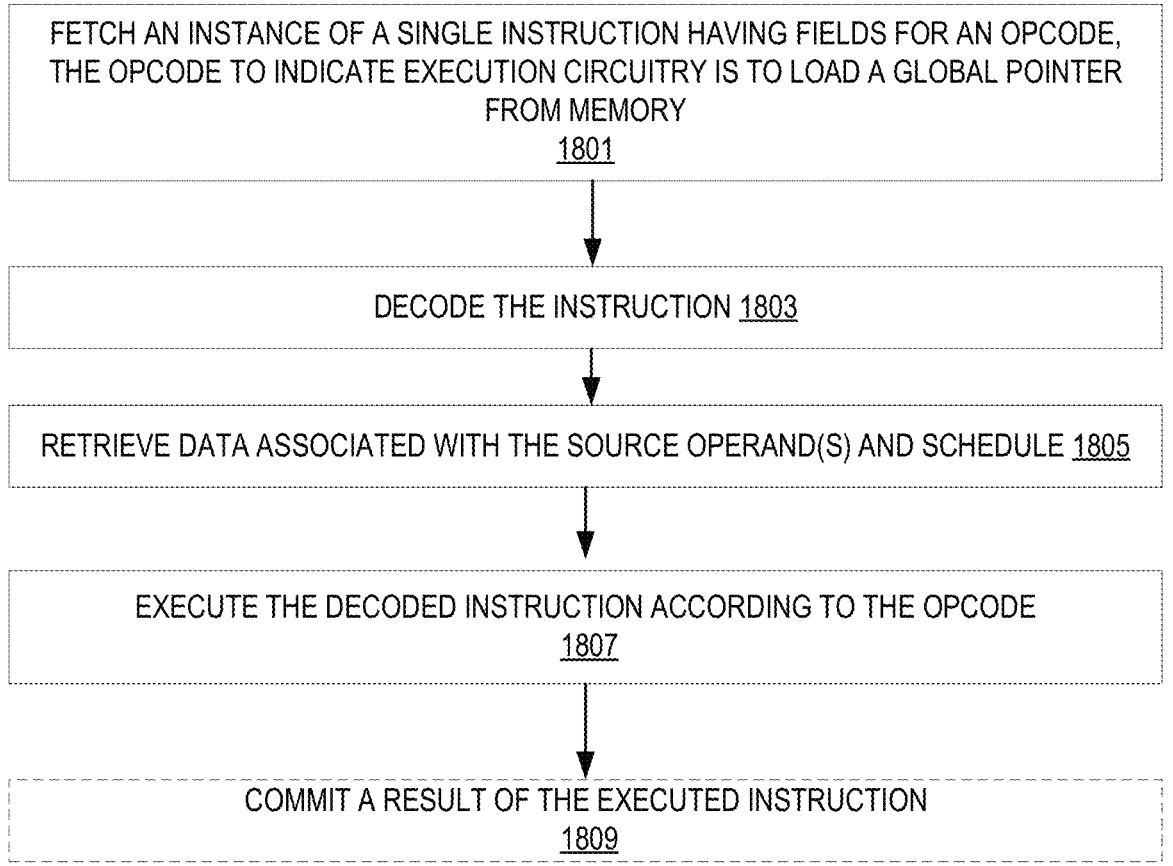
FIG. 18 illustrates an example of method performed by a processor to process a UTGETGLB instruction.

FIG. 18 illustrates an example of method performed by a processor to process a UTGETGLB instruction. For example, SyMT logic 111 processes this instruction. The execution of a UTGETGLB instruction causes a load of a global pointer. This global pointer is set by the UTNTR instruction in some embodiments. The global pointer is stored in memory (e.g., as a part of an SSA such as in SyMT_GLOBAL_POINTER).

At 1801, an instance of single instruction is fetched. For example, a UTGETGLB is fetched. The single instruction having a field for an opcode to indicate execution circuitry is to load a global pointer. In some examples, UTGETGLB is the opcode mnemonic of the instruction and is embodied in the opcode field 3903.

The fetched instance of the single instruction is decoded at 1803.

The decoded instruction is scheduled at 1805.

At 1807, the decoded instruction is executed by execution circuitry (hardware) such as that detailed herein. For the UTGETGLB instruction, the execution will cause execution circuitry to retrieve a previously set global pointer value.

In some examples, the instruction is committed or retired at 1809.

FIG. 19 illustrates an example of method to process a UTGETGLB instruction using emulation or binary translation. For example, SyMT logic 111 processes this instruction. The execution of a UTGETGLB instruction causes a retrieval of the identifier of the microthread executing the UTGETGLB instruction.

An instance of a single instruction of a first instruction set architecture is translated into one or more instructions of a second instruction set architecture at 1901. The single instruction having a field for an opcode to indicate execution circuitry is to retrieve a previously set global pointer value. An example of a format for an UTGETGLB. In some examples, UTGETGLB is the opcode mnemonic of the instruction and is embodied in the opcode field 3903. This translation is performed by a translation and/or emulation layer of software in some examples. In some examples, the translation is performed by translation circuitry.

The one or more translated instructions of the second instruction set architecture are decoded at 1903. In some examples, the translation and decoding are merged.

The decoded one or more instructions of the second instruction set architecture are scheduled at 1905.

At 1907, the decoded instruction(s) of the second instruction set architecture is/are executed by execution circuitry (hardware) such as that detailed herein to perform the operation(s) indicated by the opcode of the single instruction of the first instruction set architecture. For the UTGETGLB instruction, the execution will cause execution circuitry to perform the operations as indicated by the opcode of the UTGETGLB instruction retrieve a previously set global pointer value.

In some examples, the instruction(s) is/are committed or retired at 1909.

In some examples, the pseudocode for the execution of the UTGETGLB instruction is:

```
IF(!SYMT_MODE) {
    GENERATE_FAULT #UD;
}
//T_GLOBAL_POINTER SET BY UTNTR
RETURN T_GLOBAL_POINTER;
```

Figure 20:
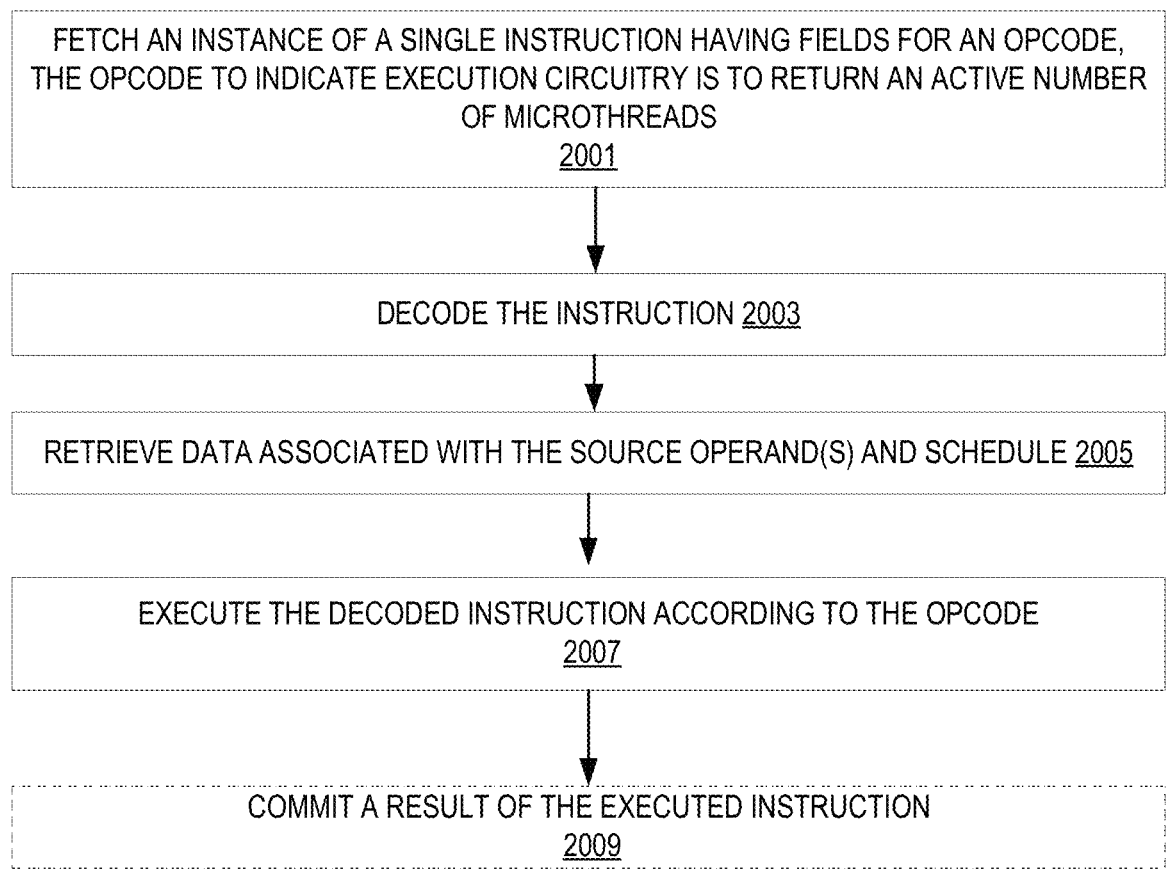
FIG. 20 illustrates an example of method performed by a processor to process a UTGETCURRACTIVE instruction.

FIG. 20 illustrates an example of method performed by a processor to process a UTGETCURRACTIVE instruction. For example, SyMT logic 111 processes this instruction. The execution of a UTGETCURRACTIVE instruction causes a return of an active number of microthreads.

At 2001, an instance of single instruction is fetched. For example, a UTGETCURRACTIVE is fetched. The single instruction having a field for an opcode to indicate execution circuitry is to return an active number of microthreads. In some examples, UTGETCURRACTIVE is the opcode mnemonic of the instruction and is embodied in the opcode field 3903.

The fetched instance of the single instruction is decoded at 2003.

The decoded instruction is scheduled at 2005.

At 2007, the decoded instruction is executed by execution circuitry (hardware) such as that detailed herein. For the UTGETCURRACTIVE instruction, the execution will cause execution circuitry to return an active number of microthreads.

In some examples, the instruction is committed or retired at 2009.

FIG. 21 illustrates an example of method to process a UTGETCURRACTIVE instruction using emulation or binary translation. For example, SyMT logic 111 processes this instruction. The execution of a UTGETCURRACTIVE instruction causes a return an active number of microthreads.

An instance of a single instruction of a first instruction set architecture is translated into one or more instructions of a second instruction set architecture at 2101. The single instruction having a field for an opcode to indicate execution circuitry is to return an active number of microthreads. An example of a format for an UTGETCURRACTIVE. In some examples, UTGETCURRACTIVE is the opcode mnemonic of the instruction and is embodied in the opcode field 3903. This translation is performed by a translation and/or emulation layer of software in some examples. In some examples, the translation is performed by translation circuitry.

The one or more translated instructions of the second instruction set architecture are decoded at 2103. In some examples, the translation and decoding are merged.

The decoded one or more instructions of the second instruction set architecture are scheduled at 2105.

At 2107, the decoded instruction(s) of the second instruction set architecture is/are executed by execution circuitry (hardware) such as that detailed herein to perform the operation(s) indicated by the opcode of the single instruction of the first instruction set architecture. For the UTGETCURRACTIVE instruction, the execution will cause execution circuitry to perform the operations as indicated by the opcode of the UTGETCURRACTIVE instruction to return an active number of microthreads.

In some examples, the instruction(s) is/are committed or retired at 2109.

In some examples, the pseudocode for the execution of the UTGETCURRACTIVE instruction is:

```
IF(!SYMT_MODE) {
    GENERATE_FAULT #UD;
}
RETURN POPCNT(SSA->ACTIVE_BITVEC);
```

FIG. 22 illustrates an example of method performed by a processor to process a UTTST instruction. For example, SyMT logic 111 processes this instruction. The execution of a UTTST instruction causes a return of an indication of if SyMT is active.

At 2201, an instance of single instruction is fetched. For example, a UTTST is fetched. The single instruction having a field for an opcode to indicate execution circuitry is to return an indication of if SyMT is active. In some examples, UTTST is the opcode mnemonic of the instruction and is embodied in the opcode field 3903.

The fetched instance of the single instruction is decoded at 2203.

The decoded instruction is scheduled at 2205.

At 2207, the decoded instruction is executed by execution circuitry (hardware) such as that detailed herein. For the UTTST instruction, the execution will cause execution circuitry to return an indication of if SyMT is active. In some embodiments, an indication of if SyMT is active is if a particular flag is set such as ZF or other flag to indicate SyMT mode is active.

In some examples, the instruction is committed or retired at 2209.

FIG. 23 illustrates an example of method to process a UTTST instruction using emulation or binary translation. For example, SyMT logic 111 processes this instruction. The execution of a UTTST instruction causes a return of an indication of if SyMT is active.

An instance of a single instruction of a first instruction set architecture is translated into one or more instructions of a second instruction set architecture at 2301. The single instruction having a field for an opcode to indicate execution circuitry is to return an indication of if SyMT is active. An example of a format for an UTTST. In some examples, UTTST is the opcode mnemonic of the instruction and is embodied in the opcode field 3903. This translation is performed by a translation and/or emulation layer of software in some examples. In some examples, the translation is performed by translation circuitry.

The one or more translated instructions of the second instruction set architecture are decoded at 2303. In some examples, the translation and decoding are merged.

The decoded one or more instructions of the second instruction set architecture are scheduled at 2305.

At 2307, the decoded instruction(s) of the second instruction set architecture is/are executed by execution circuitry (hardware) such as that detailed herein to perform the operation(s) indicated by the opcode of the single instruction of the first instruction set architecture. For the UTTST instruction, the execution will cause execution circuitry to perform the operations as indicated by the opcode of the UTTST instruction to return an indication of if SyMT mode is active. In some embodiments, an indication of if SyMT mode is active is if a particular flag is set such as ZF or other flag to indicate SyMT mode is active.

In some examples, the instruction(s) is/are committed or retired at 2309.

In some examples, the pseudocode for the execution of the UTTST instruction is:

```
IF(SYMT_MODE) {
    FLAGS.ZF=0; // NOTE THAT ZF IS EXEMPLARY
}
ELSE
    FLAGS.ZF=1;
```

In some examples, the SSA is read and/or written to using particular instructions which are detailed as SSAREAD and SSAWRITE below.

The SyMT save area is written when transitioning from microthread execution mode back to host mode if an exception occurs. If execution transitions back to host mode cleanly, e.g., all microthreads terminate using the UTRET instruction, then the save area will not be updated. The SyMT save area is valid for both read and write throughout the host mode handler processing. Any host access to the SyMT save area while executing in microthread mode will result in undefined behavior.

The SSAREAD and SSAWRITE instructions have three arguments. These arguments are defined as follows: 1) a pointer to the memory location used to store (SSAREAD) or load (SSAWRITE) from the SyMT save area; 2) a thread ID (TID) which is the microthread ID of the state being accessed from the SyMT save area (if a value is global to all microthreads in the SyMT save area, the value "−1" may be used); and 3) a register ID (REGID) which is the enumeration value of a state to be accessed. In some examples, one or more of these arguments is provided by an explicit operand of the instruction. In some examples, one or more of these arguments is provided by an implicit operand of the instruction. In some examples, the operands are registers.

FIG. 24 illustrates an example of method performed by a processor to process a SSAREAD instruction. For example, SyMT logic 111 processes this instruction. In some examples, the execution of a SSAREAD instruction also causes a return of an indication of if SyMT was active.

At 2401, an instance of single instruction is fetched. For example, a SSAREAD is fetched. The single instruction having fields for an opcode, and in some examples one or more of: one or more fields to indicate a first source operand to store a pointer for a SyMT save area, one or more fields to indicate a second source operand to store a microthread id, and/or one or more fields to indicate a third source operand to store an enumeration value of a state (register) to be accessed, the opcode to indicate a read of a particular microthread's copied register state (as identified by the microthread ID stored in the pointed to SyMT save area). In some examples, the enumeration allows for the read of a subset of the particular microthread's register state.

An example of a format for a SSAREAD is SSAREAD SR1, SRC2, SRC3. In some examples, SSAREAD is the opcode mnemonic of the instruction and is embodied in the opcode field 3903. SRC1, SRC2, and SRC3 are fields for the sources such as packed data registers and/or memory. These sources may be identified using addressing field 3905 and/or prefix(es) 3901. In some examples, the SSAREAD instruction uses the second prefix 3901(B) or third prefix 3901(C) that are detailed later. For example, in some examples, REG 4044, R/M 4046, and VVVV from byte 14305, byte 2 4317, or payload byte 4417 are used to identify respective sources.

The fetched instance of the single instruction is decoded at 2403.

Values associated with the source operands are retrieved and the decoded instruction scheduled at 2405.

At 2407, the decoded instruction is executed by execution circuitry (hardware) such as that detailed herein. For the SSAREAD instruction, the execution will cause execution circuitry to read a particular location of an SSA. The address of the particular location is provided by using the pointer to the general SSA and then further refining where in the SSA from the thread ID (which indicates a particular section of the SSA for that thread) and then the enumeration value (which indicates a particular location of the particular section of the SSA).

In some examples, the instruction is committed or retired at 2409.

FIG. 25 illustrates an example of method to process a SSAREAD instruction using emulation or binary translation. For example, SyMT logic 111 processes this instruction. In some examples, the execution of a SSAREAD instruction also causes a return of an indication of if SyMT was active.

An instance of a single instruction of a first instruction set architecture is translated into one or more instructions of a second instruction set architecture at 2501. The single instruction having fields for an opcode, and in some examples one or more of: one or more fields to indicate a first source operand to store a pointer for a SyMT save area, one or more fields to indicate a second source operand to store a microthread id, and/or one or more fields to indicate a third source operand to store an enumeration value of a state (register) to be accessed, the opcode to indicate a read of a particular microthread's copied register state. This translation is performed by a translation and/or emulation layer of software in some examples. In some examples, the translation is performed by translation circuitry.

The one or more translated instructions of the second instruction set architecture are decoded at 2503. In some examples, the translation and decoding are merged.

The decoded one or more instructions of the second instruction set architecture are scheduled at 2505.

At 2507, the decoded instruction(s) of the second instruction set architecture is/are executed by execution circuitry (hardware) such as that detailed herein to perform the operation(s) indicated by the opcode of the single instruction of the first instruction set architecture. For the SSAREAD instruction, the execution will cause execution circuitry to read a particular location of an SSA. The address of the particular location is provided by using the pointer to the general SSA and then further refining where in the SSA from the thread ID (which indicates a particular section of the SSA for that thread) and then the enumeration value (which indicates a particular location of the particular section of the SSA). In some examples, the instruction(s) is/are committed or retired at 2509.

FIG. 26 illustrates an example of method performed by a processor to process a SSAWRITE instruction. For example, SyMT logic 111 processes this instruction. In some examples, the execution of a SSAWRITE instruction also causes a return of an indication of if SyMT was active.

At 2601, an instance of single instruction is fetched. For example, a SSAWRITE is fetched. The single instruction having fields for an opcode, and in some examples one or more of: one or more fields to indicate a first source operand to store a pointer for a SyMT save area, one or more fields to indicate a second source operand to store a microthread id, and/or one or more fields to indicate a third source operand to store an enumeration value of a state (register) to be written into the SSA, the opcode to indicate a write of a particular microthread's register state.

An example of a format for an SSAWRITE is SSAWRITE SR1, SRC2, SRC3. In some examples, SSAWRITE is the opcode mnemonic of the instruction and is embodied in the opcode field 3903. SRC1, SRC2, and SRC3 are fields for the sources such as packed data registers and/or memory. These sources may be identified using addressing field 3905 and/or prefix(es) 3901. In some examples, the SSAWRITE instruction uses the second prefix 3901(B) or third prefix 3901(C) that are detailed later. For example, in some examples, REG 4044, R/M 4046, and VVVV from byte 14305, byte 2 4317, or payload byte 4417 are used to identify respective sources.

The fetched instance of the single instruction is decoded at 2603.

Values associated with the source operands are retrieved and the decoded instruction scheduled at 2605.

At 2607, the decoded instruction is executed by execution circuitry (hardware) such as that detailed herein. For the SSAWRITE instruction, the execution will cause execution circuitry to write a particular location of an SSA. The address of the particular location is provided by using the pointer to the general SSA and then further refining where in the SSA from the microthread ID (which indicates a particular section of the SSA for that microthread) and then the enumeration value (which indicates a particular location of the particular section of the SSA).

In some examples, the instruction is committed or retired at 2609.

FIG. 27 illustrates an example of method to process a SSAWRITE instruction using emulation or binary translation. For example, SyMT logic 111 processes this instruction. In some examples, the execution of a SSAWRITE instruction also causes a return of an indication of if SyMT was active.

An instance of a single instruction of a first instruction set architecture is translated into one or more instructions of a second instruction set architecture at 2701. The single instruction having fields for an opcode, and in some examples one or more of: one or more fields to indicate a first source operand to store a pointer for a SyMT save area, one or more fields to indicate a second source operand to store a microthread id, and/or one or more fields to indicate a third source operand to store an enumeration value of a state (register) to be written, the opcode to indicate a write of a particular microthread's register state. This translation is performed by a translation and/or emulation layer of software in some examples. In some examples, the translation is performed by translation circuitry.

The one or more translated instructions of the second instruction set architecture are decoded at 2703. In some examples, the translation and decoding are merged.

The decoded one or more instructions of the second instruction set architecture are scheduled at 2705.

At 2707, the decoded instruction(s) of the second instruction set architecture is/are executed by execution circuitry (hardware) such as that detailed herein to perform the operation(s) indicated by the opcode of the single instruction of the first instruction set architecture. For the SSAWRITE instruction, the execution will cause execution circuitry to write a particular location of an SSA. The address of the particular location is provided by using the pointer to the general SSA and then further refining where in the SSA from the microthread ID (which indicates a particular section of the SSA for that the write) and then the enumeration value (which indicates a particular location of the particular section of the SSA). In some examples, the instruction(s) is/are committed or retired at 2709.

Exceptions in uT ExecutionS

An exception that occurs in microthreaded mode will dump state to the SSA and proxy execution back to normal host execution. In most examples, microthread state is not copied back to the host thread. The host register state visible at the time of an exception is the host register state at the time of the UTNTR instruction. All microthread state is kept in the save area and, in some examples, an exception vector is used for defining SyMT faults (e.g., using SyMT_EX-CEPTION_VECTOR). In some examples, all microthreads halt upon an exception. In some examples, only the microthread with an issue halts. In some examples, exception, fault, etc. handling is under the control of microcode.

There may be several reasons for supporting a new exception type for SyMT such as one or more of: 1) as microthreads are not OS visible threads in some examples the behavior can be different between "normal operation" and microthread execution; 2) bulk fault delivery avoids multiple round trips between microthreaded mode and the OS kernel; and/or 3) an exception vector localizes changes for SyMT in the OS kernel and prevents a need to introduce microthread-specific handling code in existing fault handlers.

In host mode, a SyMT-specific fault handler can access the SSA to diagnose the fault, perform required actions, and potentially restart execution of SyMT mode. To indicate if a fault occurred in microthreaded mode, in some examples, software uses a FRED event type to diagnose an event.

The fault codes delivered with a bulk SyMT fault are not guaranteed to be unique. That is, multiple fault types for could be delivered simultaneously. For example, it is possible that both #PF for a subset of microthreads and # DIV faults for a disjoint subset of microthreads could be delivered in the same invocation of the SyMT fault delivery mechanism. It is the job of system software to walk the faulting thread vector and diagnose the failures appropriately.

The bulk fault architecture previously described has a potential race—if an external interrupt occurs in SyMT mode while some subset of microthreads is about to retire a trapping instruction, care must be taken to avoid losing the trapped state of the microthreads. There are at least two solutions to addressing this problem: 1) prevent an interrupt from being delivered at the same time a trapping instruction is retired (if an external interrupt occurs during SyMT mode, it will be delivered to the host OS in the same fashion as it would be delivered non-SyMT mode. Microcode will save the appropriate microthread state to the save area, such that SyMT mode can be reentered after the interrupt has been processed); 2) add an additional scalar field to the SyMT state area to handle any external event/interrupt that occurs in SyMT mode (events that occur in SyMT mode will result in execution to be redirected to SyMT bulk fault handler. As part of that handler, software will have to check if an external interrupt has occurred by checking the appropriate field in the SSA. Microcode will save the appropriate microthread state to the save area, such that SyMT mode can be reentered after the interrupt has been processed).

In some examples, SyMT uses the FRED event delivery mechanism for microthread faults. FRED event delivery saves 48 bytes of information on the stack of the host processor. The first 8 bytes pushed by FRED event delivery communicates information about the event being delivered. SyMT mode adds a new event type to the FRED architecture to indicate an exception occurred in microthread mode.

Figure 28:
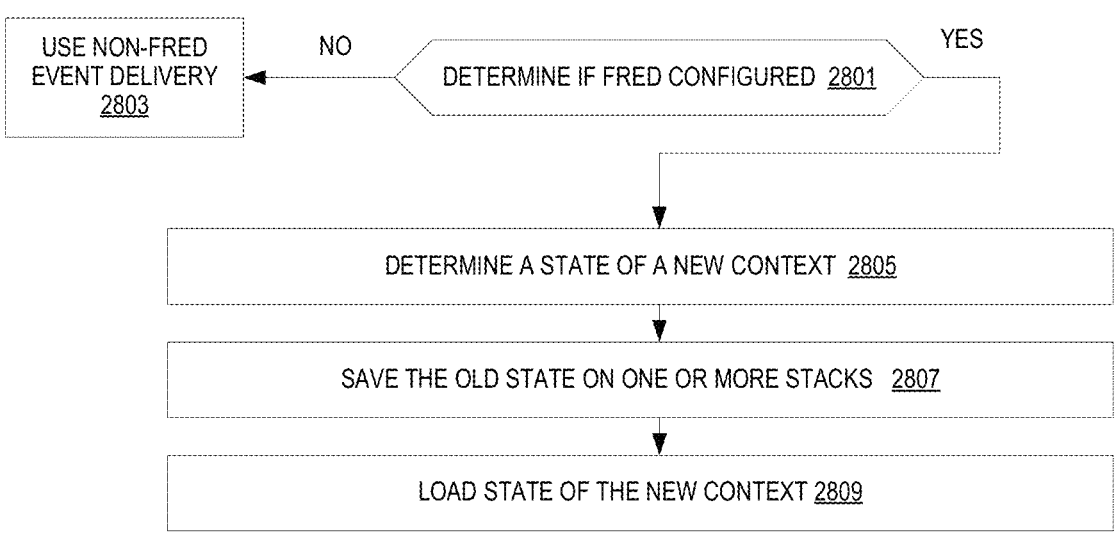
FIG. 28 illustrates an example of a method for FRED event delivery.

FIG. 28 illustrates an example of a method for FRED event delivery. This method is to be performed by FRED logic 130, for example. At 2801, a determination of if FRED event delivery is configured is made. For example, is CR4.FRED=IA32_EFER.LMA=1? If not ("NO" in 2801), then non-FRED event delivery is used at 2803.

When FRED is configured ("YES" in 2801), a determination of a state of a new context is made at 2805. A context of an event handler invoked by FRED event delivery includes one or more segment registers (e.g., CS and SS), an instruction pointer (e.g., RIP), a flags register (e.g., EFLAGS, RFLAGS), the stack pointer (RSP), and the base address of a segment (e.g., GS.base). The context also includes the shadow-stack pointer (SSP) if supervisor shadow stacks are enabled.

FRED event delivery establishes this context by loading these registers when necessary. The values to be loaded into RIP, RFLAGS, RSP, and SSP depend upon the old context, the nature of the event being delivered, and software configuration.

FRED event delivery uses two entry points, depending on the CPL at the time the event occurred. This allows an event handler to identify the appropriate return instruction (e.g., ERETU—return to user mode or ERETS—return to supervisor mode). Specifically, the new RIP value that FRED event delivery establishes is (IA32_FRED_CONFIG & ~FFFH) for events that occur while CPL=3 and (IA32_FRED_CONFIG & ~FFFH)+26 for events that occur while CPL=0.

A new RFLAGS value established by FRED event delivery may be the old value with bits cleared in positions that are set in the IA32_FMASK MSR and at certain fixed positions defined by the ISA (the latter ensuring that specific bits, e.g., RFLAGS.RF and RFLAGS.TF will be zero).

FRED transitions may support multiple (e.g., 4) different stacks for use in ring 0. The stack currently in use is identified with a 2-bit value called the current stack level (CSL).

FRED event delivery determines the event's stack level and then uses that to determine whether the CSL should change. An event's stack level is based on the CPL, the nature and type of the event, the event's vector (for some event types), and/or MSRs configured by system software: 1) if the event occurred while CPL=3, was not a nested exception encountered during event delivery, and was not a double fault (#DF), the event's stack level is 0; 2) if the event occurred while CPL=0, was a nested exception encountered during event delivery, or was a #DF, at least one the following items apply: if the event is a maskable interrupt, the event's stack level is the stack level for interrupts (in IA32_FRED_CONFIG[10:9]); if the event is an exception or a special interrupt with a vector fixed by the ISA (e.g., NMI), the event's stack level is the value IA32_FRED_STKLVLS[2v+1:2v], where v is the event's vector (in the range 0-31); and the stack level of all other events is 0.

If the event occurred while CPL=3, the new stack level is the event's stack level; otherwise, the new stack level is the maximum of the CSL and the event's stack level.

After determining the new stack level, a new RSP value is identified as follows: 1) if either the CPL or the stack level is changing, the new RSP value will be that of the FRED_RSP MSR corresponding to the new stack level; and 2) otherwise, the new RSP value will be the current RSP value decremented by the OS-specified size of the protected area on the stack. In either case, the new RSP value may then be aligned to a 64-byte boundary.

If supervisor shadow stacks are enabled, a new SSP value may be determined as follows: if either the CPL or the stack level is changing, the new SSP value will be that of the FRED_SSP MSR corresponding to the new stack level. The new SSP value may be subject to the following: a general-protection fault (#GP) occurs if the new stack level is 0 and IA32_PL0_SSP[2]=1. Because bit 0 of each FRED_SSP MSR is the MSR's verified bit, that bit is not loaded into SSP and instead bit 0 of the new SSP value is always zero. Otherwise, the new SSP value will be the current SSP value decremented by the OS-specified size of the protected area on the stack.

At 2807, at least the old state is saved onto one or more stacks. FRED event delivery may save information about the old context on the stack of the event handler. The top 40 bytes of the event handler's stack may contain the context in the same format as that following IDT event delivery. FRED event delivery may also save information about the event being delivered as well as auxiliary information that will guide a subsequent return instruction. When supervisor shadow stacks are enabled, FRED event delivery may also save information on the event handler's shadow stack. Note that memory accesses used to store information on the stacks may be performed with supervisor privilege.

FRED event delivery may save 64 bytes of information on the regular stack. Before doing so, RSP is loaded with the new determined value discussed above and this value is used to reference the new stack. Note that if FRED event delivery incurs a nested exception or VM exit after this point, the nested exception or VM exit restores the value that was in RSP before the first event occurred before the CPU delivers that nested exception or VM exit.

One or more of the following are pushed onto a stack: the first 8 bytes pushed (bytes 63:56 of the 64-byte stack frame) are always zero; the next 8 bytes pushed (bytes 55:48) contain event data and are defined as follows: 1) if the event being delivered is a page fault (#PF), the value pushed is that which the page fault loads into a control register such as CR2 (generally, this is the faulting linear address); 2) if the event being delivered is a debug exception, event data identifies the nature of the debug exception (for example, bits 3:0—when set, each of these bits indicates that the corresponding breakpoint condition was met. Any of these bits may be set even if its corresponding enabling bit in DR7 is not set; bits 10:4 are not currently defined; bit 11 indicates that the cause of the debug exception was acquisition of a bus lock; bit 12 is not currently defined; bit 13 indicates that the cause of the debug exception was "debug register access detected."; bit 14 indicates that the cause of the debug exception was the execution of a single instruction; bit 15 is not currently defined; bit 16 indicates that a debug exception (#DB) or a breakpoint exception (#BP) occurred inside an RTM region while advanced debugging of transactional regions was enabled; bits 63:17 are not currently defined.; 3) if the event being delivered is a device-not-available exception, the value pushed is that which the device-not-available exception establishes in an extended feature disable (XFD) error MSR (e.g., IA32_XFD_ERR MSR) which is loaded when an extended feature disable causes a device-notavailable error; and 4) for any other event, the value pushed is zero. Note that in some examples, non-maskable interrupts and/or double faults are conventionally delivered, whereas divide, debug, overflow, invalid opcode, general protection, page fault, alignment check, machine check, SIMD exception, CET exception, and/or virtualization exceptions are handled using FRED and indicted by the SyMT_EXCEPTION_VECTOR of the SSA.

The next 8 bytes pushed (bytes 47:40) contain event information. These 64 bits of information have the following format in some examples: bits 15:0 contain the error code (defined only for certain exceptions; zero if there is none) (note for SyMT the error codes are provided by SyMT_ERROR_CODE of the SSA); bits 31:16 are not used and are saved as zero; bits 39:32 contain the event's vector (in some examples, for a system call or system enter instruction which use FRED event delivery but not IDT event delivery), vectors 1 and 2 are used, respectively); bits 47:40 are not used and are saved as zero; bits 51:48 encode the event type as follows: 0=external interrupt; 2=non-maskable interrupt; 3=hardware exception (e.g., page fault); 4=software interrupt (INT n); 5=privileged software exception (INT1); 6=software exception (INT3 or INTO); 7=other event (used for example SYSCALL and SYSENTER); 8=SyMT; bits 63:53 are not used and are saved as zero.

The remaining 40 bytes pushed (bytes 39:0) are the return state and have generally the same format as that used by IDT event delivery, for example. These reflect the host-mode state (that is the state before UTNTR was executed). The following items detail the format of the return state on the stack from bottom (highest address) to top: 1) SS selector of the interrupted context (low 16 bits of a 64-bit field) where bits 63:16 of this field are cleared to zero; 2) RSP of the interrupted context (64 bits); 3) RFLAGS of the interrupted context (64 bits) where bit 16 of the RFLAGS field (corresponding to the RF bit) is saved as 1 when delivering events that do the same for IDT event delivery (these are faults other than instruction breakpoints) as well as any traps or interrupts delivered following partial execution of an instruction (e.g., between iterations of a REP-prefixed string instruction). Delivery of other events saves in bit 16 the value that RFLAGS.RF had at the time the event occurred; 4) CS selector of the interrupted context (low 16 bits of a 64-bit field). FRED event delivery saves additional information in the upper portion of this field (this information guides the execution of the FRED return instructions): bit 16 is set to 1 if the event being delivered is a non-maskable interrupt (NMI) and is otherwise cleared to 0, bit 17 is set to 1 for FRED event delivery of SYSCALL, SYSENTER, or INT n (for any value of n) and is otherwise cleared to 0, bit 18 is set to 1 for FRED event delivery of an exception if interrupt blocking by STI was in effect at the time the exception occurred and is otherwise cleared to 0, bits 23:19 are cleared to zero, bits 25:24: for delivery of events that occur while CPL=0, these bits report the current stack level (CSL) at the time the event occurred and for delivery of events that occur while CPL=3, these bits are cleared to 0, bits 63:26 are cleared to zero; 5) RIP of the interrupted context (64 bits). If the event type is software interrupt (INT n), privileged software exception (INT1), software exception (INT3 or INTO), or other event (when used for SYSCALL or SYSENTER); the RIP value saved references the instruction after the one that caused the event being delivered. (if delivery of such an event encounters an exception, the RIP value saved by delivery of the exception will reference the instruction that caused the original event.)

Information is saved on the shadow stack (e.g., shadow stack 120) when supervisor shadow stacks are enabled. How FRED event delivery interacts with the shadow stack depends on whether a new value is being loaded into SSP. If either the CPL or the stack level is changing, the new SSP value is loaded from the FRED_SSP MSR corresponding to the new stack level. In this case, the new shadow stack is checked for a token. This token management may differ from what is done for IDT event delivery. FRED token management depends on whether the FRED_SSP MSR had already been verified (indicated by bit 0 of the MSR being set). If the MSR had not been verified, FRED event delivery marks the base of the new shadow stack with a busy token as follows. It reads 8 bytes from the address in SSP (which was just loaded from the MSR), locking the address read. If the value read is equal to the SSP value (indicating a valid free token), the lock is released, and the value is written back but with bit 0 set (indicating that the token is now busy). This same value is loaded into the MSR. This sets bit 0 of the MSR, indicating that it has been verified. Otherwise, the lock is released, the value is written back without change, and a general-protection fault occurs. If the MSR had already been verified, a confirmation that the base of the new shadow stack has a valid busy token is performed by reading 8 bytes from the address in SSP. If the value read does not equal the SSP value with bit 0 set (indicating a busy token), a general protection fault occurs.

In either case (CPL or stack level changing), the SSP is loaded with the new value. Note that if FRED event delivery subsequently incurs a nested exception or VM exit, the old SSP value is implicitly restored.

If neither the CPL nor the stack level is changing, SSP is not loaded from a FRED_SSP MSR. Instead, if the current SSP value is not 8-byte aligned, 4 bytes of zeroes are pushed on the shadow stack, resulting in an SSP value that is 8-byte aligned.

If the event being delivered occurred while CPL=0, the old CS selector, the old linear instruction pointer, and the old SSP are pushed onto the shadow stack. If SSP had been loaded from a FRED_SSP MSR, these pushes are onto the new shadow stack after the token management outlined above; if it had not been, the existing shadow stack (e.g., shadow stack 120) is used. Each of these three values is pushed in a separate 8-byte field on the shadow stack (e.g., shadow stack 120).

After saving the old context and other information, registers are loaded to establish the new context at 2809. For events that occur while CPL=3, the CS, SS, and GS segments as well as the IA32_KERNEL_GS_BASE MSR may be updated. For CS, the selector is set to IA32_STAR[47:32] AND FFFCH (forcing CS.RPL to 0), the base address is set to 0. The limit is set to FFFFFH and the G bit is set to 1, the type is set to 11 (execute/read accessed code) and the S bit is set to 1, and the DPL is set to 0, the P and L bits are each set to 1, and the D bit is set to 0. For SS, the selector is set to IA32_STAR[47:32]+8, the base address is set to 0. The limit is set to FFFFFH and the G bit is set to 1, the type is set to 3 (read/write accessed data) and the S bit is set to 1, and the DPL is set to 0, and the P and B bits are each set to 1. For GS, the value of the GS base address and the value stored in IA32_KERNEL_GS_BASE MSR are swapped.

For events that occurs while CPL=0, there are no modifications to CS, SS, or GS. After updating the segment registers (if done), RIP, RFLAGS, and CSL are updated with the values determined before.

If the event occurred while CPL=3 and user shadow stacks are enabled, the IA32_PL3_SSP MSR is loaded with the old value of SSP. The value loaded into the MSR may be adjusted so that bits 63:N get the value of bit N–1, where N is the CPU's maximum linear-address width.

If supervisor indirect branch tracking is enabled, the IA32_S_CET MSR may be updated to set the TRACKER value to WAIT_FOR_ENDBRANCH and to clear the SUPPRESS bit to 0.

Below is a rough description of handling a page-not-present exception. Microthread "n" generates an address which ultimately results in a page fault for instruction "i." When instruction i attempts to retire, logic in the allocation/rename/retire circuitry 215 detects an exception. Microcode saves state from all microthreads to the SSA. This includes saving the per microthread control registers and error codes in addition to GPR and vector register state.

Microcode marks the faulting threads in the SYMT FAULT BITMAP bit vector in the SSA. As such, microcode saves enough micro-architectural specific state in the SSA so that execution can be restarted after the fault has been handled.

Microcode then transitions to normal host execution mode, marks an exception on behalf of SyMT mode, and jumps to a FRED error entry point with the SyMT event type set in the exception frame. Microcode reports the IP of the host UTNTR as the faulting instruction. The error vector of the faulting microthread will be reflected the error type.

A non-SyMT OS fault handler checks if the fault was caused due to SyMT execution. If it was, it uses state in the SSA to appropriately handle the fault. The OS fault handler will ultimately execute an ERETU (or similar) instruction with the IP of the UTNTR instruction. The ERETU instruction will restart execution at the UTNTR instruction. Microcode uses the saved state to restart execution.

Figure 32:
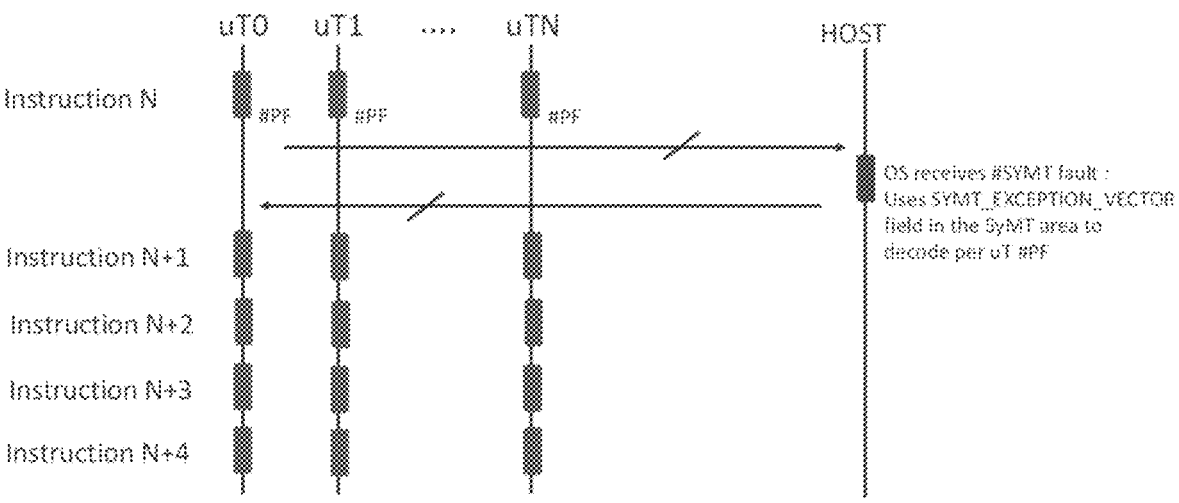
FIG. 32 illustrates an example of page fault handling in bulk.

FIG. 32 illustrates an example of page fault handling in bulk. As shown, the OS receives a SyMTfault using the SyMT_EXCEPTION_VECTOR field in the SyMT area to decode a per uT page fault.

In some examples, system calls are supported in SyMT. In SyMT mode, the FRED event type delivered remains a "SYMT" event (e.g., the FRED system call event type is not delivered in this case). The exception vector field and faulting microthread bitmap (SyMT_FAULT_BITMAP set to indicate which uthreads faulted) from the SSA is used by the operating system to decode that a given microthread is performing a system call operation.

As noted earlier, a processor (such as processor 101) may support virtualization (e.g., the use of a virtual-machine monitor (VMM) or hypervisor that typically runs on a computer and presents to other software the abstraction of one or more virtual machines (VMs)). Each virtual machine may function as a self-contained platform, running its own "guest operating system" (i.e., an operating system (OS) hosted by the VMM) and other software, collectively referred to as guest software. The guest software expects to operate as if it were running on a dedicated computer rather than a virtual machine. That is, the guest software expects to control various events and have access to hardware resources. The hardware resources may include processor-resident resources (e.g., control registers), resources that reside in memory (e.g., descriptor tables) and resources that reside on the underlying hardware platform (e.g., input-output devices). The events may include internal interrupts, external interrupts, exceptions, platform events (e.g., initialization (INIT) or system management interrupts (SMIs)), and the like.

In a virtual-machine environment, the VMM should be able to have ultimate control over the events and hardware resources as described in the previous paragraph to provide proper operation of guest software running on the virtual machines and for protection from and among guest software running on the virtual machines. To achieve this, the VMM typically receives control when guest software accesses a protected resource or when other events (such as interrupts or exceptions) occur. For example, when an operation in a virtual machine supported by the VMM causes a system device to generate an interrupt, the currently running virtual machine is interrupted and control of the processor is passed to the VMM. The VMM then receives the interrupt and handles the interrupt itself or invokes an appropriate virtual machine and delivers the interrupt to that virtual machine.

Figure 29:
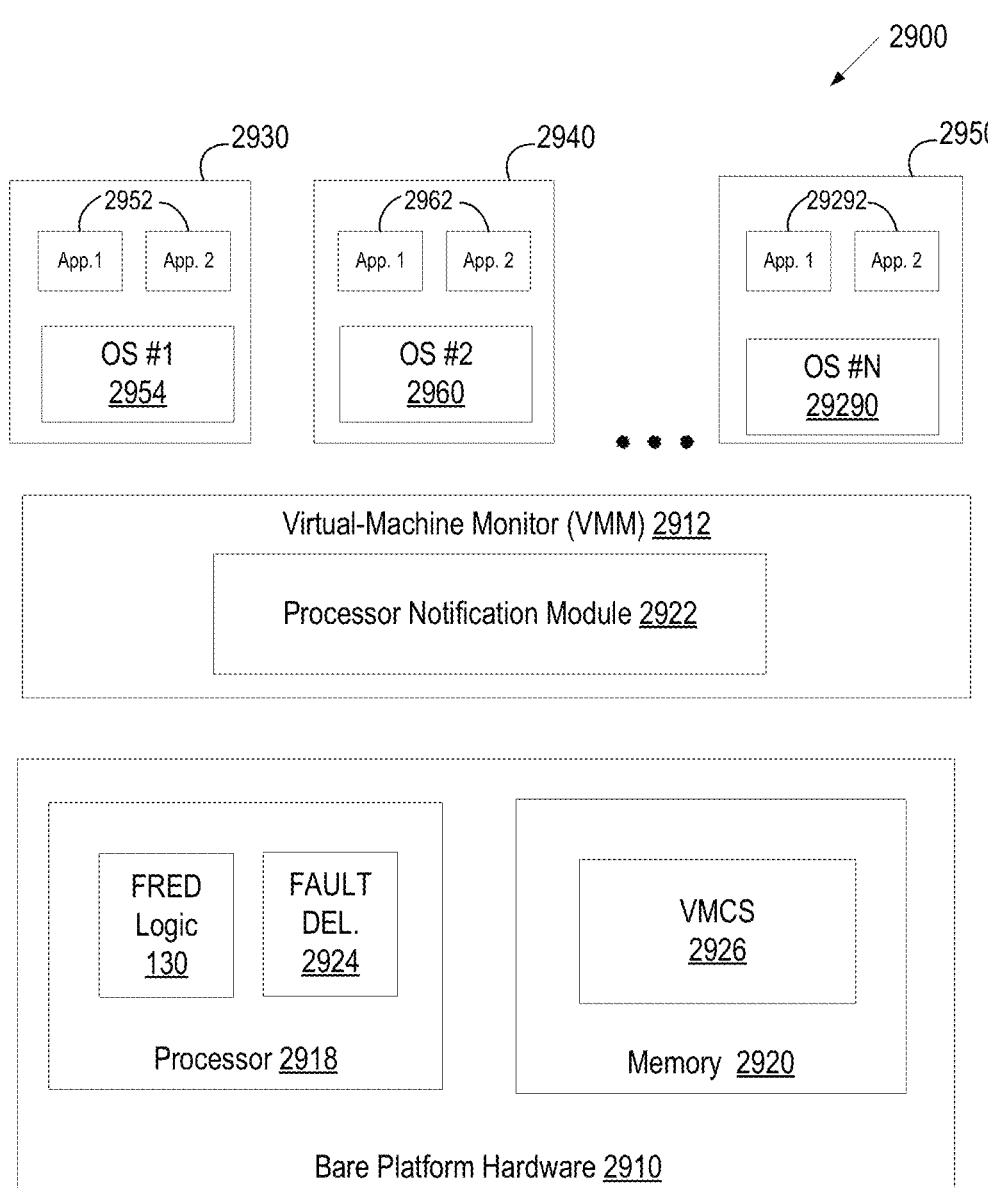
FIG. 29 illustrates a virtual-machine environment, in which some examples operate.

FIG. 29 illustrates a virtual-machine environment 2900, in which some examples operate. In the virtual-machine environment 2900, bare platform hardware 2910 includes a computing platform, which may be capable, for example, of executing a standard operating system (OS) and/or a virtual-machine monitor (VMM), such as a VMM 2912. FIG. 29 shows three VMs, 2930, 2940 and 2950. The guest software running on each VM may include a guest OS such as a guest OS 2954, 2960 or 2970 and various guest software applications 2952, 2962 and 2972.

The guest OSes 2954, 2960 and 2970 expect to access physical resources (e.g., processor registers, memory, and input-output (I/O) devices) within corresponding VMs (e.g., VM 2930, 2940 and 2950) on which the guest OSs are running and to perform other functions. For example, the guest OS expects to have access to all registers, caches, structures, I/O devices, memory, and the like, according to the architecture of the processor and platform presented in the VM. The resources that can be accessed by the guest software may either be classified as "privileged" or "non-privileged." For privileged resources, the VMM 2912 facilitates functionality desired by guest software while retaining ultimate control over these privileged resources. Non-privileged resources do not need to be controlled by the VMM 2912 and can be accessed by guest software.

Further, each guest OS expects to handle various fault events such as exceptions (e.g., page faults, general protection faults, etc.), interrupts (e.g., hardware interrupts, software interrupts), and platform events (e.g., initialization (INIT) and system management interrupts (SMIs)). Some of these fault events are "privileged" because they must be handled by the VMM 2912 to ensure proper operation of VMs 2930 through 2950 and for protection from and among guest software.

When a privileged fault event occurs or guest software attempts to access a privileged resource, control may be transferred to the VMM 2912. The transfer of control from guest software to the VMM 2912 is referred to herein as a VM exit. After facilitating the resource access or handling the event appropriately, the VMM 2912 may return control to guest software. The transfer of control from the VMM 2912 to guest software is referred to as a VM entry. The VMM 2912 may request the processor 2918 to perform a VM entry by executing a VM entry instruction.

The processor 2918 (e.g., processor 101) may control the operation of the VMs 2930, 2940 and 2950 in accordance with data stored in a virtual machine control structure (VMCS) 2926. The VMCS 2926 is a structure that may contain state of guest software, state of the VMM 2912, execution control information indicating how the VMM 2912 wishes to control operation of guest software, information controlling transitions between the VMM 2912 and a VM, etc. The VMCS may be stored in memory 2920. Multiple VMCS structures may be used to support multiple VMs.

When a privileged fault event occurs, the VMM 2912 may handle the fault itself or decide that the fault needs to be handled by an appropriate VM. If the VMM 2912 decides that the fault is to be handled by a VM, the VMM 2912 requests the processor 2918 to invoke this VM and to deliver the fault to this VM. The VMM 2912 may accomplish this by setting a fault indicator to a delivery value and generating a VM entry request. The fault indicator may be stored in the VMCS 2926.

The processor 2918 includes fault delivery logic 2924 that receives the request of the VMM 2912 for a VM entry and determines whether the VMM 2922 has requested the delivery of a fault to the VM. The fault delivery logic 2924 may make this determination based on the current value of the fault indicator stored in the VMCS 2926. If the fault delivery logic 2924 determines that the VMM has requested the delivery of the fault to the VM, it delivers the fault to the VM when transitioning control to this VM. Note that FRED logic 130 may be a part of the fault delivery logic 2924 or work with the fault delivery logic 2924.

Delivering of the fault may involve searching a redirection structure for an entry associated with the fault being delivered, extracting from this entry a descriptor of the location of a routine designated to handle this fault, and jumping to the beginning of the routine using the descriptor. Routines designated to handle corresponding interrupts, exceptions or any other faults are referred to as handlers. In some instruction set architectures (ISAs), certain faults are associated with error codes that may need to be pushed onto stack (or provided in a hardware register or via other means) prior to jumping to the beginning of the handler.

During the delivery of a fault, the processor 2918 may perform one or more address translations, converting an address from a virtual to physical form. For example, the address of the interrupt table or the address of the associated handler may be a virtual address. The processor may also need to perform various checks during the delivery of a fault. For example, the processor may perform consistency checks such as validation of segmentation registers and access addresses (resulting in limit violation faults, segment-not-present faults, stack faults, etc.), permission level checks that may result in protection faults (e.g., general-protection faults), etc.

Address translations and checking during fault vectoring may result in a variety of faults, such as page faults, general protection faults, etc. Some faults occurring during the delivery of a current fault may cause a VM exit. For example, if the VMM 2912 requires VM exists on page faults to protect and virtualize the physical memory, then a page fault occurring during the delivery of a current fault to the VM will result in a VM exit.

The fault delivery logic 2924 may address the above possible occurrences of additional faults by checking whether the delivery of the current fault was successful. If the fault delivery logic 2924 determines that the delivery was unsuccessful, it further determines whether a resulting additional fault causes a VM exit. If so, the fault delivery logic 2924 generates a VM exit. If not, the fault delivery logic 2924 delivers the additional fault to the VM.

Figure 30:
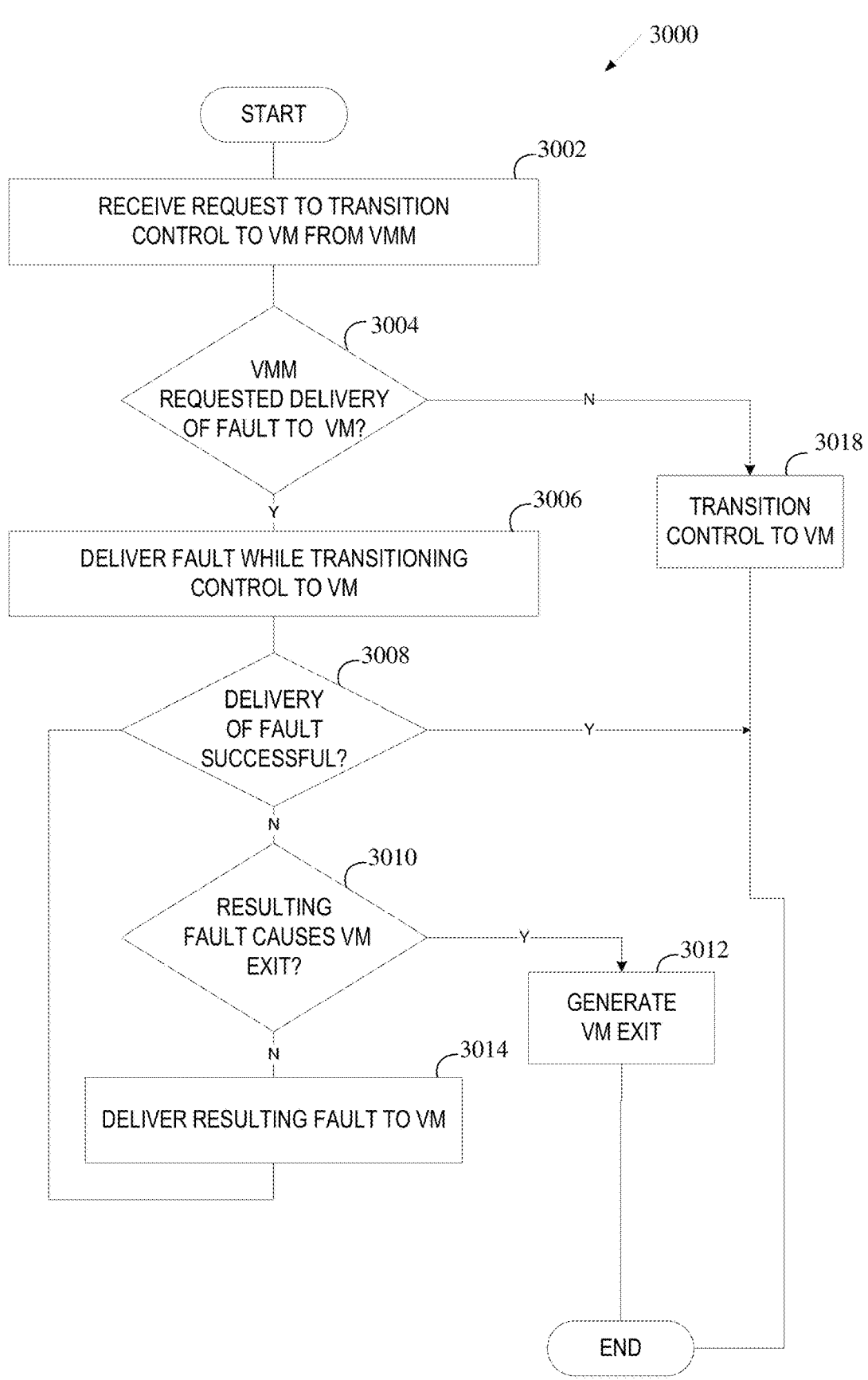
FIG. 30 is a flow diagram of an example of a process for handling faults in a virtual machine environment.

FIG. 30 is a flow diagram of an example of a process for handling faults in a virtual machine environment. It is to be noted that this example as shown in FIG. 30 is independent from the other exemplary methods. The process may be performed by processing logic that may include hardware (e.g., circuitry, dedicated logic, programmable logic, microcode, etc.), software (such as that run on a general-purpose computer system or a dedicated machine), or a combination of both. Process 3000 may be performed by fault delivery logic 2924 and/or FRED logic 130.

Referring to FIG. 30, process 3000 begins with processing logic receiving a request to transition control to a VM from a VMM (block 3002). The request to transition control may be received via a VM entry instruction executed by the VMM.

At decision box 3004, processing logic determines whether the VMM has requested a delivery of a fault to the VM that is to be invoked. A fault may be an internal interrupt (e.g., software interrupt), an external interrupt (e.g., hardware interrupt), an exception (e.g., page fault), a platform event (e.g., initialization (INIT) or system management interrupts (SMIs)), or any other fault event. Processing logic may determine whether the VMM has requested the delivery of a fault by reading the current value of a fault indicator maintained by the VMM. The fault indicator may reside in the VMCS or any other data structure accessible to the VMM and processing logic. When the VMM wants to have a fault delivered to a VM, the VMM may set the fault indicator to the delivery value and then generates a request to transfer control to this VM. If no fault delivery is needed during a VM entry, the VMM sets the fault indicator to a no-delivery value prior to requesting the transfer of control to the VM.

If processing logic determines that the VMM has requested a delivery of a fault, processing logic delivers the fault to the VM while transitioning control to the VM (block 3006). Processing logic then checks whether the delivery of the fault was successful (decision box 3008). If so, process 3000 ends. If not, processing logic determines whether a resulting additional fault causes a VM exit (decision box 3010). If so, processing logic generates a VM exit (block 3012). If not, processing logic delivers the additional fault to the VM (block 3014), and, returning to block 3008, checks whether this additional fault was delivered successfully. If so, process 3000 ends. If not, processing logic returns to decision box 3010.

If processing logic determines that the VMM has not requested a delivery of a fault, processing logic transitions control to the VM without performing any fault related operations (block 3018).

When processing logic needs to deliver a fault to a VM, it may search a redirection structure (e.g., the interrupt-descriptor table in the IA-32 ISA)) for an entry associated with the fault being delivered, may extract from this entry a descriptor of a handler associated with this fault, and may jump to the beginning of the handler using the descriptor. The interrupt-descriptor table may be searched using fault identifying information such as a fault identifier and a fault type (e.g., external interrupt, internal interrupt, non-maskable interrupt (NMI), exception, etc.). Certain faults (e.g., some exceptions) may be associated with error codes that need to be pushed onto stack (or provided in a hardware register or via other means) prior to jumping to the beginning of the handler. The fault identifying information and associated error code may be provided by the VMM using a designated data structure. The designated data structure may be part of the VMCS.

FIG. 31 illustrates an example of a VMCS. Each virtual machine is a guest software environment that supports a stack (and potentially a shadow stack) including, for example, an operating system and application software. Each VM may operate independently of other virtual machines and uses the same interface to processor(s), memory, storage, graphics, and I/O provided by a physical platform. The software stack acts as if the software stack were running on a platform with no VMM. Software executing in a virtual machine operates with reduced privilege or its original privilege level such that the VMM can retain control of platform resources per a design of the VMM or a policy that governs the VMM, for example.

The VMM may begin a virtual machine extension (VMX) root mode of operation. The VMM starts guest execution by invoking a VM entry instruction. The VMM invokes a launch instruction for execution for a first VM entry of a virtual machine. The VMM invokes a resume for execution for all subsequent VM entries of that virtual machine.

During execution of a virtual machine, various operations, or events (e.g., hardware interrupts, software interrupts, exceptions, task switches, and certain VM instructions) may cause a VM exit to the VMM, after which the VMM regains control. VM exits transfer control to an entry point specified by the VMM, e.g., a host instruction pointer. The VMM may act appropriate to the cause of the VM exit and may then return to the virtual machine using a VM entry.

In some examples, SyMT mode requires additions to VMX and a hypervisor. Analogous to non-virtualized behavior, a bulk VMExit will be generated for exiting conditions (exceptions, VMExit) for microthreads in non-VMX root mode. A realistic example of a bulk VMX exit in SyMT mode is a spin-loop lock that uses the "pause" instruction as a throttling mechanism for threads that fail to acquire the lock. While it is conceivable that VMX controls could be configured to avoid most bulk VMX exits in SyMT mode, to fully support the VMX architecture and provide orthogonality with non-VMX mode, we have decided to extend the bulk fault mechanism to SyMT mode.

These transitions of a VM entry and a VM exit are controlled by the VMCS 2926 data structure stored in the memory. The processor controls access to the VMCS 2926 through a component of processor state called the VMCS pointer (one per virtual processor) that is setup by the VMM. A VMM may use a different VMCS for each virtual processor that it supports. For a virtual machine with multiple virtual processors, the VMM could use a different VMCS 2926 for each virtual processor.

The VMCS 2926 may include six logical groups of fields: a guest-state area 3102, a host-state area 3104, VM-execution control fields 3106, VM-exit control fields 3108, VM-entry control fields 3110, and a VM-exit information fields 3112. These six logical groups of fields are merely exemplary and other processors may have more or fewer groups of fields.

The VM-execution control fields 3106 define how the processor 2918 should react in response to different events occurring in the VM. The VM-exit control fields 3108 may define what the processor should do when it exits from the virtual machine, e.g., store a guest state of the VM in the VMCS 2926 and load the VMM (or host) state from VMCS 2926. The VMM state may be a host state including fields that correspond to processor registers, including the VMCS pointer, selector fields for segment registers, base-address fields for some of the same segment registers, and values of a list of model-specific registers (MSRs) that are used for debugging, program execution tracing, computer performance monitoring, and toggling certain processor features.

Not all exit conditions have meaning in SyMT mode, for example, a VMExit due to an external interrupt is expected to be SyMT-unaware. The list of VMX exits in the table below are the exits that require specialized handling in SyMT mode for correctness. The table below provides examples of VM-execution control fields 3106.

| Basic exit reason | Description |
|---|---|
| 10 | CPUID-Guest software attempted to execute CPUID. |
| 15 | RDPMC-Guest software attempted to execute RDPMC and the "RDPMC exiting" VM-execution control was 1 |
| 16 | RDTSC-Guest software attempted to execute RDTSC and the "RDTSC exiting" VM-execution control was 1. |
| 30 | I/O instruction-Guest software attempted to execute an I/O instruction and either:<br>1: The "use I/O bitmaps" VM-execution control was 0 and the "unconditional I/O exiting" VM-execution control was 1.<br>2: The "use I/O bitmaps" VM-execution control was 1 and a bit in the I/O bitmap associated with one of the ports accessed by the I/O instruction was 1. |
| 40 | PAUSE-Either guest software attempted to execute PAUSE and the "PAUSE exiting" VM-execution control was 1 or the "PAUSE-loop exiting" VM-execution control was 1 and guestsoftware executed a PAUSE loop with execution time exceeding PLE_Window. |
| 44 | APIC access. Guest software attempted to access memory at a physical address on the APIC-access page and the "virtualize APIC accesses" VM-execution control was 1 |
| 48 | EPT violation-An attempt to access memory with a guest-physical address was disallowed by the configuration of the EPT paging structures. |
| 49 | EPT misconfiguration-An attempt to access memory with a guest-physical address encountered a misconfigured EPT paging-structure entry. |
| 51 | RDTSCP-Guest software attempted to execute RDTSCP and the "enable RDTSCP" and "RDTSC exiting" VM-execution controls were both 1. |
| 55 | XSETBV-Guest software attempted to execute XSETBV. |
| 57 | RDRAND-Guest software attempted to execute RDRAND and the "RDRAND exiting" VM-execution control was 1. |
| 59 | VMFUNC-Guest software invoked a VM function with the VMFUNC instruction and the VM function either was not enabled or generated a function-specific condition causing a VM exit. (VMFUNCs can be legal at CPL3-legality defined by VMFUNC) |

-continued

| Basic exit reason | Description |
|---|---|
| 60 | ENCLS-Guest software attempted to execute ENCLS and "enable ENCLS exiting" VM-execution control was 1 and either (1) EAX < 63 and the corresponding bit in the ENCLS- exiting bitmap is 1; or (2) EAX ≥ 63 and bit 63 in the ENCLS-exiting bitmap is 1. |
| 61 | RDSEED-Guest software attempted to execute RDSEED and the "RDSEED exiting" VM-execution control was 1. |
| 62 | Page-modification log full. The processor attempted to create a page-modification log entry and the value of the PML index was not in the range 0-511. |
| 66 | SPP-related event. The processor attempted to determine an access's sub-page write permission and encountered an SPP miss or an SPP misconfiguration. |
| 67 | UMWAIT-Guest software attempted to execute UMWAIT and the "enable user wait and pause" and "RDTSC exiting" VM-execution controls were both 1. |
| 68 | TPAUSE-Guest software attempted to execute TPAUSE and the "enable user wait and pause" and "RDTSC exiting" VM-execution controls were both 1. |

To support the SyMT bulk fault mechanism work in VMX mode, several existing fields in the VMCS are extended for microthreads in some examples. In particular, the following VMCS ext fields 3108 are required for each microthread an exit reason (encoding the reason for the VM exit); exit qualification (additional information about an exit due to debug exceptions, page fault exceptions, start-up IPIs, task switches, control register access, I/O instructions, wait, etc.; guest-linear address; and guest physical address.

In some examples, the VMCS 2926 is extended to accommodate the additional, per-microthread fields. In some examples, these additional values are stored in the SSA. The additional fields added to the SyMT state area are only accessible in VMX root mode and VMX-related fields in the SSA are cleared on VMResume instruction.

The VM-entry control fields 3110 may define what the processor should do upon entry to the virtual machine, e.g., to conditionally load the guest state of the virtual machine from the VMCS, including debug controls, and inject an interrupt or exception, as necessary, to the virtual machine during entry.

The guest-state area 3102 may be a location where the processor stores a VM processor state upon exits from and entries to the virtual machine.

The host-state area 3104 may be a location where the processor stores the VMM processor (or host) state upon exit from the virtual machine.

The VM-exit information fields 3112 may be a location where the processor stores information describing a reason of exit from the virtual machine. VM vested-exception support changes the way that VM exits establish certain VM-exit information fields 3112 and the way that VM entries use a related VM-entry control field 3110.

| Format of Exit Reason | |
|---|---|
| Bit Position(s) | Content |
| 15:0 | Basic exit reason |
| 16 | Always cleared to 0 |
| 26:17 | Not currently defined |
| 29 | A VM exit saves this bit as 1 to indicate that the VM exit was incident to enclave mode. |
| 30 | Pending MTF VM exit |
| 31 | VM exit from VMX root operation |
| 30 | Not currently defined |
| 31 | VM-entry failure (0 = true VM exit; 1 = VM-entry failure) |

A VMM (or its hosting operating system) should be able to use FRED transitions as well as allowed guest software to do so. For that reason, VM transitions (VM entries and VM exits) must establish context sufficient to support FRED event delivery immediately after the transition. In addition, VM exits should be able to save the corresponding guest context before loading that for the VMM.

A VMM (or its hosting operating system) should be able to use FRED transitions as well as allow guest software to do so. For that reason, VM transitions (VM entries and VM exits) establish context sufficient to support FRED event delivery immediately after the transition. In addition, VM exits should be able to save the corresponding guest context before loading that for the VMM.

In some examples, SyMT supports debug. For example, when a debug exception occurs, the operating system scans the SyMT save area to determine which threads caused the debug exception. This scheme works for code breakpoints as the RIP is saved in the SyMT state area; however, it will not work for data breakpoints there is currently no architecturally defined way to track the last data address per microthread.

In some examples, to support data breakpoints, the SyMT state area could be augmented with a bit vector to extend a debug status register (D to be microthread aware. Each of the four-bit vectors are associated with a given debug register (e.g., debug register 0 is associated with bit vector 0). An entry in the bit vector corresponds to a microthread. When a microthread hits a debug, address tracked by DR0 to DR3, the bit position corresponding to the microthread ID is updated in the appropriate bitvector. As an example, if microthread 3 performs a store to the address tracked by DR2, the $4^{th}$ bit of the $3^{rd}$ debug bit vector will be set.

In some examples, a debug control register (DR7) is augment with a similar bit vector scheme to make the register microthread aware. In this scheme, additional four-bit vectors control each of the DR0 to DR3 registers on a per microthread basis.

In some examples, DR0 through DR7 are replicated for each microthread.

In general, the performance counters in SyMT mode are updated for each microthread at retirement. This scheme updates each counter by the number of active threads for a given instruction. Additional counters are added for SyMT specific events to track information lost by the aggregate scheme in some examples.

In some examples, support for last branch records (LBRs) in SyMT mode is to addition of a "LBR_SYMT_INFO" field to the LBR stack. The augmentation of the LBR stack with "LBR_SYMT_INFO" allows the tracking of the retired SyMT microthread mask.

To support processor trace functionality in SyMT mode, in some examples, a retired microthread mask is included in the output record stream. A processor trace decoder can use the saved masked in the output stream to reconstruct the execution stream for each microthread.

Figure 33:
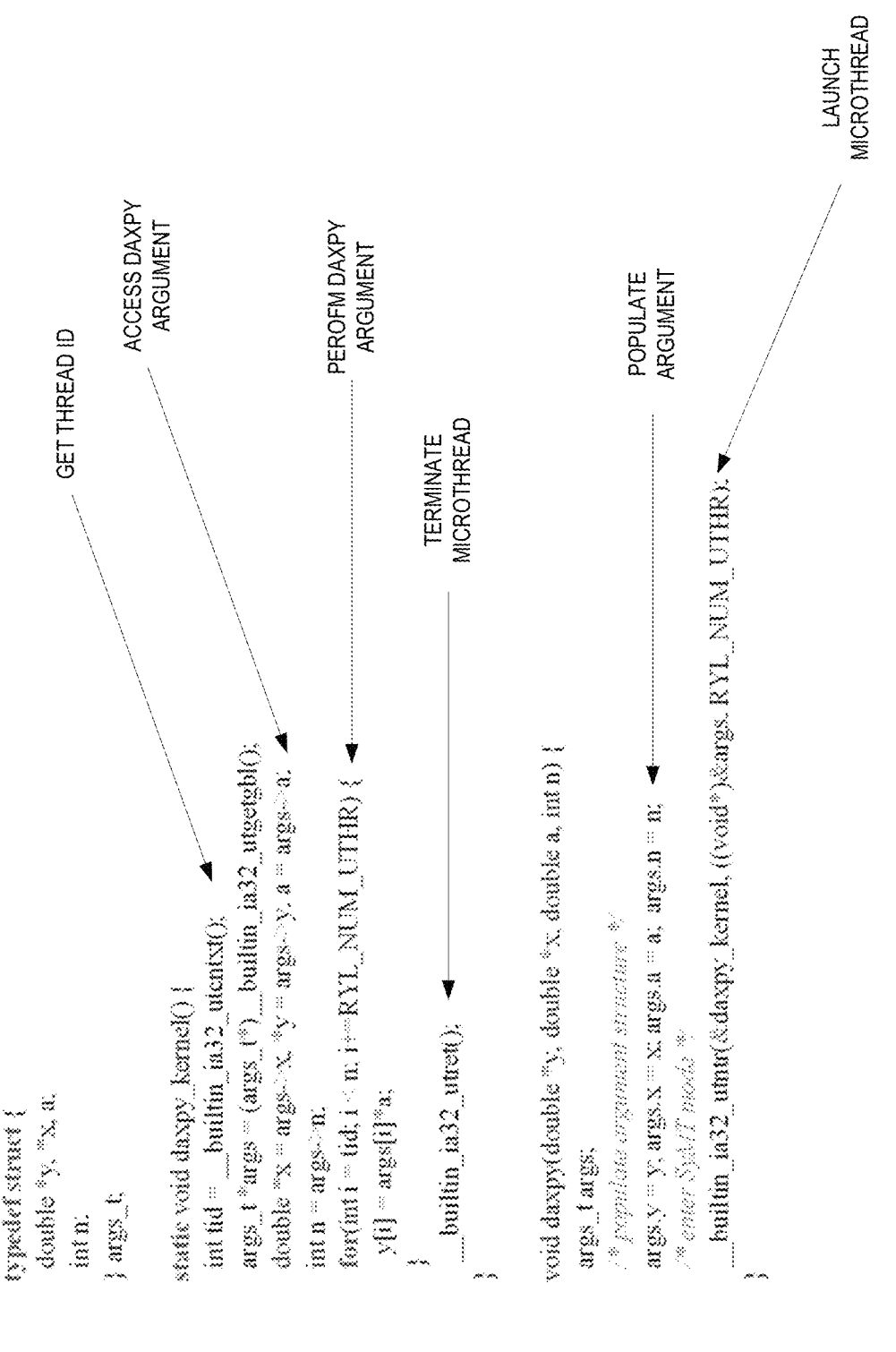
FIG. 33 illustrates an example of the DAXPY kernel implemented in the C language using SyMT compiler intrinsics.

FIG. 33 illustrates an example of the DAXPY kernel implemented in the C language using SyMT compiler intrinsics. A line-by-line description of the example follows: 1) lines 1 through 4 define a structure used to pass arguments to the microthreads; 2) lines 5 through 14 embody the code executed by the microthreads to implement the actual DAXPY kernel executing in SyMT mode. The_builtin_ia32_ugetgbl( )" intrinsic access the opaque pointer shared with all the active microthreads. The programmer has casted the pointer to type "arg_t*" to extract kernel arguments. The "_builtin_ia32_utcntxt ( )" intrinsic accesses the thread id of the currently executing microthread. UTRET terminates the thread.

The DAXPY kernel has loop parameters that are structured such that work is interleaved among the microthreads in order increase memory system efficiency. The last lines setup, for, and join microthreads and are executed in conventional mode. The "_builtin_ia32_utntr ( )" instrinsic launches the microthreads.

Detailed below are exemplary architectures, systems, instruction formats, etc. which support the examples above. Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 34:
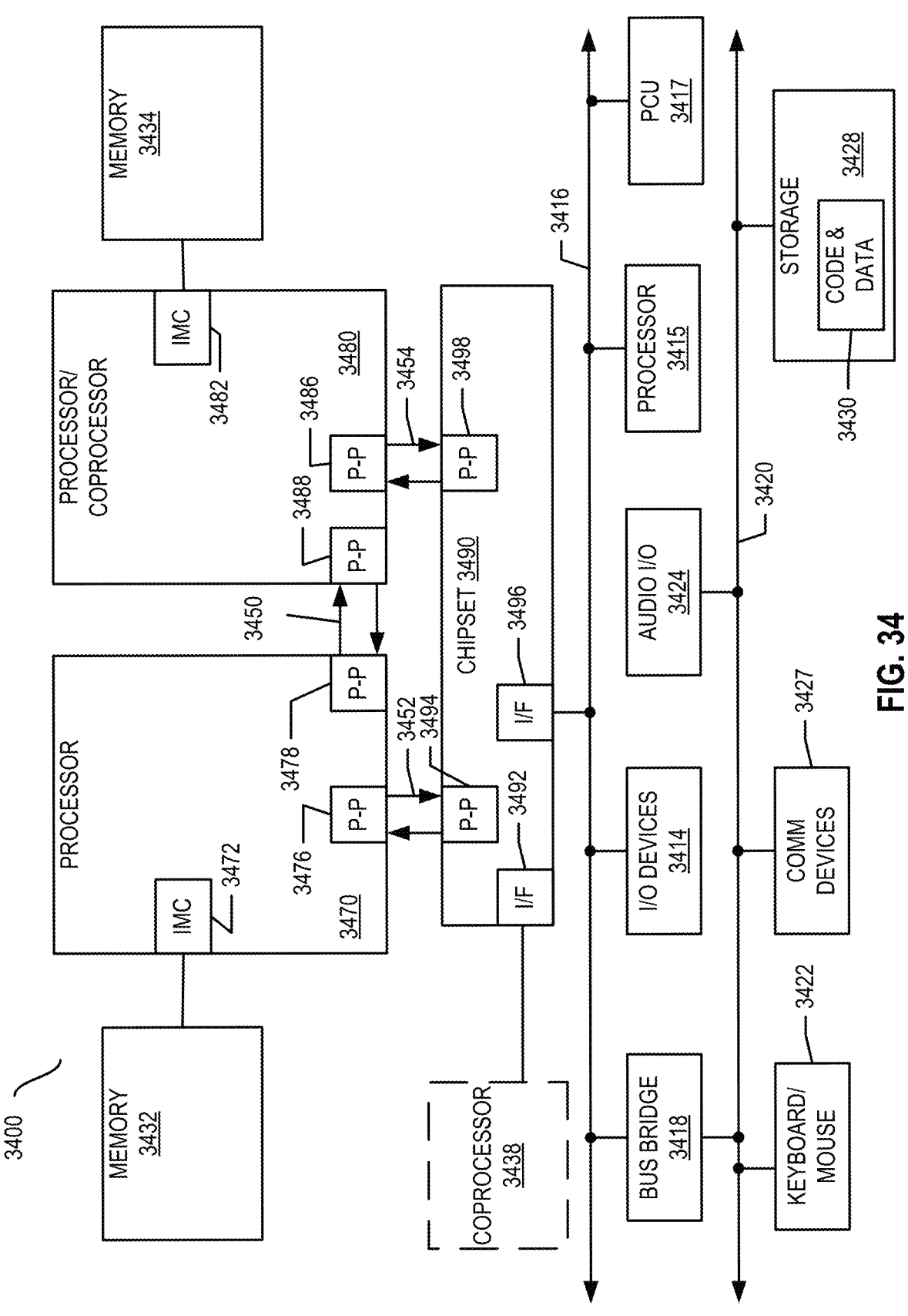
FIG. 34 illustrates examples of an exemplary system.

FIG. 34 illustrates an exemplary system. Multiprocessor system 3400 is a point-to-point interconnect system and includes a plurality of processors including a first processor 3470 and a second processor 3480 coupled via a point-to-point interconnect 3450. In some examples, the first processor 3470 and the second processor 3480 are homogeneous. In some examples, first processor 3470 and the second processor 3480 are heterogenous. Though the exemplary system 3400 is shown to have two processors, the system may have three or more processors, or may be a single processor system.

Processors 3470 and 3480 are shown including integrated memory controller (IMC) circuitry 3472 and 3482, respectively. Processor 3470 also includes as part of its interconnect controller point-to-point (P-P) interfaces 3476 and 3478; similarly, second processor 3480 includes P-P interfaces 3486 and 3488. Processors 3470, 3480 may exchange information via the point-to-point (P-P) interconnect 3450 using P-P interface circuits 3478, 3488. IMCs 3472 and 3482 couple the processors 3470, 3480 to respective memories, namely a memory 3432 and a memory 3434, which may be portions of main memory locally attached to the respective processors.

Processors 3470, 3480 may each exchange information with a chipset 3490 via individual P-P interconnects 3452, 3454 using point to point interface circuits 3476, 3494, 3486, 3498. Chipset 3490 may optionally exchange information with a coprocessor 3438 via an interface 3492. In some examples, the coprocessor 3438 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 3470, 3480 or outside of both processors, yet connected with the processors via P-P interconnect, such that either or both processors' local cache information may be stored in the shared cache if a processor is placed into a low power mode.

Chipset 3490 may be coupled to a first interconnect 3416 via an interface 3496. In some examples, first interconnect 3416 may be a Peripheral Component Interconnect (PCI) interconnect, or an interconnect such as a PCI Express interconnect or another I/O interconnect.

In some examples, one of the interconnects couples to a power control unit (PCU) 3417, which may include circuitry, software, and/or firmware to perform power management operations with regard to the processors 3470, 3480 and/or co-processor 3438. PCU 3417 provides control information to a voltage regulator (not shown) to cause the voltage regulator to generate the appropriate regulated voltage. PCU 3417 also provides control information to control the operating voltage generated. In various examples, PCU 3417 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 3417 is illustrated as being present as logic separate from the processor 3470 and/or processor 3480. In other cases, PCU 3417 may execute on a given one or more of cores (not shown) of processor 3470 or 3480. In some cases, PCU 3417 may be implemented as a microcontroller (dedicated or general-purpose) or other control logic configured to execute its own dedicated power management code, sometimes referred to as P-code. In yet other examples, power management operations to be performed by PCU 3417 may be implemented externally to a processor, such as by way of a separate power management integrated circuit (PMIC) or another component external to the processor. In yet other examples, power management operations to be performed by PCU 3417 may be implemented within BIOS or other system software.

Various I/O devices 3414 may be coupled to first interconnect 3416, along with a bus bridge 3418 which couples first interconnect 3416 to a second interconnect 3420. In some examples, one or more additional processor(s) 3415, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 3416. In some examples, second interconnect 3420 may be a low pin count (LPC)

interconnect. Various devices may be coupled to second interconnect 3420 including, for example, a keyboard and/or mouse 3422, communication devices 3427 and a storage circuitry 3428. Storage circuitry 3428 may be one or more non-transitory machine-readable storage media as described below, such as a disk drive or other mass storage device which may include instructions/code and data 3430 and may implement the storage in some examples. Further, an audio 1/O 3424 may be coupled to second interconnect 3420. Note that other architectures than the point-to-point architecture described above are possible. For example, instead of the point-to-point architecture, a system such as multiprocessor system 3400 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 35:
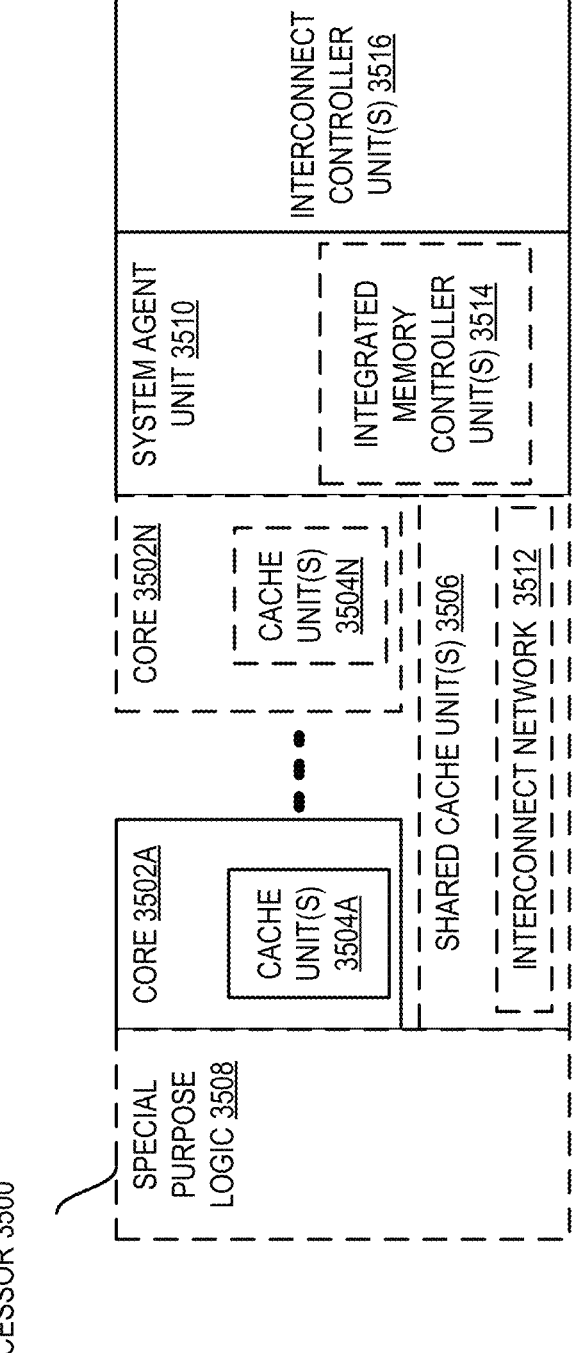
FIG. 35 illustrates a block diagram of examples of a processor that may have more than one core, may have an integrated memory controller, and may have integrated graphics.

FIG. 35 illustrates a block diagram of an example processor 3500 that may have more than one core and an integrated memory controller. The solid lined boxes illustrate a processor 3500 with a single core 3502A, a system agent unit circuitry 3510, a set of one or more interconnect controller unit(s) circuitry 3516, while the optional addition of the dashed lined boxes illustrates an alternative processor 3500 with multiple cores 3502(A)-(N), a set of one or more integrated memory controller unit(s) circuitry 3514 in the system agent unit circuitry 3510, and special purpose logic 3508, as well as a set of one or more interconnect controller units circuitry 3516. Note that the processor 3500 may be one of the processors 3470 or 3480, or co-processor 3438 or 3415 of FIG. 34.

Thus, different implementations of the processor 3500 may include: 1) a CPU with the special purpose logic 3508 being integrated graphics and/or scientific (throughput) logic (which may include one or more cores, not shown), and the cores 3502(A)-(N) being one or more general purpose cores (e.g., general purpose in-order cores, general purpose out-of-order cores, or a combination of the two); 2) a coprocessor with the cores 3502(A)-(N) being a large number of special purpose cores intended primarily for graphics and/or scientific (throughput); and 3) a coprocessor with the cores 3502(A)-(N) being a large number of general purpose in-order cores. Thus, the processor 3500 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 3500 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 3504(A)-(N) within the cores 3502(A)-(N), a set of one or more shared cache unit(s) circuitry 3506, and external memory (not shown) coupled to the set of integrated memory controller unit(s) circuitry 3514. The set of one or more shared cache unit(s) circuitry 3506 may include one or more mid-level caches, such as level 2 (L2), level 3 (L3), level 4 (L4), or other levels of cache, such as a last level cache (LLC), and/or combinations thereof. While in some examples ring-based interconnect network circuitry 3512 interconnects the special purpose logic 3508 (e.g., integrated graphics logic), the set of shared cache unit(s) circuitry 3506, and the system agent unit circuitry 3510, alternative examples use any number of well-known techniques for interconnecting such units. In some examples, coherency is maintained between one or more of the shared cache unit(s) circuitry 3506 and cores 3502(A)-(N).

In some examples, one or more of the cores 3502(A)-(N) are capable of multi-threading. The system agent unit circuitry 3510 includes those components coordinating and operating cores 3502(A)-(N). The system agent unit circuitry 3510 may include, for example, power control unit (PCU) circuitry and/or display unit circuitry (not shown). The PCU may be or may include logic and components needed for regulating the power state of the cores 3502(A)-(N) and/or the special purpose logic 3508 (e.g., integrated graphics logic). The display unit circuitry is for driving one or more externally connected displays.

The cores 3502(A)-(N) may be homogenous in terms of instruction set architecture (ISA). Alternatively, the cores 3502(A)-(N) may be heterogeneous in terms of ISA; that is, a subset of the cores 3502(A)-(N) may be capable of executing an ISA, while other cores may be capable of executing only a subset of that ISA or another ISA.

Exemplary Core Architectures-In-order and out-of-order core block diagram.

Figure 36A:
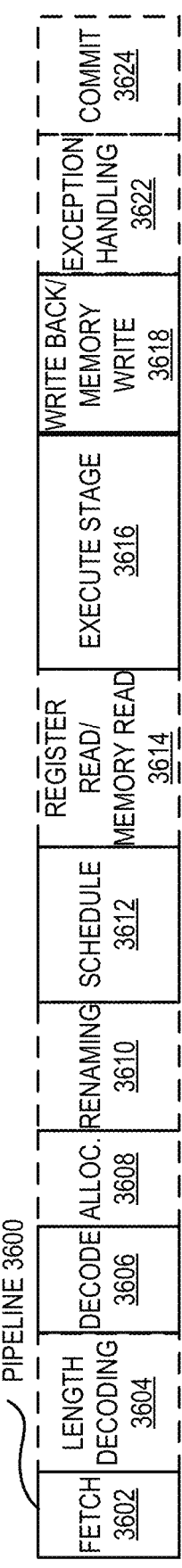
FIG. 36(A) is a block diagram illustrating both an exemplary in-order pipeline and an exemplary register renaming, out-of-order issue/execution pipeline according to examples.
Figure 36B:
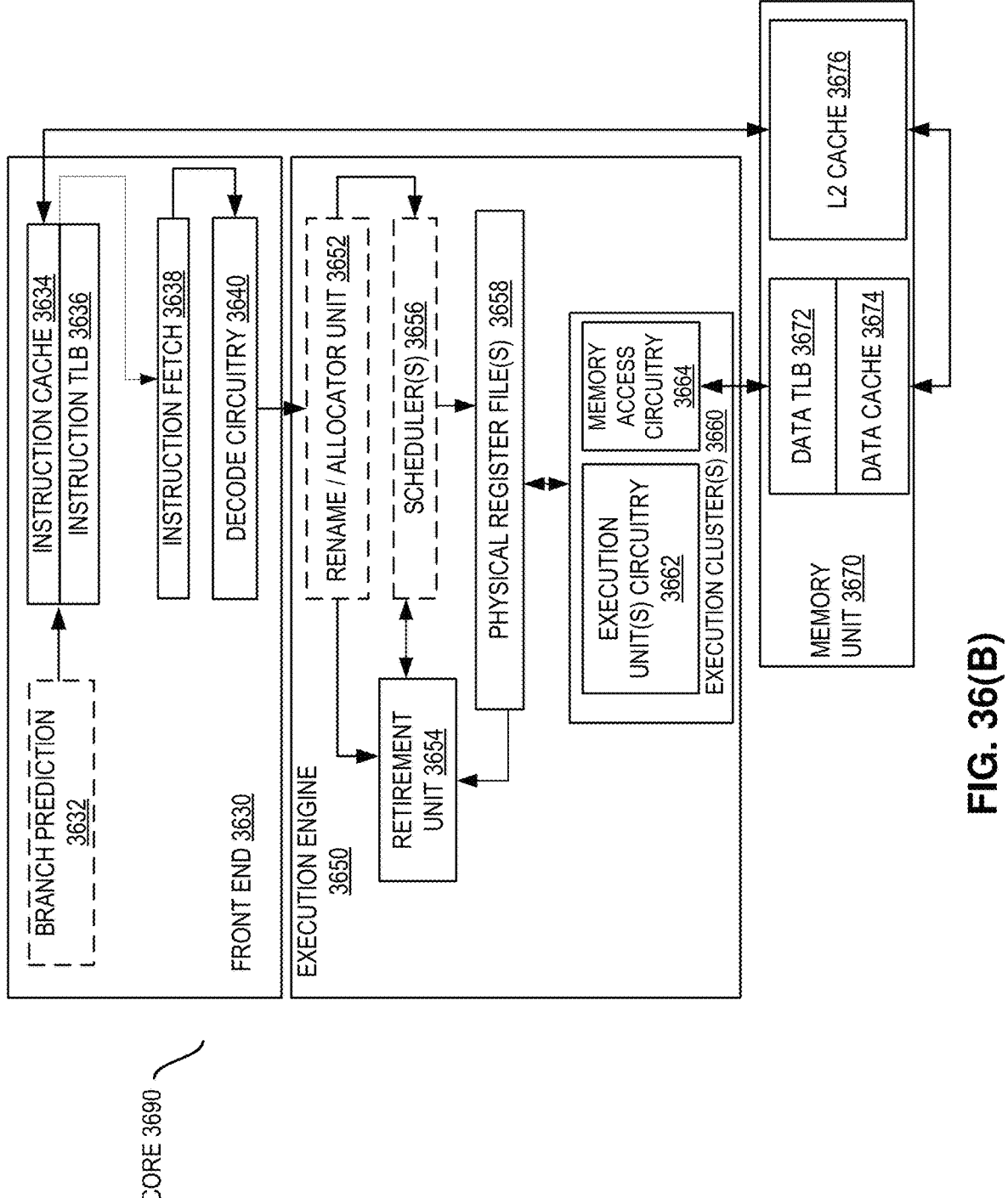
FIG. 36(B) is a block diagram illustrating both an exemplary example of an in-order architecture core and an exemplary register renaming, out-of-order issue/execution architecture core to be included in a processor according to examples.

FIG. 36(A) is a block diagram illustrating both an exemplary in-order pipeline and an exemplary register renaming, out-of-order issue/execution pipeline according to examples. FIG. 36(B) is a block diagram illustrating both an exemplary example of an in-order architecture core and an exemplary register renaming, out-of-order issue/execution architecture core to be included in a processor according to examples. The solid lined boxes in FIGS. 36(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 36(A), a processor pipeline 3600 includes a fetch stage 3602, an optional length decoding stage 3604, a decode stage 3606, an optional allocation (Alloc) stage 3608, an optional renaming stage 3610, a schedule (also known as a dispatch or issue) stage 3612, an optional register read/memory read stage 3614, an execute stage 3616, a write back/memory write stage 3618, an optional exception handling stage 3622, and an optional commit stage 3624. One or more operations can be performed in each of these processor pipeline stages. For example, during the fetch stage 3602, one or more instructions are fetched from instruction memory, and during the decode stage 3606, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 3606 and the register read/memory read stage 3614 may be combined into one pipeline stage. In one example, during the execute stage 3616, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 36(B) may implement the pipeline 3600 as follows: 1) the instruction fetch circuitry 3638 performs the fetch and length decoding stages 3602 and 3604; 2) the decode circuitry 3640 performs the decode stage 3606; 3) the rename/allocator unit circuitry 3652 performs the allocation stage 3608 and renaming stage 3610; 4) the scheduler(s) circuitry 3656 performs the schedule stage 3612; 5) the physical register file(s) circuitry 3658 and the memory unit circuitry 3670 perform the register read/memory read stage 3614; the execution cluster(s) 3660 perform the execute stage 3616; 6) the memory unit circuitry 3670 and the physical register file(s) circuitry 3658 perform the write back/memory write stage 3618; 7) various circuitry may be involved in the exception handling stage 3622; and 8) the retirement unit circuitry 3654 and the physical register file(s) circuitry 3658 perform the commit stage 3624.

FIG. 36(B) shows a processor core 3690 including front-end unit circuitry 3630 coupled to an execution engine unit circuitry 3650, and both are coupled to a memory unit circuitry 3670. The core 3690 may be a reduced instruction set architecture computing (RISC) core, a complex instruction set architecture computing (CISC) core, a very long instruction word (VLIW) core, or a hybrid or alternative core type. As yet another option, the core 3690 may be a special-purpose core, such as, for example, a network or communication core, compression engine, coprocessor core, general purpose computing graphics processing unit (GPGPU) core, graphics core, or the like.

The front end unit circuitry 3630 may include branch prediction circuitry 3632 coupled to an instruction cache circuitry 3634, which is coupled to an instruction translation lookaside buffer (TLB) 3636, which is coupled to instruction fetch circuitry 3638, which is coupled to decode circuitry 3640. In one example, the instruction cache circuitry 3634 is included in the memory unit circuitry 3670 rather than the front-end circuitry 3630. The decode circuitry 3640 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 3640 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 3640 may be implemented using various different mechanisms. Examples of suitable mechanisms include, but are not limited to, look-up tables, hardware implementations, programmable logic arrays (PLAs), microcode read only memories (ROMs), etc. In one example, the core 3690 includes a microcode ROM (not shown) or other medium that stores microcode for certain macroinstructions (e.g., in decode circuitry 3640 or otherwise within the front end circuitry 3630). In one example, the decode circuitry 3640 includes a micro-operation (micro-op) or operation cache (not shown) to hold/cache decoded operations, micro-tags, or micro-operations generated during the decode or other stages of the processor pipeline 3600. The decode circuitry 3640 may be coupled to rename/allocator unit circuitry 3652 in the execution engine circuitry 3650.

The execution engine circuitry 3650 includes the rename/allocator unit circuitry 3652 coupled to a retirement unit circuitry 3654 and a set of one or more scheduler(s) circuitry 3656. The scheduler(s) circuitry 3656 represents any number of different schedulers, including reservations stations, central instruction window, etc. In some examples, the scheduler(s) circuitry 3656 can include arithmetic logic unit (ALU) scheduler/scheduling circuitry, ALU queues, arithmetic generation unit (AGU) scheduler/scheduling circuitry, AGU queues, etc. The scheduler(s) circuitry 3656 is coupled to the physical register file(s) circuitry 3658. Each of the physical register file(s) circuitry 3658 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 3658 includes vector registers unit circuitry, write-mask registers unit circuitry, and scalar register unit circuitry. These register units may provide architectural vector registers, vector mask registers, general-purpose registers, etc. The physical register file(s) circuitry 3658 is coupled to the retirement unit circuitry 3654 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 3654 and the physical register file(s) circuitry 3658 are coupled to the execution cluster(s) 3660. The execution cluster(s) 3660 includes a set of one or more execution unit(s) circuitry 3662 and a set of one or more memory access circuitry 3664. The execution unit(s) circuitry 3662 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 3656, physical register file(s) circuitry 3658, and execution cluster(s) 3660 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 3664). It should also be understood that where separate pipelines are used, one or more of these pipelines may be out-of-order issue/execution and the rest in-order.

In some examples, the execution engine unit circuitry 3650 may perform load store unit (LSU) address/data pipelining to an Advanced Microcontroller Bus (AMB) interface (not shown), and address phase and writeback, data phase load, store, and branches.

The set of memory access circuitry 3664 is coupled to the memory unit circuitry 3670, which includes data TLB circuitry 3672 coupled to a data cache circuitry 3674 coupled to a level 2 (L2) cache circuitry 3676. In one exemplary example, the memory access circuitry 3664 may include a load unit circuitry, a store address unit circuit, and a store data unit circuitry, each of which is coupled to the data TLB circuitry 3672 in the memory unit circuitry 3670. The instruction cache circuitry 3634 is further coupled to the level 2 (L2) cache circuitry 3676 in the memory unit circuitry 3670. In one example, the instruction cache 3634 and the data cache 3674 are combined into a single instruction and data cache (not shown) in L2 cache circuitry 3676, a level 3 (L3) cache circuitry (not shown), and/or main memory. The L2 cache circuitry 3676 is coupled to one or more other levels of cache and eventually to a main memory.

The core 3690 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 3690 includes logic to support a packed data instruction set architecture extension (e.g., AVX1, AVX2), thereby allowing the operations used by many multimedia applications to be performed using packed data.

Exemplary Execution Unit(s) Circuitry.

Figure 37:
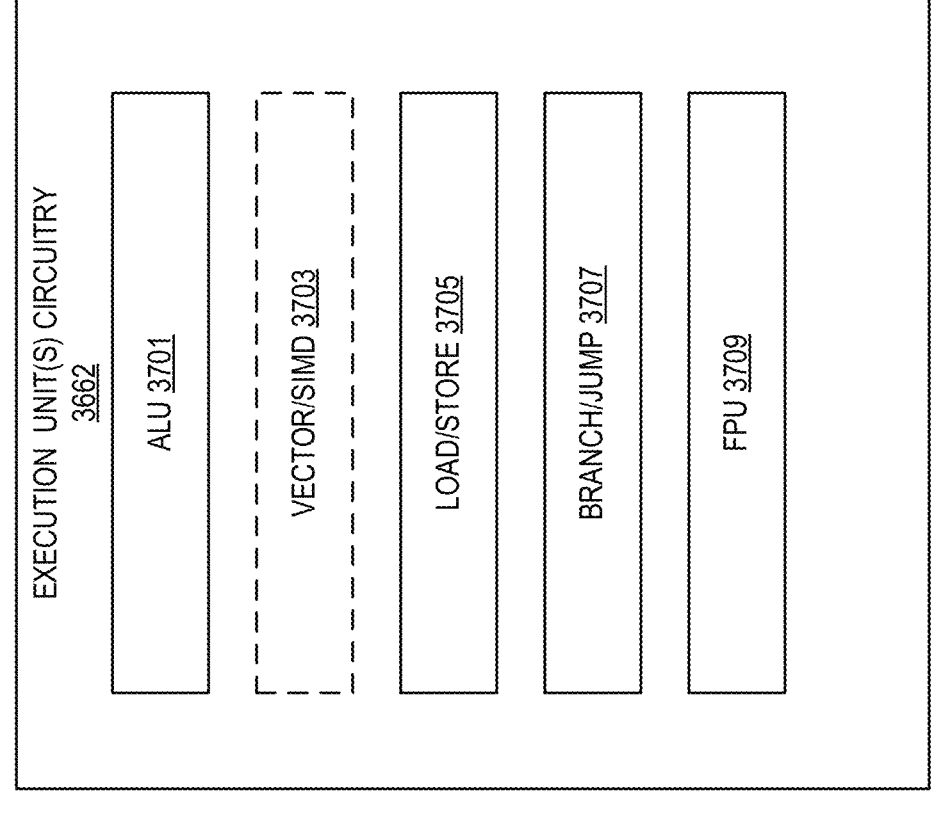
FIG. 37 illustrates examples of execution unit(s) circuitry, such as execution unit(s) circuitry of FIG. 36(B).

FIG. 37 illustrates examples of execution unit(s) circuitry, such as execution unit(s) circuitry 3662 of FIG. 36(B). As illustrated, execution unit(s) circuitry 3662 may include one or more ALU circuits 3701, optional vector/single instruction multiple data (SIMD) circuits 3703, load/store circuits 3705, branch/jump circuits 3707, and/or Floating-point unit (FPU) circuits 3709. ALU circuits 3701 perform integer arithmetic and/or Boolean operations. Vector/SIMD circuits 3703 perform vector/SIMD operations on packed data (such as SIMD/vector registers). Load/store circuits 3705 execute load and store instructions to load data from memory into registers or store from registers to memory. Load/store circuits 3705 may also generate addresses. Branch/jump circuits 3707 cause a branch or jump to a memory address depending on the instruction. FPU circuits 3709 perform floating-point arithmetic. The width of the execution unit(s) circuitry 3662 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

FIG. 38 is a block diagram of a register architecture 3800 according to some examples. As illustrated, the register architecture 3800 includes vector/SIMD registers 3810 that vary from 128-bit to 1,024 bits width. In some examples, the vector/SIMD registers 3810 are physically 512-bits and, depending upon the mapping, only some of the lower bits are used. For example, in some examples, the vector/SIMD registers 3810 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 3800 includes writemask/predicate registers 3815. For example, in some examples, there are 8 writemask/predicate registers (sometimes called k0 through k7) that are each 16-bit, 32-bit, 64-bit, or 128-bit in size. Writemask/predicate registers 3815 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 3815 corresponds to a data element position of the destination. In other examples, the writemask/predicate registers 3815 are scalable and consists of a set number of enable bits for a given vector element (e.g., 8 enable bits per 64-bit vector element).

The register architecture 3800 includes a plurality of general-purpose registers 3825. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 3800 includes scalar floating-point (FP) register 3845 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 3840 (e.g., EFLAGS, RFLAGS, etc.) store status and control information for arithmetic, compare, and system operations. For example, the one or more flag registers 3840 may store condition code information such as carry, parity, auxiliary carry, zero, sign, and overflow. In some examples, the one or more flag registers 3840 are called program status and control registers.

Segment registers 3820 contain segment points for use in accessing memory. In some examples, these registers are referenced by the names CS, DS, SS, ES, FS, and GS.

Machine specific registers (MSRs) 3835 control and report on processor performance. Most MSRs 3835 handle system-related functions and are not accessible to an application program. Machine check registers 3860 consist of control, status, and error reporting MSRs that are used to detect and report on hardware errors.

One or more instruction pointer register(s) 3830 store an instruction pointer value. Control register(s) 3855 (e.g., CR0-CR4) determine the operating mode of a processor (e.g., processor 3470, 3480, 3438, 3415, and/or 3500) and the characteristics of a currently executing task. Debug registers 3850 control and allow for the monitoring of a processor or core's debugging operations.

Memory (mem) management registers 3865 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 3800 may, for example, be used in register file/memory, or physical register file(s) circuitry 36 58.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 39:
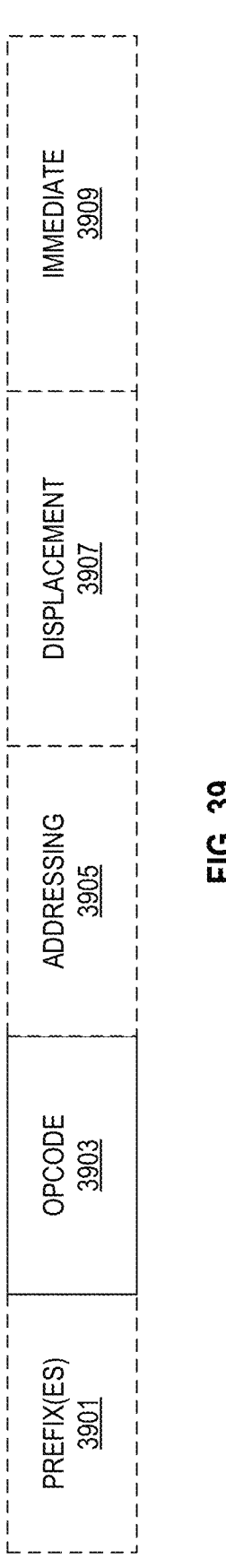
FIG. 39 illustrates examples of an instruction format.

FIG. 39 illustrates examples of an instruction format. As illustrated, an instruction may include multiple components including, but not limited to, one or more fields for: one or more prefixes 3901, an opcode 3903, addressing information 3905 (e.g., register identifiers, memory addressing information, etc.), a displacement value 3907, and/or an immediate value 3909. Note that some instructions utilize some or all of the fields of the format whereas others may only use the field for the opcode 3903. In some examples, the order illustrated is the order in which these fields are to be encoded, however, it should be appreciated that in other examples these fields may be encoded in a different order, combined, etc.

The prefix(es) field(s) 3901, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 3903 is used to at least partially define the operation to be performed upon a decoding of the instruction. In some examples, a primary opcode encoded in the opcode field 3903 is one, two, or three bytes in length. In other examples, a primary opcode can be a different length. An additional 3-bit opcode field is sometimes encoded in another field.

Figure 40:
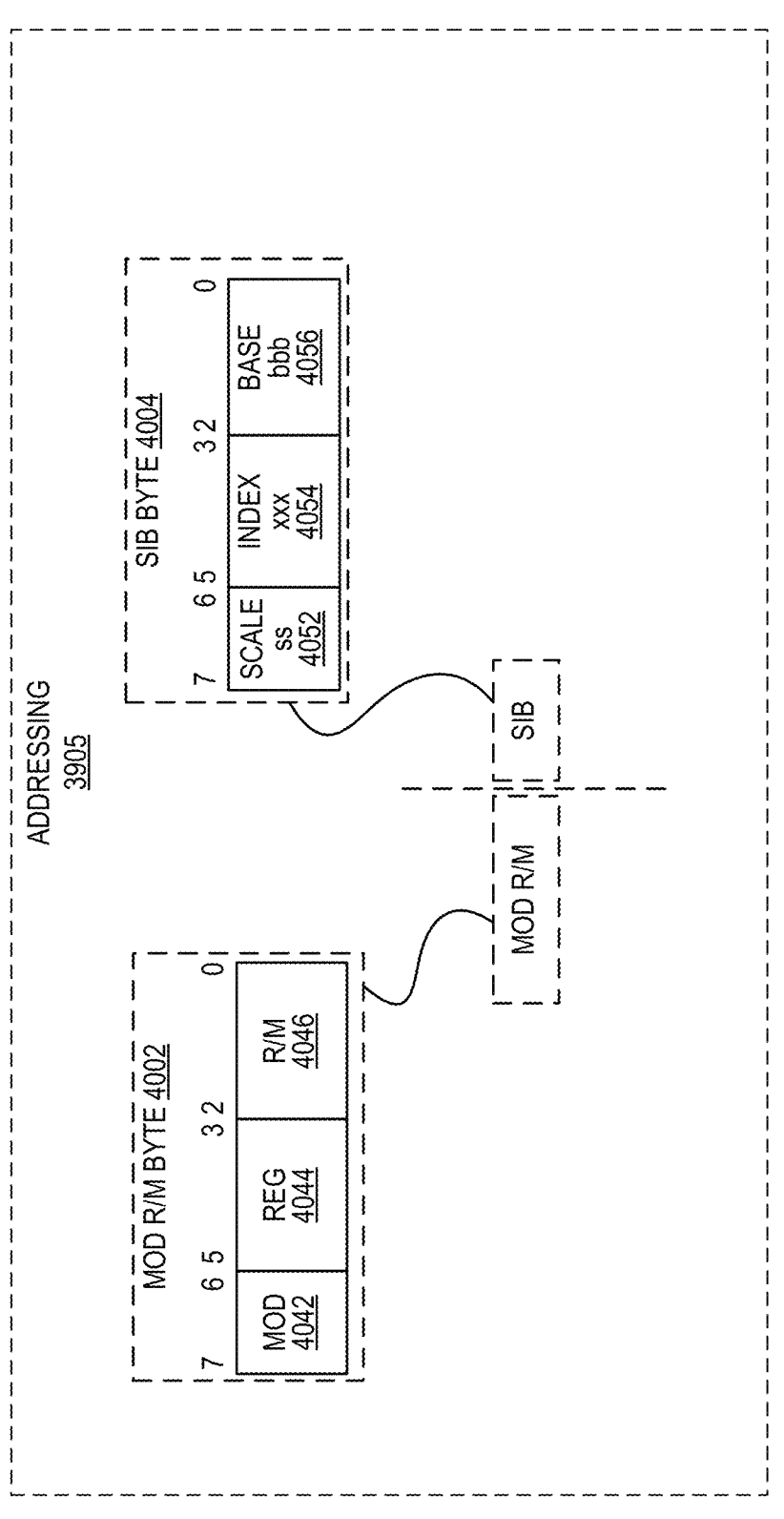
FIG. 40 illustrates examples of an addressing field.

The addressing field 3905 is used to address one or more operands of the instruction, such as a location in memory or one or more registers. FIG. 40 illustrates examples of the addressing field 3905. In this illustration, an optional Mod R/M byte 4002 and an optional Scale, Index, Base (SIB) byte 4004 are shown. The Mod R/M byte 4002 and the SIB byte 4004 are used to encode up to two operands of an instruction, each of which is a direct register or effective memory address. Note that each of these fields are optional in that not all instructions include one or more of these fields. The MOD R/M byte 4002 includes a MOD field 4042, a register (reg) field 4044, and R/M field 4046.

The content of the MOD field 4042 distinguishes between memory access and non-memory access modes. In some examples, when the MOD field 4042 has a binary value of 11 (11b), a register-direct addressing mode is utilized, and otherwise register-indirect addressing is used.

The register field 4044 may encode either the destination register operand or a source register operand, or may encode an opcode extension and not be used to encode any instruction operand. The content of register index field 4044, directly or through address generation, specifies the locations of a source or destination operand (either in a register or in memory). In some examples, the register field 4044 is supplemented with an additional bit from a prefix (e.g., prefix 3901) to allow for greater addressing.

The R/M field 4046 may be used to encode an instruction operand that references a memory address or may be used to encode either the destination register operand or a source register operand. Note the R/M field 4046 may be combined with the MOD field 4042 to dictate an addressing mode in some examples.

The SIB byte 4004 includes a scale field 4052, an index field 4054, and a base field 4056 to be used in the generation of an address. The scale field 4052 indicates scaling factor. The index field 4054 specifies an index register to use. In some examples, the index field 4054 is supplemented with an additional bit from a prefix (e.g., prefix 3901) to allow for greater addressing. The base field 4056 specifies a base register to use. In some examples, the base field 4056 is supplemented with an additional bit from a prefix (e.g., prefix 3901) to allow for greater addressing. In practice, the content of the scale field 4052 allows for the scaling of the content of the index field 4054 for memory address generation (e.g., for address generation that uses $2^{scale}*$index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 3907 provides this value. Additionally, in some examples, a displacement factor usage is encoded in the MOD field of the addressing field 3905 that indicates a compressed displacement scheme for which a displacement value is calculated and stored in the displacement field 3907.

In some examples, an immediate field 3909 specifies an immediate value for the instruction. An immediate value may be encoded as a 1-byte value, a 2-byte value, a 4-byte value, etc.

Figures 41, 42A, 42B, 42C, 42D:
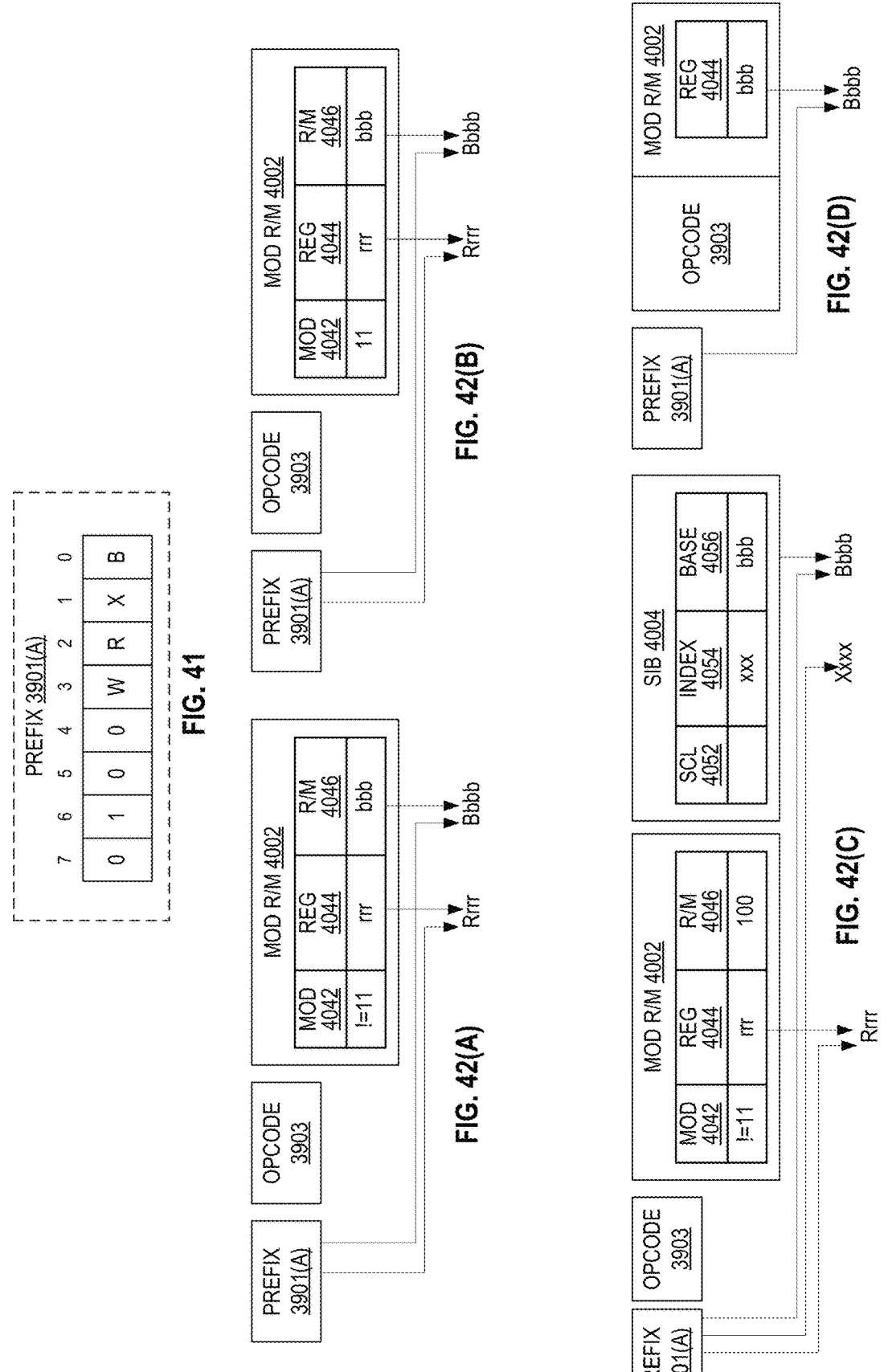
FIG. 41 illustrates examples of a first prefix.
FIGS. 42(A)-(D) illustrate examples of how the R, X, and B fields of the first prefix 3901(A) are used.

FIG. 41 illustrates examples of a first prefix 3901(A). In some examples, the first prefix 3901(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 3901(A) may specify up to three registers using 3-bit fields depending on the format: 1) using the reg field 4044 and the R/M field 4046 of the Mod R/M byte 4002; 2) using the Mod R/M byte 4002 with the SIB byte 4004 including using the reg field 4044 and the base field 4056 and index field 4054; or 3) using the register field of an opcode.

In the first prefix 3901(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 4044 and MOD R/M R/M field 4046 alone can each only address 8 registers.

In the first prefix 3901(A), bit position 2 (R) may be an extension of the MOD R/M reg field 4044 and may be used to modify the Mod R/M reg field 4044 when that field encodes a general-purpose register, a 64-bit packed data register (e.g., a SSE register), or a control or debug register. R is ignored when Mod R/M byte 4002 specifies other registers or defines an extended opcode.

Bit position 1 (X) may modify the SIB byte index field 4054.

Bit position 0 (B) may modify the base in the Mod R/M R/M field 4046 or the SIB byte base field 4056; or it may modify the opcode register field used for accessing general purpose registers (e.g., general purpose registers 3825).

FIGS. 42(A)-(D) illustrate examples of how the R, X, and B fields of the first prefix 3901(A) are used. FIG. 42(A) illustrates R and B from the first prefix 3901(A) being used to extend the reg field 4044 and R/M field 4046 of the MOD R/M byte 4002 when the SIB byte 4004 is not used for memory addressing. FIG. 42(B) illustrates R and B from the first prefix 3901(A) being used to extend the reg field 4044 and R/M field 4046 of the MOD R/M byte 4002 when the SIB byte 4004 is not used (register-register addressing). FIG. 42(C) illustrates R, X, and B from the first prefix 3901(A) being used to extend the reg field 4044 of the MOD R/M byte 4002 and the index field 4054 and base field 4056 when the SIB byte 4004 being used for memory addressing. FIG. 42(D) illustrates B from the first prefix 3901(A) being used to extend the reg field 4044 of the MOD R/M byte 4002 when a register is encoded in the opcode 3903.

Figures 43A, 43B:
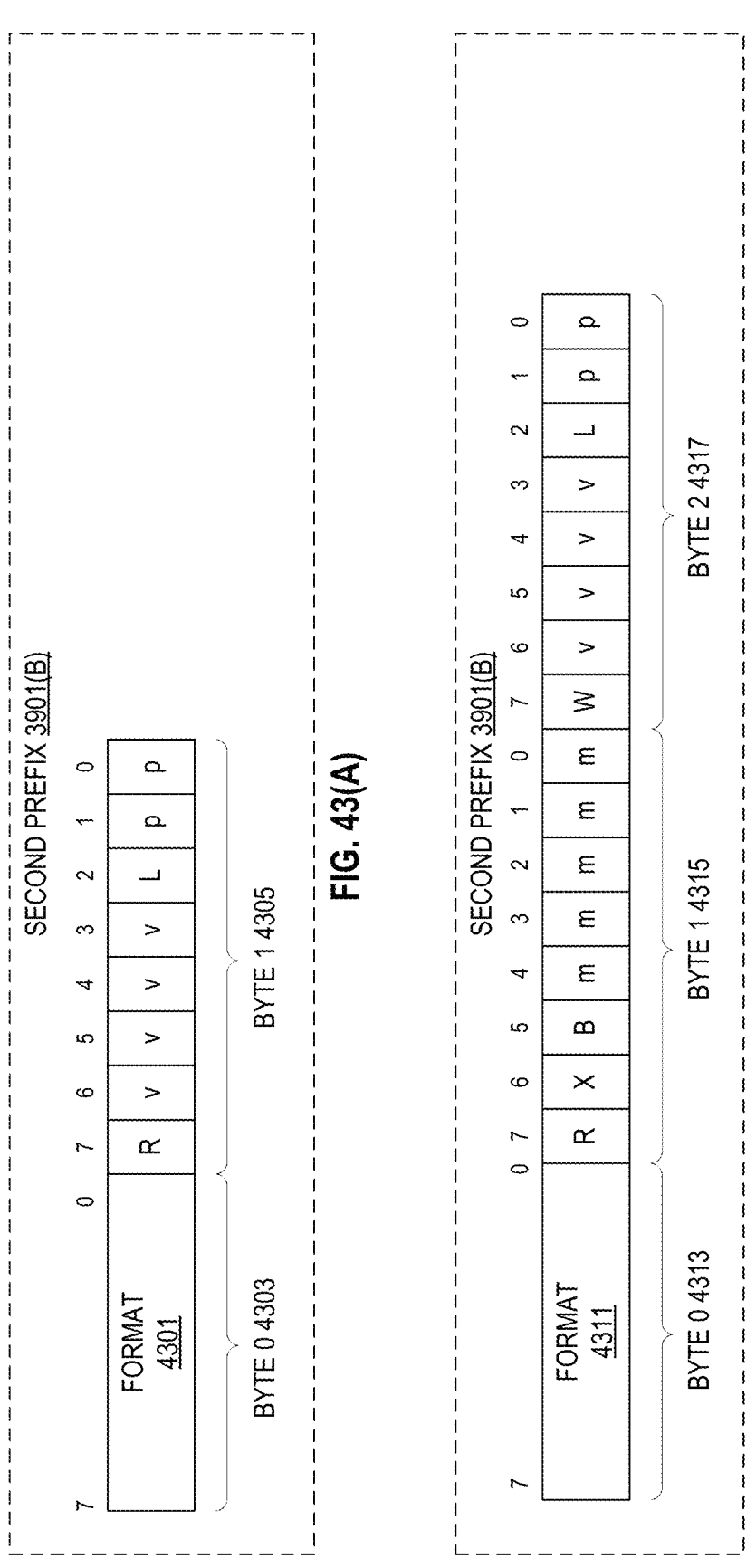
FIGS. 43(A)-(B) illustrate examples of a second prefix.

FIGS. 43(A)-(B) illustrate examples of a second prefix 3901(B). In some examples, the second prefix 3901(B) is an example of a VEX prefix. The second prefix 3901(B) encoding allows instructions to have more than two operands, and allows SIMD vector registers (e.g., vector/SIMD registers 3810) to be longer than 64-bits (e.g., 128-bit and 256-bit). The use of the second prefix 3901(B) provides for three-operand (or more) syntax. For example, previous two-operand instructions performed operations such as A=A+B, which overwrites a source operand. The use of the second prefix 3901(B) enables operands to perform nondestructive operations such as A=B+C.

In some examples, the second prefix 3901(B) comes in two forms—a two-byte form and a three-byte form. The two-byte second prefix 3901(B) is used mainly for 128-bit, scalar, and some 256-bit instructions; while the three-byte second prefix 3901(B) provides a compact replacement of the first prefix 3901(A) and 3-byte opcode instructions.

FIG. 43(A) illustrates examples of a two-byte form of the second prefix 3901(B). In one example, a format field 4301 (byte 0 4303) contains the value C5H. In one example, byte 14305 includes a "R" value in bit[7]. This value is the complement of the "R" value of the first prefix 3901(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H).

Bits[6:3] shown as vvvv may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 4046 to encode the instruction operand that references a memory address or encode either the destination register operand or a source register operand.

Instructions that use this prefix may use the Mod R/M reg field 4044 to encode either the destination register operand or a source register operand, be treated as an opcode extension and not used to encode any instruction operand.

For instruction syntax that support four operands, vvvv, the Mod R/M R/M field 4046 and the Mod R/M reg field 4044 encode three of the four operands. Bits[7:4] of the immediate 3909 are then used to encode the third source register operand.

FIG. 43(B) illustrates examples of a three-byte form of the second prefix 3901(B). In one example, a format field 4311 (byte 0 4313) contains the value C4H. Byte 1 4315 includes in bits[7:5] "R," "X," and "B" which are the complements of the same values of the first prefix 3901(A). Bits[4:0] of byte 14315 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 4317 is used similar to W of the first prefix 3901(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 4046 to encode the instruction operand that references a memory address or encode either the destination register operand or a source register operand.

Instructions that use this prefix may use the Mod R/M reg field 4044 to encode either the destination register operand or a source register operand, be treated as an opcode extension and not used to encode any instruction operand.

For instruction syntax that support four operands, vvvv, the Mod R/M R/M field 4046, and the Mod R/M reg field 4044 encode three of the four operands. Bits[7:4] of the immediate 3909 are then used to encode the third source register operand.

Figure 44:
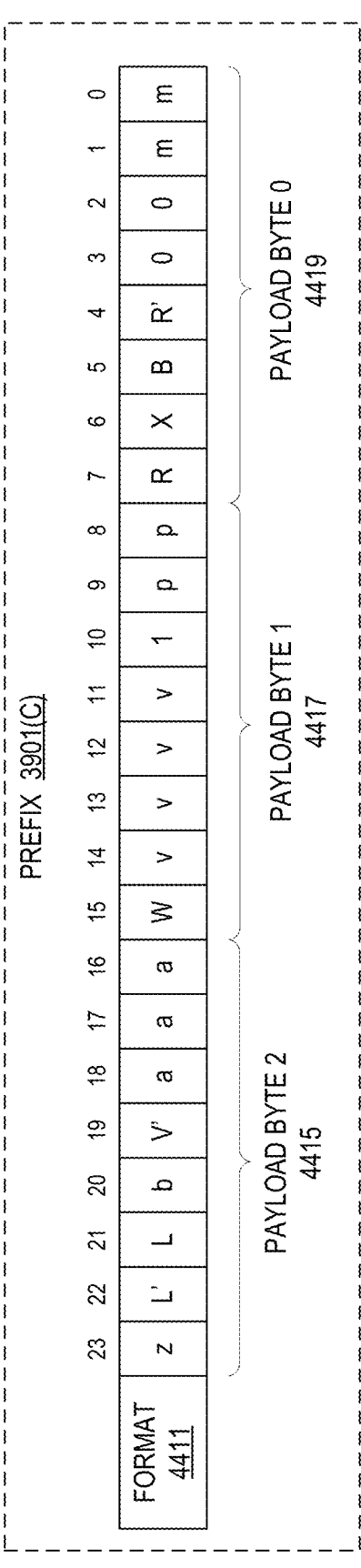
FIG. 44 illustrates examples of a third prefix.

FIG. 44 illustrates examples of a third prefix 3901(C). In some examples, the first prefix 3901(A) is an example of an EVEX prefix. The third prefix 3901(C) is a four-byte prefix.

The third prefix 3901(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 38) or predication utilize this prefix.

Opmask register allow for conditional processing or selection control. Opmask instructions, whose source/destination operands are opmask registers and treat the content of an opmask register as a single value, are encoded using the second prefix 3901(B).

The third prefix 3901(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 3901(C) is a format field 4411 that has a value, in one example, of 62H. Subsequent bytes are referred to as payload bytes 4415-4419 and collectively form a 24-bit value of P[23:0] providing specific capability in the form of one or more fields (detailed herein).

In some examples, P[1:0] of payload byte 4419 are identical to the low two mmmmm bits. P[3:2] are reserved in some examples. Bit P[4] (R') allows access to the high 16 vector register set when combined with P[7] and the Mod R/M reg field 4044. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the Mod R/M register field 4044 and Mod R/M R/M field 4046. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 3901(A) and second prefix 3911(B) and may serve as an opcode extension bit or operand size promotion.

P[18:16] specify the index of a register in the opmask (writemask) registers (e.g., writemask/predicate registers 3815). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 3901(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-k7 | $1^{st}$ Source |
| {k1] | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 45:
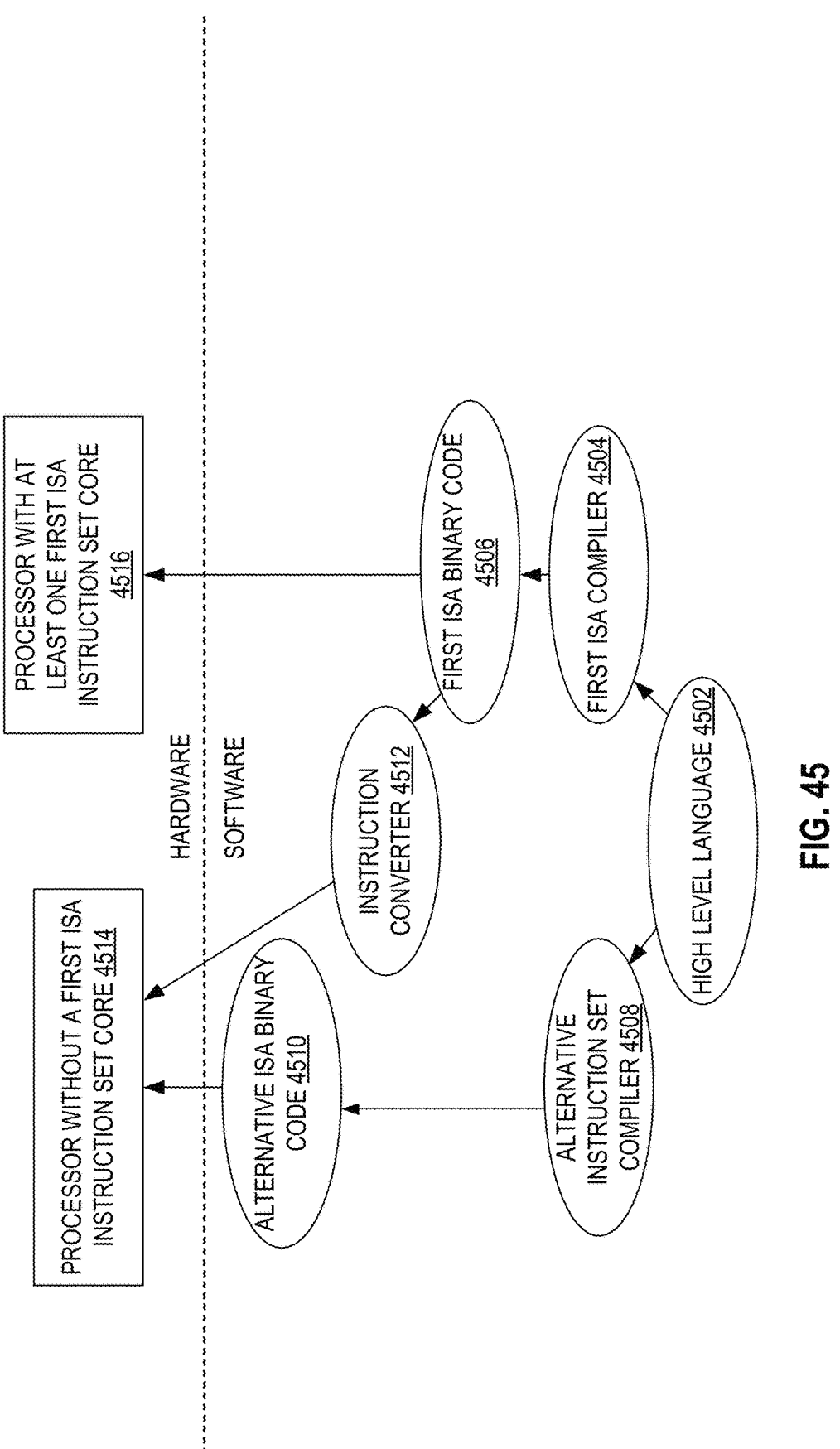
FIG. 45 illustrates a block diagram contrasting the use of a software instruction converter to convert binary instructions in a source instruction set architecture to binary instructions in a target instruction set architecture according to examples.

FIG. 45 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 45 shows a program in a high-level language 4502 may be compiled using a first ISA compiler 4504 to generate first ISA binary code 4506 that may be natively executed by a processor with at least one first instruction set architecture core 4516. The processor with at least one first ISA instruction set architecture core 4516 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 4504 represents a compiler that is operable to generate first ISA binary code 4506 (e.g., object code) that can, with or without additional linkage processing, be executed on the processor with at least one first ISA instruction set architecture core 4516. Similarly, FIG. 45 shows the program in the high-level language 4502 may be compiled using an alternative instruction set architecture compiler 4508 to generate alternative instruction set architecture binary code 4510 that may be natively executed by a processor without a first ISA instruction set architecture core 4514. The instruction converter 4512 is used to convert the first ISA binary code 4506 into code that may be natively executed by the processor without a first ISA instruction set architecture core 4514. This converted code is not necessarily to be the same as the alternative instruction set architecture binary code 4510; however, the converted code will accomplish the general operation and be made up of instructions from the alternative instruction set architecture. Thus, the instruction converter 4512 represents software, firmware, hardware, or a combination thereof that, through emulation, simulation or any other process, allows a processor or other electronic device that does not have a first ISA instruction set architecture processor or core to execute the first ISA binary code 4506.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Examples include, but are not limited to:

1. An apparatus comprising:
   a logical processor to execute one or more threads in a first mode; and
   a synchronous microthreading (SyMT) co-processor coupled to the logical processor to execute lightweight microthreads, with each lightweight microthread having an independent register state, upon an execution of an instruction to enter into SyMT mode.
2. The apparatus of example 1, wherein the SyMT co-processor comprises a plurality of integer execution, each cluster having a plurality of integer execution units, a reservation station, and a general purpose register file.
3. The apparatus of example 1, wherein the SyMT co-processor comprises a plurality of vector execution clusters, each cluster having a plurality of vector execution units, a reservation station, and a vector register file.
4. The apparatus of example 1, wherein the SyMT co-processor comprises a plurality of memory execution clusters, each cluster having a plurality of reservation stations, a store data buffer, load circuitry, store circuitry, and a data cache control.
5. The apparatus of example 1, wherein the SyMT co-processor comprises cluster replication logic to replicate microoperations for dispatch.
6. The apparatus of example 1, wherein the logical processor includes a pointer to a SyMT save area that is to store the independent register state of each microthread.
7. The apparatus of example 6, wherein a size of the SyMT save state area is dependent on a number of microthreads to execute and supported instruction set architecture features.
8. The apparatus of example 1, wherein the SyMT co-processor is to support at least an instruction set architecture of the logical processor.
9. The apparatus of example 1, wherein the SyMT co-processor is to support a proper subset of an instruction set architecture of the logical processor.
10. The apparatus of example 1, wherein the microthreads are share at least on model specific register with the logical processor.
11. A system comprising:
    memory to store a synchronous microthreading (SyMT) state area;
    a logical processor to execute one or more threads in a first mode; and
    a synchronous microthreading (SyMT) co-processor coupled to the logical processor to execute lightweight microthreads, with each lightweight microthread having an independent register state, upon an execution of an instruction to enter into SyMT mode.
12. The system of example 11, wherein the SyMT co-processor comprises a plurality of integer execution, each cluster having a plurality of integer execution units, a reservation station, and a general purpose register file.
13. The system of example 11, wherein the SyMT co-processor comprises a plurality of vector execution clusters, each cluster having a plurality of vector execution units, a reservation station, and a vector register file.
14. The system of example 11, wherein the SyMT co-processor comprises a plurality of memory execution clusters, each cluster having a plurality of reservation stations, a store data buffer, load circuitry, store circuitry, and a data cache control.
15. The system of example 11, wherein the SyMT co-processor comprises cluster replication logic to replicate microoperations for dispatch.
16. The system of example 11, wherein the logical processor includes a pointer to a SyMT save area that is to store the independent register state of each microthread.
17. The system of example 16, wherein a size of the SyMT save state area is dependent on a number of microthreads to execute and supported instruction set architecture features.
18. The system of example 11, wherein the SyMT co-processor is to support at least an instruction set architecture of the logical processor.
19. The system of example 11, wherein the SyMT co-processor is to support a proper subset of an instruction set architecture of the logical processor.
20. The system of example 11, wherein the microthreads are share at least on model specific register with the logical processor.
21. An apparatus comprising:
    decoder circuitry to decode an instance of a single instruction, the single instruction to include an opcode to indicate execution circuitry is to return an active number of microthreads; and
    execution circuitry to execute the decoded instruction to return the active number of microthreads.
22. The apparatus of example 21, wherein the active number of microthreads are indicated by a bitvector with each microthread to have a bit position to indicate its active status.
23. The apparatus of example 22, wherein the wherein the execution circuitry is to perform a population count on the bitvector.
24. The apparatus of example 22, wherein the bit vector is stored in a microthread state save area.
25. The apparatus of example 22, wherein the microthread state save area is to additionally store contents of general purpose registers used by each active microthread.
26. The apparatus of example 22, wherein the microthread state save area is to additionally store contents of vector registers used by each active microthread.
27. The apparatus of example 22, wherein the bitvector is to be updated by microcode per microthread exit.
28. The apparatus of example 27, wherein a microthread exit is set by an execution of an instance of a microthread exit instruction.

29. The apparatus of example 21, wherein the apparatus is an accelerator.

30. The apparatus of example 21, wherein the execution circuitry is to generate a fault when the apparatus is not in a microthreaded execution mode.

31. A system comprising:
  memory to store an instance of a single instruction; and
  an apparatus comprising:
    decoder circuitry to decode an instance of a single instruction, the single instruction to include an opcode to indicate execution circuitry is to return an active number of microthreads; and
    execution circuitry to execute the decoded instruction to return the active number of microthreads.

32. The system of example 31, wherein the active number of microthreads are indicated by a bitvector with each microthread to have a bit position to indicate its active status.

33. The system of example 32, wherein the wherein the execution circuitry is to perform a population count on the bitvector.

34. The system of example 32, wherein the bit vector is stored in a microthread state save area.

35. The system of example 32, wherein the microthread state save area is to additionally store contents of general purpose registers used by each active microthread.

36. The system of example 32, wherein the microthread state save area is to additionally store contents of vector registers used by each active microthread.

37. The system of example 32, wherein the bitvector is to be updated by microcode per microthread exit.

38. The system of example 37, wherein a microthread exit is set by an execution of an instance of a microthread exit instruction.

39. The system of example 32, wherein the apparatus is an accelerator.

40. The system of example 32, wherein the execution circuitry is to generate a fault when the apparatus is not in a microthreaded execution mode.

41. An apparatus comprising:
  decoder circuitry to decode an instance of a single instruction, the single instruction to include an opcode to indicate that execution circuitry is to load a global pointer from memory; and
  execution circuitry to execute the decoded instruction to load the global pointer from memory.

42. The apparatus of example 1, wherein the global pointer is stored in a microthread state save area.

43. The apparatus of example 2, wherein the microthread state save area is to additionally store contents of general purpose registers used by each active microthread.

44. The apparatus of example 2, wherein the microthread state save area is to additionally store contents of vector registers used by each active microthread.

45. The apparatus of example 2, wherein the microthread state save area is to additionally store contents of predication registers used by each active microthread.

46. The apparatus of example 1, wherein the global pointer is to point to an argument.

47. The apparatus of example 1, wherein the global pointer is to be provided by an instruction to enter into a microthreaded execution mode.

48. The apparatus of example 7, wherein the global pointer is accessible in the microthreaded execution mode and a non-microthreaded execution mode.

49. The apparatus of example 1, wherein the apparatus is an accelerator.

50. The apparatus of example 1, wherein the execution circuitry is a part of a memory cluster.

51. The apparatus of any of examples 41-50 further comprising:
  memory to store an instance of a single instruction.

52. A method comprising:
  translating an instance of a single instruction of a first instruction set to one or more instructions of a second instruction set, the single instruction to include a field for an opcode to indicate that execution circuitry is to load a global pointer from memory;
  decoding the one or more instructions of the second instruction set;
  executing the decoded instruction according to the opcode to load a global pointer from memory.

53. The method of example 52, wherein the global pointer is stored in a microthread state save area.

54. The method of example 52, wherein the microthread state save area is to additionally store contents of general purpose registers used by each active microthread.

55. The method of example 52, wherein the microthread state save area is to additionally store contents of vector registers used by each active microthread.

56. The method of example 51, wherein the global pointer is to point to an argument.

57. The method of example 51, wherein the global pointer is to be provided by an instruction to enter into a microthreaded execution mode.

58. The method of example 57, wherein the global pointer is accessible in the microthreaded execution mode and a non-microthreaded execution mode.

59. The method of example 52, wherein the translating is performed by a binary translator.

60. The method of example 52, wherein the translating is performed by an emulation layer.

61. An apparatus comprising:
  decoder circuitry to decode an instance of a single instruction, the single instruction to include fields for an opcode and one or more fields to indicate a first source operand to store a pointer for a microthread state save area, and one or more fields to indicate a second source operand to store a microthread identifier, the opcode to indicate a write of a particular microthread's state as identified by the microthread identifier from the microthread state save area pointed to by the pointer; and
  a hardware execution resource to execute the decoded instruction to write the identified microthread's save state.

62. The apparatus of example 61, wherein the first and second source operands are registers.

63. The apparatus of example 61, wherein the instance of the single instruction further comprises one or more fields to indicate a third source operand to store an enumeration of a particular area of the particular microthread's state as identified by the microthread identifier from the microthread state save area pointed to by the pointer.

64. The apparatus of example 61 wherein the first, second, and third source operands are registers.

65. The apparatus of example 61, wherein the particular area comprises contents of a register stored in the microthread state save area.

66. The apparatus of example 65, wherein the particular area is a general purpose register.

67. The apparatus of example 65, wherein the particular area is a vector register.

68. The apparatus of any of examples 61-67, wherein the apparatus is a processor core.

69. The apparatus of any of examples 61-67, wherein the apparatus is an accelerator.

70. The apparatus of any of examples 61-69, wherein the hardware execution resource comprises execution circuitry and microcode.

71. The apparatus of any of examples 61-70 further comprising:

memory to store an instance of a single instruction.

72. A method comprising:

translating an instance of a single instruction of a first instruction set to one or more instructions of a second instruction set, the single instruction to the single instruction to include fields for an opcode and one or more fields to indicate a first source operand to store a pointer for a microthread state save area, and one or more fields to indicate a second source operand to store a microthread identifier, the opcode to indicate a write of a particular microthread's state as identified by the microthread identifier from the microthread state save area pointed to by the pointer;

decoding the one or more instructions of the second instruction set; and executing the decoded instruction according to the opcode to write the identified microthread's save state.

73. The method of example 72, wherein the first and second source operands are registers.

74. The method of example 72, wherein the instance of the single instruction further comprises one or more fields to indicate a third source operand to store an enumeration of a particular area of the particular microthread's state as identified by the microthread identifier from the microthread state save area pointed to by the pointer.

75. The method of example 73, wherein the particular area comprises contents of a register stored in the microthread state save area.

76. The method of example 75, wherein the particular area is a general purpose register.

77. The method of example 75, wherein the particular area is a vector purpose register.

78. The method of example 75, wherein the microthread state save area stores state for a plurality of microthreads.

79. The method of any of examples 72-77, wherein the translating is performed by a binary translator.

80. The method of any of examples 72-77, wherein the translating is performed by an emulation layer.

81. An apparatus comprising:

decoder circuitry to decode an instance of a single instruction, the single instruction to include fields for an opcode and one or more fields to indicate a first source operand to store a pointer for a microthread state save area, and one or more fields to indicate a second source operand to store a microthread identifier, the opcode to indicate a read of a particular microthread's state as identified by the microthread identifier from the microthread state save area pointed to by the pointer; and a hardware execution resource to execute the decoded instruction to read the identified microthread's save state.

82. The apparatus of example 81, wherein the first and second source operands are registers.

83. The apparatus of example 81, wherein the instance of the single instruction further comprises one or more fields to indicate a third source operand to store an enumeration of a particular area of the particular microthread's state as identified by the microthread identifier from the microthread state save area pointed to by the pointer.

84. The apparatus of example 81 wherein the first, second, and third source operands are registers.

85. The apparatus of example 81, wherein the particular area comprises contents of a register stored in the microthread state save area.

86. The apparatus of example 85, wherein the particular area is a general purpose register.

87. The apparatus of example 85, wherein the particular area is a vector register.

88. The apparatus of example 81, wherein the apparatus is a processor core.

89. The apparatus of example 81, wherein the apparatus is an accelerator.

90. The apparatus of example 81, wherein the hardware execution resource comprises execution circuitry and microcode.

91. The apparatus of any of examples 81-90 further comprising:

memory to store an instance of a single instruction.

92. A method comprising:

translating an instance of a single instruction of a first instruction set to one or more instructions of a second instruction set, the single instruction to the single instruction to include fields for an opcode and one or more fields to indicate a first source operand to store a pointer for a microthread state save area, and one or more fields to indicate a second source operand to store a microthread identifier, the opcode to indicate a read of a particular microthread's state as identified by the microthread identifier from the microthread state save area pointed to by the pointer;

decoding the one or more instructions of the second instruction set;

executing the decoded instruction according to the opcode to read the identified microthread's save state.

93. The method of example 92, wherein the first and second source operands are registers.

94. The method of example 92, wherein the instance of the single instruction further comprises one or more fields to indicate a third source operand to store an enumeration of a particular area of the particular microthread's state as identified by the microthread identifier from the microthread state save area pointed to by the pointer.

95. The method of example 94, wherein the particular area comprises contents of a register stored in the microthread state save area.

96. The method of example 95, wherein the particular area is a general purpose register.

97. The method of example 95, wherein the particular area is a vector register.

99. The method of example 95, wherein the microthread state save area is store state for a plurality of microthreads.

99. The method of any of examples 92-98, wherein the translating is performed by a binary translator.

100. The method of any of examples 92-98, wherein the translating is performed by an emulation layer.

101. An apparatus comprising:

decoder circuitry to decode an instance of a single instruction, the single instruction to include fields for an opcode and one or more of: one or more fields to indicate a first source operand to provide an instruction pointer, one or more fields to indicate a second source operand to provide a second pointer, one or more fields to indicate a third source operand to provide a count value, wherein the opcode is to indicate an entry into a microthread execution; and execution circuitry to execute the decoded instruction according to the opcode to enter into microthread execution.

102. The apparatus of example 1, wherein the one or more fields to indicate a source operand is to identify a register.

103. The apparatus of example 1, wherein microthread execution is to start at the instruction pointer of the first source operand.

104. The apparatus of example 1, wherein the second pointer is a global pointer that is readable by a host process and microthreads.

105. The apparatus of example 1, wherein the execution circuitry is further to determine that a save state area is configured for the microthread execution.

106. The apparatus of example 1, wherein the count value is a value of desired microthreads and execution circuitry is to utilize the count to determine whether the apparatus supports the count value of desired microthreads.

107. The apparatus of example 6, wherein a number of supportable microthreads is to be stored by the apparatus.

108. The apparatus of example 1, wherein the execution circuitry is further to set an indication of microthread execution.

109. The apparatus of example 1, wherein the apparatus is a processor core.

110. The apparatus of example 1, wherein the apparatus is an accelerator.

111. The apparatus of any of examples 101-110 further comprising:

memory to store an instance of a single instruction.

112. A method comprising:

translating an instance of a single instruction of a first instruction set to one or more instructions of a second instruction set, the single instruction to include fields for an opcode and one or more of: one or more fields to indicate a first source operand to provide an instruction pointer, one or more fields to indicate a second source operand to provide a second pointer, one or more fields to indicate a third source operand to provide a count value, wherein the opcode is to indicate an entry into a microthread execution; and decoder circuitry to decode the one or more instructions of the second instruction set;

executing the decoded instruction according to the opcode to enter into microthread execution.

113. The method of example 112, wherein the one or more fields to indicate a source operand is to identify a register.

114. The method of example 112, wherein microthread execution is to start at the instruction pointer of the first source operand.

115. The method of example 112, wherein the second pointer is a global pointer that is readable by a host process and microthreads.

116. The method of example 112, wherein the execution circuitry is further to determine that a save state area is configured for the microthread execution.

117. The method of example 116, wherein the save state area stores state for each microthread of the microthread execution.

118. The method of example 112, wherein the count value is a value of desired microthreads and execution circuitry is to utilize the count to determine whether the apparatus supports the count value of desired microthreads.

119. The method of any of examples 112-118, wherein the translating is performed by a binary translator.

120. The method of any of examples 112-118, wherein the translating is performed by an emulation layer.

121. An apparatus comprising:

decoder circuitry to decode an instance of a single instruction, the single instruction to include a field for an opcode, wherein the opcode is to indicate execution circuitry is to exit from microthread execution; and a hardware execution resource to execute the decoded instruction according to the opcode to exit from microthread execution.

122. The apparatus of example 121, wherein the exit from microthread execution is for a single microthread.

123. The apparatus of example 121, wherein the hardware execution resource is to further update an active status indication that the single microthread to be inactive.

124. The apparatus of example 123, wherein the active indication is to be stored in a bitvector, wherein individual bits of the bitvector are to be used to indicate an active status of microthreads.

125. The apparatus of example 121, wherein the exit from microthread execution is for all microthreads and a return to a previous threaded mode.

126. The apparatus of example 125, further comprising: clearing an indication of a microthread execution mode.

127. The apparatus of example 126, wherein the indication is a zero flag in a flags register.

128. The apparatus of example 127, wherein the flags register is accessible outside of the microthread execution mode.

129. The apparatus of example 121, wherein the apparatus is an accelerator.

130. The apparatus of example 121, wherein the hardware execution resource comprises execution circuitry and microcode.

131. A system comprising:

memory to store an instance of a single instruction; and an apparatus comprising:

decoder circuitry to decode an instance of a single instruction, the single instruction to include a field for an opcode, wherein the opcode is to indicate execution circuitry is to exit from microthread execution, and a hardware execution resource to execute the decoded instruction according to the opcode to exit from microthread execution.

132. A method comprising:

translating an instance of a single instruction of a first instruction set to one or more instructions of a second instruction set, the single instruction to include a field for an opcode, wherein the opcode is to indicate execution circuitry is to exit from microthread execution;

decoding the one or more instructions of the second instruction set;

executing the decoded instruction according to the opcode to exit from microthread execution.

133. The method of example 132, wherein the exit from microthread execution is for a single microthread.

134. The method of example 132, wherein the hardware execution resource is to further update an active status indication that the single microthread to be inactive.

135. The method of example 134, wherein the active indication is to be stored in a bitvector, wherein individual bits of the bitvector are to be used to indicate an active status of microthreads.

136. The method of example 132, wherein the exit from microthread execution is for all microthreads and a return to a previous threaded mode.

137. The method of example 132, further comprising:

clearing an indication of a microthread execution mode.

138. The method of example 137, wherein the indication is delineated by a zero flag.

139. The method of any of examples 132-138, wherein the translating is performed by a binary translator.

140. The method of any of examples 132-138, wherein the translating is performed by an emulation layer.

141. A method comprising:

saving state from all executing microthreads to a microthread state save area upon a detection of a fault by at least one microthread during microthread execution;

marking each fault in a bit vector indicating which microthread faulted;

transitioning to a host execution mode and setting a microthread execution event type indication in event information to be delivered by an event delivery logic;

using a fault handler to handle the fault using the saved state;

restarting microthreaded execution.

142. The method of example 141, wherein microcode saves the state.

143. The method of example 141, wherein the state includes error codes and register state.

144. The method of example 141, wherein a retirement unit detects the fault.

145. The method of example 141, wherein the event information includes an error code, an event vector, and the event type.

146. The method of example 145, wherein the event vector indicates one or more of faults of divide, debug, overflow, invalid opcode, general protection, page fault, alignment check, machine check, and vector exception.

147. The method of example 141, further comprising: halting all microthreads upon a detection of a fault.

148. The method of example 141, further comprising: restarting microthreaded execution.

149. An apparatus comprising:

microcode to:

save state from all executing microthreads to a microthread state save area upon a detection of a fault by at least one microthread during microthread execution, mark each fault in a bit vector indicating which microthread faulted, and transition to a host execution mode and setting a microthread execution event type indication in event information to be delivered by an event delivery logic;

a fault handler to handle the fault using the saved state, wherein the microcode is to restart microthreaded execution upon the fault being handled.

150. The apparatus of example 149, wherein the state is to include error codes and register state.

151. The apparatus of example 149, wherein a retirement unit is to detect the fault.

152. The apparatus of example 149, wherein the event information is to include an error code, an event vector, and the event type.

153. The apparatus of example 149, wherein the event vector is to indicate one or more of faults of divide, debug, overflow, invalid opcode, general protection, page fault, alignment check, machine check, and vector exception.

154. The apparatus of example 149, wherein the microcode is further to halt all microthreads upon a detection of a fault.

155. A system comprising:

memory to store microthread save state;

microcode to:

save state from all executing microthreads to the microthread state save area upon a detection of a fault by at least one microthread during microthread execution, mark each fault in a bit vector indicating which microthread faulted, and transition to a host execution mode and setting a microthread execution event type indication in event information to be delivered by an event delivery logic;

a fault handler to handle the fault using the saved state, wherein the microcode is to restart microthreaded execution upon the fault being handled.

156. The system of example 155, wherein the state is to include error codes and register state.

157. The system of example 155, wherein a retirement unit is to detect the fault.

158. The system of example 155, wherein the event information is to include an error code, an event vector, and the event type.

159. The system of example 158, wherein the event vector is to indicate one or more of faults of divide, debug, overflow, invalid opcode, general protection, page fault, alignment check, machine check, and vector exception.

160. The system of example 155, wherein the microcode is further to halt all microthreads upon a detection of a fault.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:

decoder circuitry to decode an instance of a single instruction, the single instruction to include an opcode to indicate that execution circuitry is to load a global pointer from memory, wherein the global pointer is to be used to pass state from a host thread to one or more microthreads, wherein each microthread of the one or more microthreads has its own state; and execution circuitry to execute the decoded instruction to load the global pointer from memory only when a mode of operation is synchronous microthreading.

2. The apparatus of claim 1, wherein the global pointer is stored in a microthread state save area.

3. The apparatus of claim 2, wherein the microthread state save area is to additionally store contents of general purpose registers used by each active microthread.

4. The apparatus of claim 2, wherein the microthread state save area is to additionally store contents of vector registers used by each active microthread.

5. The apparatus of claim 2, wherein the microthread state save area is to additionally store contents of predication registers used by each active microthread.

6. The apparatus of claim 1, wherein the global pointer is to point to an argument.

7. The apparatus of claim 1, wherein the global pointer is to be provided by an instruction to enter into a microthreaded execution mode.

8. The apparatus of claim 7, wherein the global pointer is accessible in the microthreaded execution mode and a non-microthreaded execution mode.

9. The apparatus of claim 1, wherein the apparatus is an accelerator.

10. The apparatus of claim 1, wherein the execution circuitry is a part of a memory cluster.

11. A system comprising:

memory to store an instance of a single instruction; and an apparatus comprising:

decoder circuitry to decode an instance of a single instruction, the single instruction to include an opcode to indicate that execution circuitry is to load a global pointer from memory, wherein the global pointer is to be used to pass state from a host thread to one or more microthreads, wherein each microthread of the one or more microthreads has its own state; and execution circuitry to execute the decoded instruction to load the global pointer from memory only when a mode of operation is synchronous microthreading.

12. The system of claim 11, wherein the global pointer is stored in a microthread state save area.

13. The system of claim 12, wherein the microthread state save area is to additionally store contents of general purpose registers used by each active microthread.

14. The system of claim 12, wherein the microthread state save area is to additionally store contents of vector registers used by each active microthread.

15. The apparatus of claim 12, wherein the microthread state save area is to additionally store contents of predication registers used by each active microthread.

16. The system of claim 11, wherein the global pointer is to point to an argument.

17. The system of claim 11, wherein the global pointer is to be provided by an instruction to enter into a microthreaded execution mode.

18. The system of claim 17, wherein the global pointer is accessible in the microthreaded execution mode and a non-microthreaded execution mode.

19. The system of claim 11, wherein the apparatus is an accelerator.

20. The system of claim 11, wherein the execution circuitry is a part of a memory cluster.

21. A method comprising:

translating an instance of a single instruction of a first instruction set to one or more instructions of a second instruction set, the single instruction to include a field for an opcode to indicate that execution circuitry is to load a global pointer from memory, wherein the global pointer is to be used to pass state from a host thread to one or more microthreads, wherein each microthread of the one or more microthreads has its own state;

decoding the one or more instructions of the second instruction set; and executing the decoded instruction according to the opcode to load a global pointer from memory only when a mode of operation is synchronous microthreading.

22. The method of claim 21, wherein the global pointer is stored in a microthread state save area.

23. The method of claim 22, wherein the microthread state save area is to additionally store contents of general purpose registers used by each active microthread.

24. The method of claim 22, wherein the microthread state save area is to additionally store contents of vector registers used by each active microthread.

* * * * *